(12) United States Patent
Kondo et al.

(10) Patent No.: US 6,827,876 B2
(45) Date of Patent: Dec. 7, 2004

(54) DIFLUOROMETHYL ETHER DERIVATIVE AND PROCESS FOR PRODUCING THE SAME

(75) Inventors: Tomoyuki Kondo, Ichihara (JP); Kouki Sagou, Ichihara (JP); Shuichi Matsui, Ichihara (JP); Hiroyuki Takeuchi, Ichihara (JP); Yasuhiro Kubo, Ichihara (JP); Etsuo Nakagawa, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

(21) Appl. No.: 10/463,598

(22) Filed: Jun. 18, 2003

(65) Prior Publication Data

US 2004/0016906 A1 Jan. 29, 2004

Related U.S. Application Data

(62) Division of application No. 09/925,608, filed on Aug. 10, 2001, now Pat. No. 6,605,747.

(30) Foreign Application Priority Data

Aug. 10, 2000 (JP) ....................................... 2000-241997

(51) Int. Cl.[7] .............................................. C09K 19/06
(52) U.S. Cl. .............................. 252/299.6; 252/299.01; 252/299.61; 252/299.63; 252/299.66; 568/236; 568/646; 568/647; 558/411; 558/423; 558/425; 549/13; 549/200; 549/374; 428/1.1
(58) Field of Search ....................... 252/299.66, 299.01, 252/299.6, 299.61, 299.63; 568/236, 647, 646; 558/411, 423, 425; 549/374, 13, 200; 428/1.1

(56) References Cited

U.S. PATENT DOCUMENTS

| | | | |
|---|---|---|---|
| 5,032,313 A | 7/1991 | Goto et al. | ............ 252/299.63 |
| 5,045,229 A | 9/1991 | Bartmann et al. | ..... 252/299.01 |
| 6,007,740 A | 12/1999 | Andou et al. | .......... 252/299.63 |

FOREIGN PATENT DOCUMENTS

| | | | |
|---|---|---|---|
| JP | 2-233626 | 9/1990 | |
| JP | 5-112778 | 5/1993 | ........... C09K/19/20 |
| JP | 5-255165 | 10/1993 | |
| JP | 2001114722 A2 * | 4/2001 | |
| WO | WO 97/27166 * | 7/1997 | ......... C07C/43/166 |

OTHER PUBLICATIONS

Abstract of JP 10204016.
Hayashi, S., et al. "Convenient Procedures for Conversion of Carbonyl Compounds to gem–Difluoroolefins and Their Selective Reductions to Monofluoroolefins", Chemistry Letters, 1979, pp. 983–986.
Haas, A., et al. "Synthese seitenkettenfluorierter aromatischer Verbindungen und deren Chemische Reaktivitat", Chem. Ber., vol. 121 (1988), pp. 1329–1340.
Kirsch et al., "Liquid Crystals with multiple fluorinated bridges in the mesogenic core structure", Journal of Fluorine Chemistry, vol. 112, No. 1, pp. 69–72, 2001.

* cited by examiner

Primary Examiner—Rosalynd Keys
(74) Attorney, Agent, or Firm—Wenderoth, Lind & Ponack, L.L.P.

(57) ABSTRACT

A liquid crystalline compound represented by Formula (1c'):

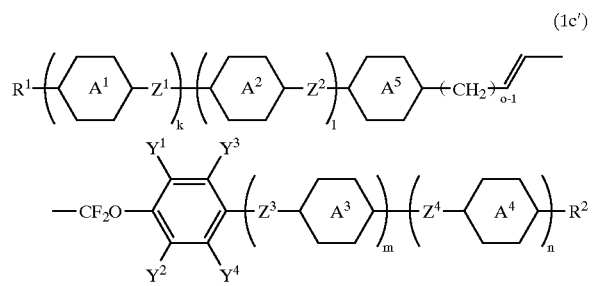

(1c')

wherein $R^1$ and $R^2$, rings $A^1, A^2, A^3, A^4$ and $A^5$, $Z^1, Z^2, Z^3$ and $Z^4$, $Y^1, Y^2, Y^3$ and $Y^4$, and k, l, m and n are as defined in the specification. Also provided is a liquid crystal composition containing at least one of these liquid crystalline compounds.

15 Claims, No Drawings

DIFLUOROMETHYL ETHER DERIVATIVE AND PROCESS FOR PRODUCING THE SAME

This application is a Divisional application of application Ser. No. 09/925,608, filed Aug. 10, 2001, now U.S. Pat. No. 6,605,747.

FIELD OF THE INVENTION

The present invention relates to a difluoromethyl ether derivative which is useful as a liquid crystalline compound, a liquid crystal composition comprising the compound and a liquid crystal display element using the composition. Further, the present invention relates to a simple and efficient process for producing the difluoromethyl ether derivative.

BACKGROUND OF THE INVENTION

A liquid crystal display element makes use of optical anisotropy and dielectric anisotropy of a liquid crystalline compound and is used for watches, electric calculators, various measuring instruments, panels for automobiles, word processors, electronic notebooks, printers, personal computers, televisions and portable telephones. There has been an increasing demand therefor year by year. A liquid crystal phase is between a solid phase and a liquid phase, and divided roughly into a nematic phase, a smectic phase and a cholesteric phase. Display elements making use of a nematic phase are most widely used among them at present. A lot of display modes have so far been developed, and a dynamic scattering mode (DS mode), a guest-host mode (GH mode), a twisted nematic mode (TN mode), a super twisted nematic mode (STN mode), a thin film transistor mode (TFT mode), a ferroelectric liquid crystal mode (FLC mode), etc. are known.

A recent development in these fields has mainly been in miniaturization, reduction in power consumption and increase in a response speed of liquid crystal display elements as seen in portable telephones, and liquid crystalline compounds and liquid crystal compositions have been required to have a low threshold voltage and a low viscosity.

A threshold voltage (Vth) is a function of a dielectric anisotropy ($\Delta\epsilon$) as shown by the following equation (Mol. Cryst. Liq. Cryst., 12, 57 (1970)):

$$Vth = \pi(K/\epsilon 0 \Delta\epsilon)^{1/2}$$

wherein K is an elastic constant, and $\epsilon 0$ is a dielectric constant in vacuo.

As seen from the above equation, increasing $\Delta\epsilon$ or decreasing K can be considered as a method for reducing Vth. However, it is still difficult to actually control K by conventional techniques, and a liquid crystal material having large $\Delta\epsilon$ has generally been used to meet the requirement. Therefore, liquid crystalline compounds having large $\Delta\epsilon$ have actively been developed. Viscosity is an element which affects a response speed of a liquid crystal molecule against an electric field, and a liquid crystalline compound having a low viscosity is preferably used in a large amount in order to prepare a liquid crystal composition showing a high speed response.

In recent years, liquid crystal display elements have become widely used in information terminals and portable games. These display elements are inevitably driven by batteries, and therefore, it is requested that they are driven at a low threshold voltage and have a low power consumption so as to be used for long time. Particularly in order to reduce a power consumption of an element itself, a reflective display element not requiring backlight has actively been developed recently. Liquid crystal compositions used for these reflective display elements are required to have a small refractive anisotropy as well as a low threshold voltage. Accordingly, it is important in this field to develop a liquid crystalline compound having a large dielectric anisotropy and a small refractive anisotropy as a liquid crystal material constituting the composition. The following compounds (13) and (14) (JP-A 2-233626) can be shown as a representative liquid crystal material for driving a display element at a low voltage, which is used for a liquid crystal display element of a TFT mode:

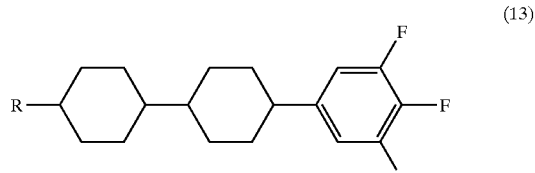

(13)

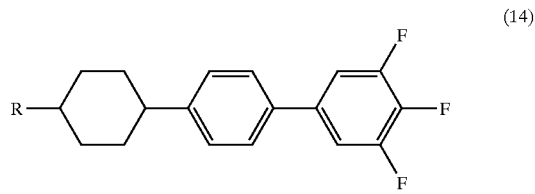

(14)

wherein R represents an alkyl group.

Both the compounds (13) and (14) have a 3,4,5-trifluorophenyl group at the terminal of a molecule and are expected as a liquid crystal material for driving a display element at a low voltage. However, the compound (13) has a small dielectric anisotropy ($\Delta\epsilon$=about 10) for use in the reflective display element described above, and the compound (14) has a satisfactory dielectric anisotropy ($\Delta\epsilon$=about 12) but has a large refractive anisotropy of about 0.12, so that it is considered difficult to prepare a liquid crystal composition which can sufficiently satisfy the above requirements by using these compounds.

JP-A 10-204016 discloses the following compound (15) having a difluoromethyleneoxy group as a bonding group, which shows far larger dielectric anisotropy ($\Delta\epsilon$) of about 14 than that of the above compound (13) while showing a clearing point, a refractive anisotropy and a viscosity equivalent to those of the compound (13), and which is expected as a liquid crystal material for driving at a low voltage in various TFT modes and also as a liquid crystal material for the reflective, display elements described above.

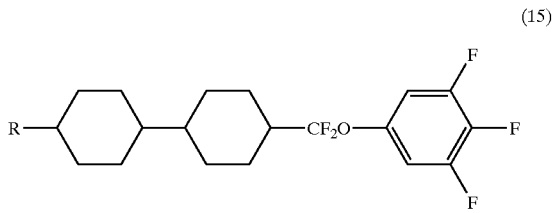

(15)

In Formula, R represents an alkyl group.

JP-A 10-204016 discloses a process for producing the above compound having a difluoromethyleneoxy group as a bonding group, in which a corresponding ester derivative is converted to a thioester derivative with a Lawesson's reagent (Fieser 13, 38) and the derivative is further fluorinated by reacting with HF-pyridine in the presence of an oxidizing agent according to a method disclosed in JP-A 5-255165 to produce the above compound.

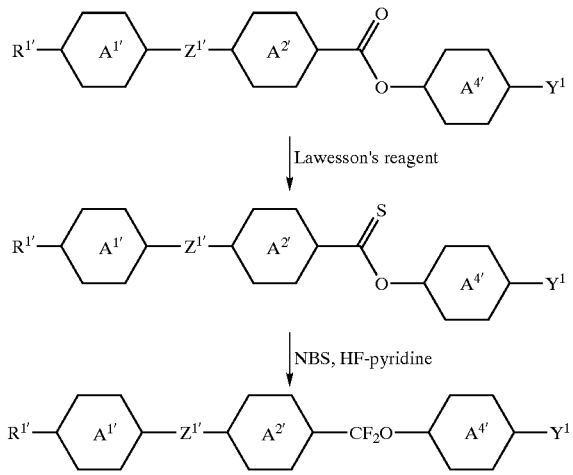

In Formula, $R^{1'}$ is an alkyl group; rings $A^{1'}$, $A^{2'}$ and $A^{4'}$ are a 1,4-cyclohexylene group or a 1,4-phenylene group; and $Z^{1'}$ is a single bond or —$CH_2CH_2$—.

SUMMARY OF THE INVENTION

In the process described above, however, the thioesterification reaction with a Lawesson's reagent results in unsatisfactory yield. HF-Pyridine is strongly corrosive and requires a specific facility in handling in the fluorination reaction, so that the process is not necessarily simple and efficient for producing a difluoromethyl ether derivative. Further, there has been no process but the above reported process, for producing a compound in which a substituent for a carbon atom of a difluoromethyleneoxy group is a cyclohexylene group.

As explained above, any simple and efficient process for producing a difluoromethyl ether derivative which shows various suitable physical properties as a liquid crystal compound has not been found yet, and therefore, not only a difluoromethyl ether derivative as a liquid crystal compound but also a simple process for producing the same have been desired to be developed.

An object of the present invention is to provide a process for producing a difluoromethyl ether derivative which shows various suitable physical properties as a liquid crystal compound, a liquid crystal composition comprising the compound and a liquid crystal display element containing the liquid crystal composition, and to provide a simple and efficient process for producing the above difluoromethyl ether derivative.

The present inventors have made intensive investigations in order to achieve the above object and, as a result, found that the intended difluoromethyl ether derivative can be obtained in a high yield by adding halogen to an α,α-difluorocyclohexylidene derivative or a difluorovinyl derivative as an intermediate, reacting with a phenol derivative, and then reducing it with hydrogen. Further, the inventors have found that when adding hydrogen halide to the difluorovinyl derivative, a halogen atom is quantitatively added onto a difluoromethyl carbon and that it is then reacted with a phenol derivative, whereby the intended difluoromethyl ether derivative can be obtained in a high yield. In addition, the inventors have found that the compound represented by Formula (1c') having a 1,1-difluoro-2-propenyloxy group as a bonding group, which is obtained as an intermediate in the process of the present invention, has excellent characteristics as a liquid crystal material, and thus completed the present invention.

The present invention relates to:

a process for producing a difluoromethyl ether derivative represented by Formula (1d):

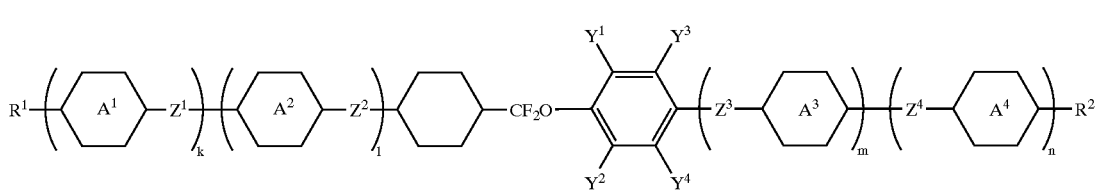

(1d)

wherein $R^1$ and $R^2$ each independently represent hydrogen, halogen, a cyano group or an alkyl group having 1 to 20 carbon atoms, in which at least one —$CH_2$— may be substituted with —O—, —S—, —CH=CH— or —C≡C— but —O— is not adjacent to another —O—, and in which any hydrogen may be substituted with fluorine;

rings $A^1$, $A^2$, $A^3$ and $A^4$ each independently represent a 1,4-cyclohexylene group in which at least one —$CH_2$— may be substituted with —O— or —S—, or a 1,4-phenylene group in which at least one =CH— may be substituted with =N— and at least one hydrogen on the ring may be substituted with fluorine, a cyano group or an alkyl group having 1 to 10 carbon atoms;

$Z^1$, $Z^2$, $Z^3$ and $Z^4$ each independently represent a single bond or an alkylene group having 1 to 4 carbon atoms, in which at least one —$CH_2$— may be substituted with —O—, —S—, —CH=CH— or —C≡C— but —O— is not adjacent to another —O—, and in which any hydrogen may be substituted with fluorine;

$Y^1$, $Y^2$, $Y^3$ and $Y^4$ each independently represent hydrogen, halogen, a cyano group or an alkyl group having 1 to 10 carbon atoms; and k, l, m and n each independently represent 0 or 1;

which comprises using an α,α-difluorocyclohexylidene derivative represented by Formula (1a):

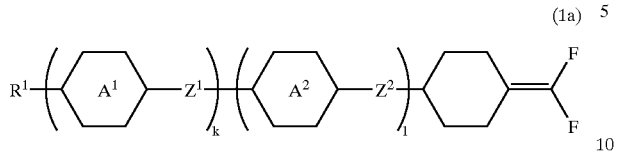

(1a)

wherein $R^1$, rings $A^1$ and $A^2$, $Z^1$, $Z^2$, k and l have the same meanings as defined above; as a starting material.

The first aspect of the production process according to the present invention relates to the process described above, which comprises:

a first step of reacting a compound (1a) having an α,α-difluorocyclohexylidene group at the terminal with halogen to produce a compound (1b)

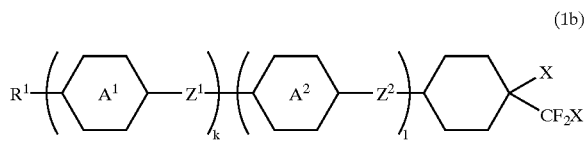

(1b)

wherein $R^1$, rings $A^1$ and $A^2$, $Z^1$, $Z^2$, k and l have the same meanings as defined above, and X represents chlorine, bromine or iodine;

a second step of reacting the compound (1b) with a phenol compound (P)

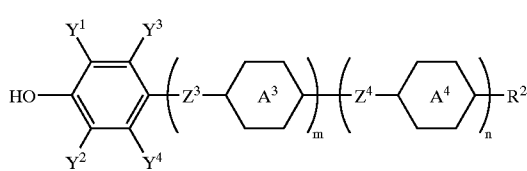

(P)

wherein $R^2$, rings $A^3$ and $A^4$, $Z^3$, $Z^4$, $Y^1$, $Y^2$, $Y^3$, $Y^4$, m and n have the same meanings as defined above; in the presence of a base to produce a compound (1c)

wherein $R^1$, $R^2$, rings $A^1$, $A^2$, $A^3$ and $A^4$, $Z^1$, $Z^2$, $Z^3$, $Z^4$, $Y^1$, $Y^2$, $Y^3$, $Y^4$, k, l, m and n have the same meanings as defined above; and a third step of reducing the compound (1c) by hydrogenation to produce the compound (1d).

The second aspect of the production process according to the present invention relates to the process described above, which comprises:

a first step of reacting a compound (1a) having an α,α-difluorocyclohexylidene group at the terminal with hydrogen halide to produce a compound (1b')

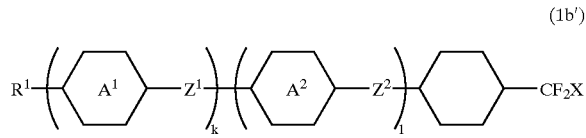

(1b')

wherein $R^1$, rings $A^1$ and $A^2$, $Z^1$, $Z^2$, k and l have the same meanings as defined above, and X represents chlorine, bromine or iodine; and a second step of reacting the compound (1b') with the phenol compound (P) in the presence of a base to produce the compound (1d).

Further, the present invention relates to a process for producing a difluoromethyl ether derivative represented by the above Formula (1c) in the first aspect of the production process, which comprises:

a first step of reacting the starting material, an α,α-difluorocyclohexylidene derivative represented by Formula (1a) with halogen to produce the compound (1b); and a second step of reacting the compound (1b) with a phenol compound (P) in the presence of a base to produce the compound (1c).

The present invention also relates to a process for producing a difluoromethyl ether derivative represented by Formula (1d'):

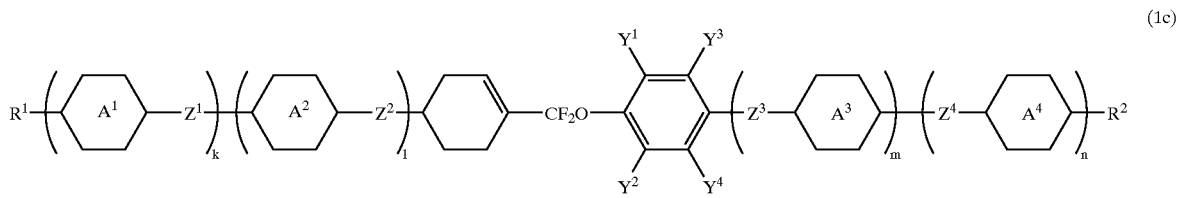

(1c)

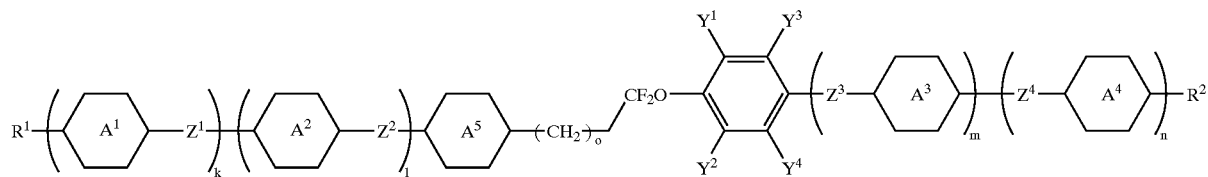

(1d')

wherein $R^1$ and $R^2$ each independently represent hydrogen, halogen, a cyano group or an alkyl group having 1 to 20 carbon atoms, in which at least one —$CH_2$— may be substituted with —O—, —S—, —CH=CH— or —C≡C— but —O— is not adjacent to another —O—, and in which any hydrogen may be substituted with fluorine;

rings $A^1$, $A^2$, $A^3$, $A^4$ and $A^5$ each independently represent a 1,4-cyclohexylene group in which at least one —$CH_2$— may be substituted with —O— or —S—, or a 1,4-phenylene group in which at least one =CH— may be substituted with =N— and at least one hydrogen on the ring may be substituted with fluorine, a cyano group or an alkyl group having 1 to 10 carbon atoms;

$Z^1$, $Z^2$, $Z^3$ and $Z^4$ each independently represent a single bond or an alkylene group having 1 to 4 carbon atoms, in which at least one —$CH_2$— may be substituted with —O—, —S—, —CH=CH— or —C≡C— but —O— is not adjacent to another —O—, and in which any hydrogen may be substituted with fluorine;

$Y^1$, $Y^2$, $Y^3$ and $Y^4$ each independently represent hydrogen, halogen, a cyano group or an alkyl group having 1 to 10 carbon atoms;

k, l, m and n each independently represent 0 or 1; and o represents an integer of 1–10;

which comprises using an 1,1-difluorovinyl derivative represented by Formula (1a'):

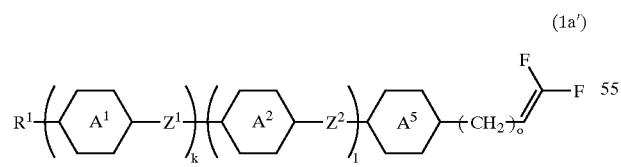

(1a')

wherein $R^1$, rings $A^1$, $A^2$ and $A^5$, $Z^1$, $Z^2$, k, l and o have the same meanings as defined above; as a starting material.

The third aspect of the production process according to the present invention relates to the process described above, which comprises:

a first step of reacting a compound (1a') having a 1,1-difluorovinyl group at the terminal with halogen to produce a compound (1b")

(1b")

$R^1 \!-\!\!\left(\!\!\left(\!\!A^1\!\!\right)\!\!-\!Z^1\!\right)_{\!k}\!\!\left(\!\!\left(\!\!A^2\!\!\right)\!\!-\!Z^2\!\right)_{\!l}\!\!\left(\!\!A^5\!\!\right)\!\!-\!\!(CH_2)_o\!\!-\!CHXCF_2X$ wherein $R^1$, rings $A^1$, $A^2$ and $A^5$, $Z^1$, $Z^2$, k, l and o have the same meanings as defined above, and X represents chlorine, bromine or iodine;

a second step of reacting the compound (1b") with the phenol compound (P) in the presence of a base to produce a compound (1c')

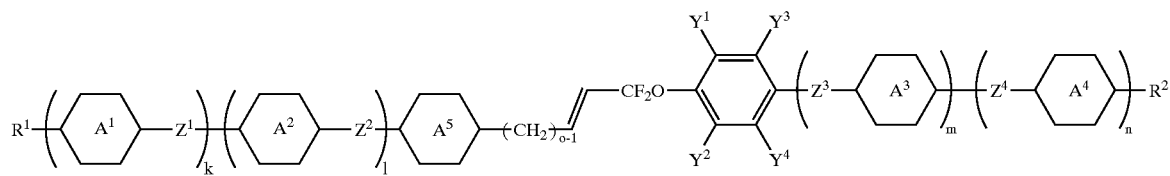

(1c')

wherein $R^1$, $R^2$, rings $A^1$, $A^2$, $A^3$, $A^4$ and $A^5$, $Z^1$, $Z^2$, $Z^3$, $Z^4$, $Y^1$, $Y^2$, $Y^3$, $Y^4$, k, l, m, n and o have the same meanings as defined above; and a third step of reducing the compound (1c') by hydrogenation to produce the compound (1d').

The fourth aspect of the production, process according to the present invention relates to the process described above, which comprises:

a first step of reacting the compound (1a') having a 1,1-difluorovinyl group at the terminal with hydrogen halide to produce a compound (1b''')

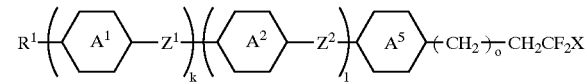

(1b''')

wherein $R^1$, rings $A^1$, $A^2$ and $A^5$, $Z^1$, $Z^2$, X, k, l and o have the same meanings as defined above; and a second step of reacting the compound (1b''') with the phenol compound (P) in the presence of a base to produce the compound (1d').

Further, the present invention relates to a process for producing a difluoromethyl ether derivative represented by Formula (1c') in the third aspect of the production process described above, which comprises:

a first step of reacting the starting material, a 1,1-difluorovinyl derivative represented by Formula (1a') with halogen to produce the compound (1b"); and a second step of reacting the compound (1b″) with the phenol compound (P) in the presence of a base to produce a compound (1c′).

The liquid crystalline compound of the present invention is represented by Formula (1c′):

The liquid crystal composition of the present invention also comprises at least one liquid crystalline compound described above as a first component and at least one compound selected from the group A consisting of compounds (2), (3) and (4) as a second component:

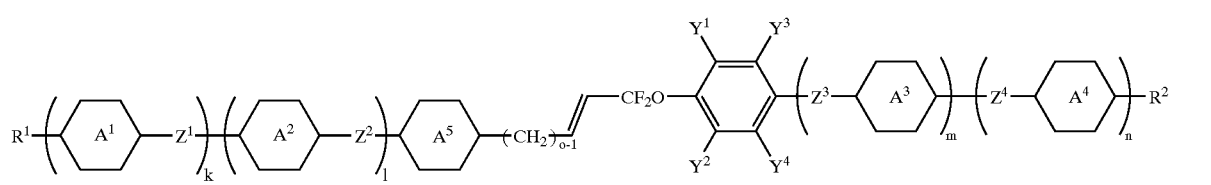

(1c′)

wherein $R^1$ and $R^2$ each independently-represent hydrogen, halogen, a cyano group or an alkyl group having 1 to 20 carbon atoms, in which at least one —$CH_2$— may be substituted with —O—, —S—, —CH=CH— or —C≡C— but —O— is not adjacent to another —O—, and in which any hydrogen may be substituted with fluorine;

rings $A^1$, $A^2$, $A^3$, $A^4$ and $A^5$ each independently represent a 1,4-cyclohexylene group in which at least one —$CH_2$— may be substituted with —O— or —S—, or a 1,4-phenylene group in which at least one =CH— may be substituted with =N— and at least one hydrogen on the ring may be substituted with fluorine, a cyano group or an alkyl group having 1 to 10 carbon atoms;

$Z^1$, $Z^2$, $Z^3$ and $Z^4$ each independently represent a single bond or an alkylene group having 1 to 4 carbon atoms, in which at least one —$CH_2$— may be substituted with —O—, —S—, —CH=CH— or —C≡C— but —O— is not adjacent to another —O—, and in which any hydrogen may be substituted with fluorine;

$Y^1$, $Y^2$, $Y^3$ and $Y^4$ each independently represent hydrogen, halogen, a cyano group or an alkyl group having 1 to 10 carbon atoms;

k, l, m and n each independently represent 0 or 1; and o represents an integer of 1–10.

The liquid crystalline compound of the present invention is that of the above Formula (1c′), wherein the ring $A^5$ is a 1,4-cyclohexylene group.

The liquid crystalline compound of the present invention is that of the above Formula (1c′), wherein both $Y^1$ and $Y^3$ are fluorine atoms, and both $Y^2$ and $Y^4$ are hydrogen atoms.

The liquid crystalline compound of the present invention is that of the above Formula (1c′), wherein both $Y^1$ and $Y^2$ are hydrogen.

The liquid crystal composition of the present invention comprises at least one liquid crystalline compound described above.

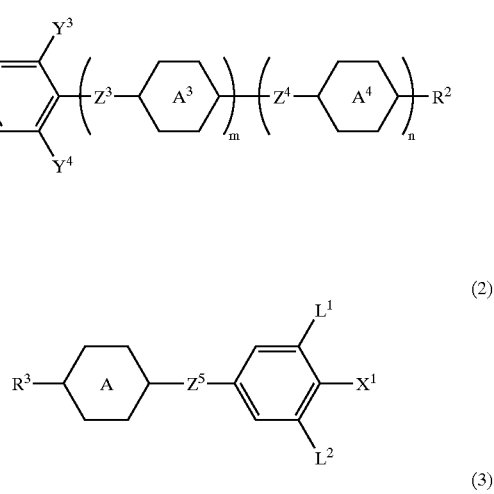

wherein $R^3$ represents an alkyl group having 1 to 10 carbon atoms, in which any —$CH_2$— not adjacent to each other may be substituted with —O— or —CH=CH— and any hydrogen may be substituted with fluorine; $X^1$ represents fluorine, chlorine, —$OCF_3$, —$OCF_2H$, —$CF_3$, —$CF_2H$, —$CFH_2$, —$OCF_2CF_2H$ or —$OCF_2CFHCF_3$; $L^1$ and $L^2$ each independently represent hydrogen or fluorine; $Z^5$ and $Z^6$ each independently represent —$(CH_2)_2$—, —$(CH_2)_4$—, —COO—, —$CF_2O$—, —$OCF_2$—, —CH=CH— or a single bond; rings A and B each independently represent a 1,4-cyclohexylene group, a 1,3-dioxane-2,5-diyl group, or a 1,4-phenylene group in which hydrogen may be substituted with fluorine; and ring C represents a 1,4-cyclohexylene group, or a 1,4-phenylene group in which hydrogen may be substituted with fluorine.

The liquid crystal composition of the present invention comprises at least one liquid crystalline compound described above as a first component and at least one compound selected from the group B consisting of compounds (5) and (6) as a second component:

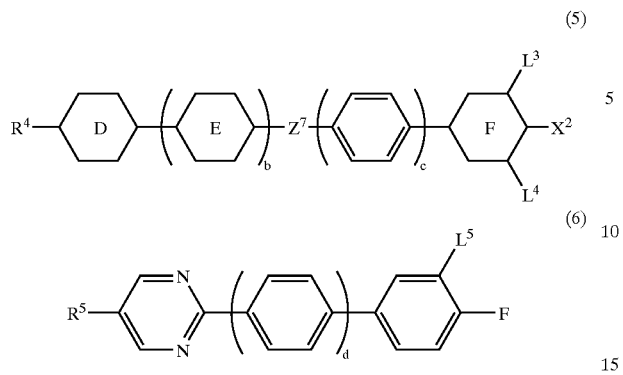

(5)

(6)

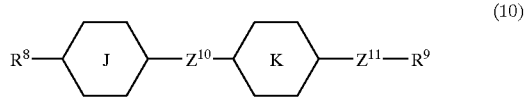

(10)

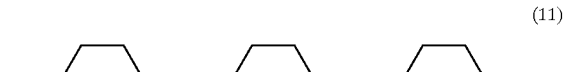

(11)

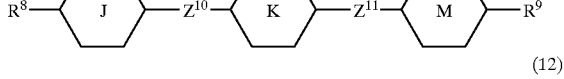

(12)

wherein $R^4$ and $R^5$ each independently represent an alkyl group having 1 to 10 carbon atoms, in which any —CH$_2$— not adjacent to each other may be substituted with —O— or —CH=CH— and any hydrogen may be substituted with fluorine; $X^2$ represents —CN or —C≡C—CN; ring D represents a 1,4-cyclohexylene group, a 1,4-phenylene group, a 1,3-dioxane-2,5-diyl group or a pyrimidine-2,5-diyl group; ring E represents a 1,4-cyclohexylene group, a 1,4-phenylene group in which hydrogen may be substituted with fluorine, or a pyrimidine-2,5-diyl group; ring F represents a 1,4-cyclohexylene group or a 1,4-phenylene group; $Z^7$ represents —(CR$_2$)$_2$—, —COO—, —CF$_2$O—, —OCF$_2$— or a single bond; $L^3$, $L^4$ and $L^5$ each independently represent hydrogen or fluorine; and b, c and d each independently represent 0 or 1.

The liquid crystal composition of the present invention comprises at least one liquid crystalline compound described above as a first component and at least one compound selected from the group C consisting of compounds (7), (8) and (9) as a second component:

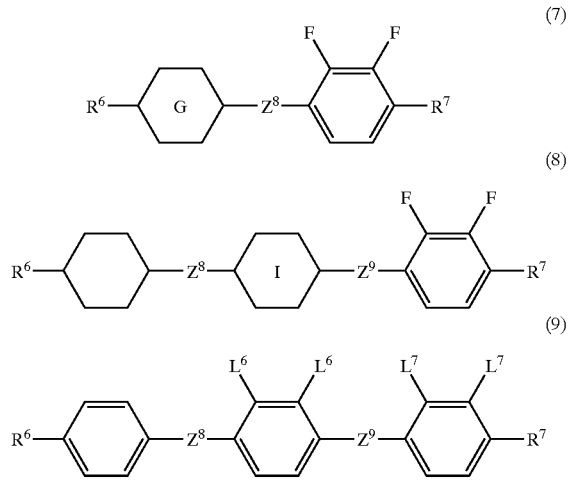

(7)

(8)

(9)

wherein $R^6$ and $R^7$ each independently represent an alkyl group having 1 to 10 carbon atoms, in which any —CH$_2$— not adjacent to each other may be substituted with —O— or —CH=CH— and any hydrogen may be substituted with fluorine; rings G and I each independently represent a 1,4-cyclohexylene group or a 1,4-phenylene group; $L^6$ and $L^7$ each independently represent hydrogen or fluorine, but $L^6$ and $L^7$ are not hydrogen at the same time; and $Z^8$ and $Z^9$ each independently represent —(CH$_2$)$_2$—, —COO— or a single bond.

The liquid crystal composition of the present invention comprises at least one liquid crystalline compound described above as a first component, at least one compound selected from the group A consisting of the compounds (2), (3) and (4) as a second component and at least one compound selected from the group D consisting of compounds (10), (11) and (12) as a third component:

wherein $R^8$ and $R^9$ each independently represent an alkyl group having 1 to 10 carbon atoms, in which any —CH$_2$— not adjacent to each other may be substituted with —O— or —CH=CH— and any hydrogen may be substituted with fluorine; rings J, K and M each independently represent a 1,4-cyclohexylene group, a pyrimidine-2,5-diyl group, or a 1,4-phenylene group in which hydrogen may be substituted with fluorine; and $Z^{10}$ and $Z^{11}$ each independently represent —C≡C—, —COO—, —(CH$_2$)$_2$—, —CH=CH— or a single bond.

The liquid crystal composition of the present invention comprises at least one liquid crystalline compound described above as a first component, at least one compound selected from the group B consisting of the compounds (5) and (6) as a second component and at least one compound selected from the group D consisting of the compounds (10), (11) and (12) as a third component.

The liquid crystal composition of the present invention comprises at least one liquid crystalline compound described above as a first component, at least one compound selected from the compound group C consisting of the compounds (7), (8) and (9) as a second component and at least one compound selected from the group D consisting of the compounds (10), (11) and (12) as a third component.

The liquid crystal composition of the present invention also comprises at least one liquid crystalline compound described above as a first component, at least one compound selected from the group A consisting of the compounds (2), (3) and (4) and at least one compound selected from the group B consisting of the compounds (5) and (6) as a second component and at least one compound selected from the group D consisting of the compounds (10), (11) and (12) as a third component.

Further, the liquid crystal composition of the present invention comprises the liquid crystal composition described above, and further, at least one optically active compound.

The liquid crystal display element of the present invention comprises the liquid crystal composition described above.

DETAILED DESCRIPTION OF THE INVENTION

The production process of the present invention shall be explained below in process (A) using the α,α-difluorocyclohexylidene derivative (1a) as a starting material and process (B) using the 1,1-difluorovinyl derivative (1a') as a starting material.

Process (A)

The process for producing the difluoromethyl ether derivative represented by Formula (1d) of the present invention is characterized by using the α,α-difluorocyclohexylidene derivative represented by Formula (1a) as a starting material.

The difluoromethyl ether derivative, which can be produced by the production process (A) of the present invention, is represented by Formula (1d) and referred to as the compound (1d).

In the compound (1d), $R^1$ and $R^2$ each independently represent hydrogen, halogen, a cyano group or an alkyl group having 1 to 20 carbon atoms, in which at least one —CH$_2$— may be substituted with —O—, —S—, —CH=CH— or —C≡C— but —O— is not adjacent to another —O—, and in which any hydrogen may be substituted with fluorine.

The rings $A^1$ to $A^4$ each independently represent a 1,4-cyclohexylene group in which at least one —CH$_2$— may be substituted with —O— or —S—, a 1,4-phenylene group in which at least one =CH— may be substituted with =N—, or a 1,4-phenylene group in which at least one hydrogen on the ring may be substituted with fluorine, a cyano group or an alkyl group having 1 to 10 carbon atoms.

$Y^1$, $Y^2$, $Y^3$ and $Y^4$ each independently represent hydrogen, halogen, a cyano group or an alkyl group having 1 to 10 carbon atoms.

$Z^1$ to $Z^4$ each independently represent a single bond or an alkylene group having 1 to 4 carbon atoms, in which at least one —CH$_2$— may be substituted with —O—, —S—, —CH=CH— or —C≡C— but —O— is not adjacent to another —O—, and in which any hydrogen may be substituted with fluorine.

k, l, m and n each independently represent 0 or 1.

Preferable $R^1$ and $R^2$ are, for example, hydrogen, halogen, a cyano group, an alkyl group, an alkoxy group, an alkoxyalkyl group, an alkylthio group, an alkylthioalkyl group, an alkenyl group, an alkenyloxy group, an alkenylthio group, a fluoro-substituted alkyl group, a fluoro-substituted alkoxy group, a fluoro-substituted alkoxyalkyl group, a fluoro-substituted alkenyl group, a fluoro-substituted alkenylthio group and a fluoro-substituted alkenyloxy group.

More preferred halogens are fluorine, chlorine and bromine. More preferred alkyl groups are methyl, ethyl, propyl, isopropyl, butyl, pentyl, hexyl, heptyl, octyl, nonyl and decyl. More preferred alkoxy groups are methoxy, ethoxy, propoxy, butoxy, pentoxy, heptyloxy and octyloxy. More preferred alkoxyalkyl groups are methoxymethyl, ethoxymethyl, propoxymethyl, propoxyethyl, methoxypropyl, ethoxypropyl and propoxypropyl. More preferred alkylthio groups are methylthio, ethylthio, propylthio, butylthio, pentylthio, hexylthio, heptylthio and octylthio. More preferred alkylthioalkyl groups are methylthiomethyl, ethylthiomethyl, propylthiomethyl, butylthiomethyl, methylthioethyl, ethylthioethyl, propylthioethyl, methylthiopropyl, ethylthiopropyl and propylthiopropyl. More preferred alkenyl groups are vinyl, 1-propenyl, 1-butenyl, 1-pentenyl, 3-butenyl and 3-pentenyl. More preferred alkenyloxy group is allyloxy. More preferred fluoro-substituted alkyl groups are trifluoromethyl, fluoromethyl, 2-fluoroethyl, difluoromethyl, 2,2,2-trifluoroethyl, 1,1,2,2-tetrafluoroethyl, 2-fluoropropyl, 3-fluoropropyl, 4-fluorobutyl and 5-fluoropentyl. More preferred fluoro-substituted alkoxy groups are fluoromethoxy, trifluoromethoxy, difluoromethoxy, pentafluoroethoxy, 1,1,2,2-tetrafluoroethoxy, heptafluoropropoxy and 1,1,2,3,3,3-hexafluoropropoxy. More preferred fluoro-substituted alk-enyl groups are 2-fluoroethenyl, 2,2-difluoroethenyl, 1,2,2-trifluoroethenyl, 3-fluoro-1-butenyl and 4-fluoro-1-butenyl. More preferred fluoro-substituted alkenylthio groups are trifluoromethylthio, difluoromethylthio, 1,1,2,2-tetrafluoroethylthio and 2,2,2-trifluoroethylthio.

Specifically, rings $A^1$ to $A^4$ having ring structures represented by the following Formulas (r-1) to (r-22) can be produced.

(r-1)

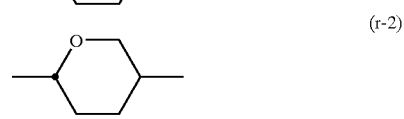

(r-2)

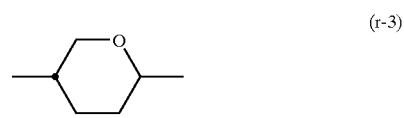

(r-3)

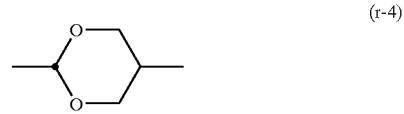

(r-4)

(r-5)

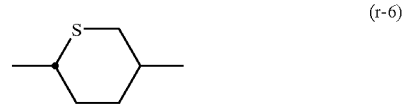

(r-6)

(r-7)

(r-8)

(r-9)

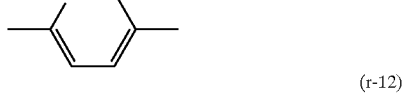

(r-10)

(r-11)

(r-12)

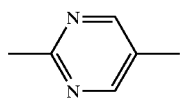
(r-13)

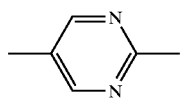
(r-14)

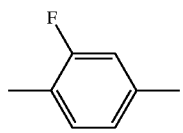
(r-15)

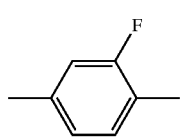
(r-16)

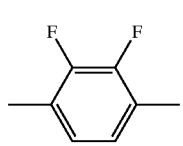
(r-17)

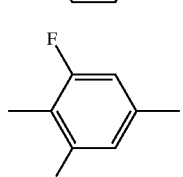
(r-18)

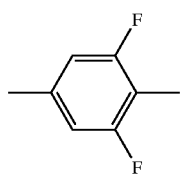
(r-19)

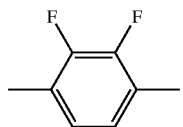
(r-20)

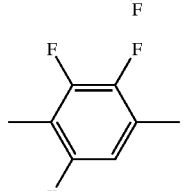
(r-21)

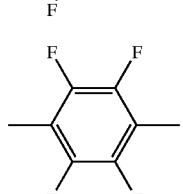
(r-22)

Specifically, $Z^1$ to $Z^4$ include a single bond, 1,2-ethylene, 1,4-butylene, methyleneoxy, oxymethylene, propyleneoxy, oxypropylene, vinylene, 1(E)-1,4-butenylene, 2(Z)-1,4-butenylene, 3(E)-1,4-butenylene, ethynylene, 1,4-butynylene, 1,1-difluoro-1,2-ethylene, 1,1,2,2-tetrafluoro-1,2-ethylene and 1,1-difluoro-1,4-butylene.

The production process of the present invention includes Reaction (1) comprising a first step of reacting the compound (1a) having an α,α-difluorocyclohexylidene group at the terminal with halogen to produce the compound (1b), a second step of reacting the compound (1b) with the phenol compound (P) in the presence of a base to produce the compound (1c) and a third step of reducing the compound (1c) by hydrogenation to produce the compound (1d), and Reaction (2) comprising a first step of reacting the compound (1a) having an α,α-difluorocyclohexylidene group at the terminal with hydrogen halide to produce the compound (1b') and a second step of reacting the compound (1b') with the phenol compound (P) in the presence of a base to produce the compound (1d).

Reaction (1)

The Reaction (1) is characterized by comprising a first step of reacting the compound (1a) having an α,α-difluorocyclohexylidene group at the terminal with halogen to produce the compound (1b), a second step of reacting the compound (1b) with the phenol compound (P) in the presence of a base to produce the compound (1c) and a third step of reducing the compound (1c) by hydrogenation to produce the compound (1d).

First Step

The first step is characterized by addition-reacting the compound (1a) having an α,α-difluorocyclohexylidene group at the terminal with halogen to produce the compound (1b).

Compound (1a)

The compound (1a) is characterized by having an α,α-difluorocyclohexylidene group at the terminal.

The compound (1a), which is a starting material in the process (A) for producing the difluoromethyl ether derivative of the present invention, can easily be produced by a person skilled in the art. It can readily be produced, for example, by reacting difluoromethylene-tris(dialkylamino)phosphorane with a cyclohexanone derivative (1) according to the methods described in Douglas G. Naae and Donald J. Burton, Synth. Commun., 3 (3), 197 (1973) and Sei-ichi Hayashi et al., Chem. Lett., 1979, 983.

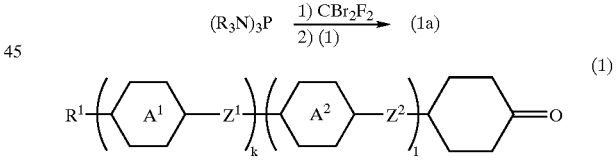

In Formula, $R^1$, ring $A^1$, ring $A^2$, $Z^1$, $Z^2$, k and l have the same meanings as defined above, and R represents an alkyl group.

Difluoromethylenetris(dialkylamino)phosphorane can be prepared from tris(dialkylamino)phosphine and dibromodifluoromethane. The cyclohexanone derivative (1) can readily be obtained as a commercial product or according to the methods described in organic synthetic publications such as New Experimental Chemistry Course (published by Maruzen Co., Ltd.).

Halogen

Halogen used in the first step is preferably any of chlorine, bromine and iodine. In particular, bromine is preferred.

Reaction Conditions

Any solvent can be used as long as it does not react with any of the compound (1a), chlorine, bromine and iodine. Reaction solvents preferably used are aromatic compounds, aliphatic hydrocarbons, alicyclic hydrocarbons, aliphatic ether compounds, cyclic ether compounds, aprotic polar solvents and halogenated hydrocarbons. Preferred aromatic compounds are benzene, toluene, chlorobenzene and bromobenzene. Preferred aliphatic hydrocarbons are hexane and heptane. A preferred alicyclic hydrocarbon is cyclohexane. Preferred aliphatic ether compounds are diethyl ether, methyl t-butyl ether, ethylene glycol dimethyl ether and diethylene glycol dimethyl ether. Preferred cyclic ether compounds are tetrahydrofuran (hereinafter abbreviated as THF) and dioxane. Preferred aprotic polar solvents are N,N-dimethylformamide (hereinafter abbreviated as DMF), dimethylsulfoxide (hereinafter abbreviated as DMSO) and acetonitrile. Preferred halogenated hydrocarbons are dichloromethane, chloroform, carbon tetrachloride and 1,2-dichloroethane. The addition reaction can be carried out by mixing the solvents described above. More preferred reaction solvents are the aromatic compounds, the aliphatic ether compounds, the cyclic ether compounds and the halogenated hydrocarbons which have a large solubility for halogens and the resulting halogen adducts.

An amount of the solvent used is not particularly limited as long as the reaction can be carried out safely and stably. Preferably, it is in the range of 5 to 20 times the weight of the compound (1a).

The reaction temperature is not particularly limited as long as stirring can be carried out well. It is preferably in the range of −70° C. to a boiling point of the solvent depending on a structure of the compound. It is more preferably in the range of −50 to −20° C. so as not to eliminate halogen or hydrogen halide from the resulting compound (1b) and so as to elevate the conversion rate.

An amount of halogen used is preferably equivalent to or more than that of the compound (1a). It is more preferably in the range of 1.0 to 1.5 equivalent based on that of the compound (1a). The amount in the above range makes it possible to reduce unreacted materials.

The reaction time largely depends on the structure of the compound and the reaction temperature, and the reaction shall be completed in about one hour after adding halogen dropwise.

Second Step

The second step is characterized by reacting the compound (1b) with the phenol compound (P) in the presence of a base to produce the compound (1c), i.e., it is characterized by etherification.

Compound (P)

The phenol derivative (P) used for the etherification reaction can be produced according to the method of R. L. Kidwell et al. (Org. Synth., V, 918 (1973)).

First, a Grignard reagent is prepared from a bromobenzene derivative (P-1). The Grignard reagent is reacted with trialkyl borate to prepare a borate derivative. This is oxidized with a peroxide such as hydrogen peroxide and peracetic acid, whereby the phenol derivative (P) can be produced.

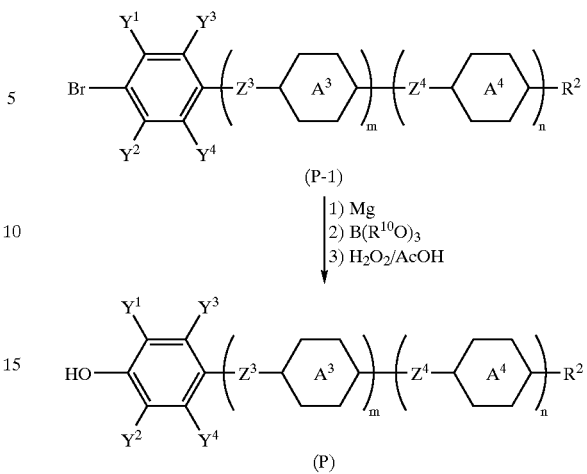

In Formulas, $R^2$, ring $A^3$, ring $A^4$, $Z^3$, $Z^4$, $Y^1$, $Y^2$, $Y^3$, $Y^4$, m and n have the same meanings as defined above, and $R^{10}$ represents an alkyl group.

The phenol derivative (P) can be produced as well according to the methods described in JP-A 62-11716, J. Fluorine Chem., (1994), 67 (1), 41, JP-A 3-246244, JP-A 62-207229 and JP-A 2-34335.

Reaction Conditions

The etherification reaction of the second step can be carried out under conditions of a generally known Williamson reaction.

Preferred bases to be used for the etherification reaction are alkaline metal hydroxides, alkaline metal carbonates, metal alcolates, hydrides of alkaline metals, metal oxides such as silver oxide, and amines. Preferred alkaline metal oxides are potassium hydroxide and sodium hydroxide. Preferred alkaline metal carbonates are potassium carbonate, sodium carbonate, sodium hydrogencarbonate and cesium carbonate. Preferred metal alcolates are sodium methylate, sodium ethylate and potassium t-butoxide. A preferred hydride of alkaline metals is sodium hydride. Preferred metal oxides are barium oxide and silver oxide. Preferred amines are diethylamine and triethylamine. Particularly preferred are the alkaline metal hydroxides and the alkaline metal carbonates which are easy to handle.

An amount of the base used is preferably equivalent to or more than that of the compound (1b). It is more preferably in the range of 2 to 5 equivalents based on that of the compound (1b). The amount in the above range makes it possible to elevate a conversion rate in the reaction.

Any solvents can be used as long as they react with neither the compound (1b) nor the phenol compound (P). Preferably used reaction solvents are ketones, aromatic compounds, aliphatic hydrocarbons, alicyclic hydrocarbons, aliphatic ether compounds, cyclic ether compounds, aprotic polar solvents and water. Preferred ketones are acetone and 2-butanone. Preferred aromatic compounds are benzene and toluene. Preferred aliphatic hydrocarbons are hexane and heptane. A preferred alicyclic hydrocarbon is cyclohexane. Preferred aliphatic ether compounds are diethyl ether, methyl-t-butyl ether, ethylene glycol dimethyl ether and diethylene glycol dimethyl ether. Preferred cyclic ether compounds are THF and dioxane. Preferred aprotic polar solvents are DMF, DMSO, acetonitrile and 1-methyl-2-pyrrolidinone (hereinafter abbreviated as NMP). The etherification reaction can be carried out as well by mixing the solvents described above. Particularly preferred reaction solvents are the aromatic compounds, the cyclic ether compounds and the aprotic polar solvents which can elevate the reaction speed and complete the reaction in short time and which have relatively high boiling points.

An amount of the solvent used is not particularly limited as long as the reaction can be carried out safely and stably. Preferably, it is in the range of 5 to 20 times the weight of the compound (1b).

The reaction temperature is preferably in the range of room temperature to a boiling point of the solvent. It is more preferably in the range of 80 to 130° C. so as not to produce the compound (1a) by elimination of halogen from the compound (1b) and so as to elevate a conversion rate in the etherification reaction.

The reaction time largely depends on the kind of the compound (1b) and the reaction temperature, and it is preferably 1 to 10 hours when carrying out the reaction at a temperature in the range of 80 to 130° C.

In the etherification reaction of the second step, a halide salt or a quaternary ammonium salt may be added to increase the reaction speed. Preferred halide salts are potassium bromide and potassium iodide. Preferred quaternary ammonium,salts are tetraalkylammonium halide and tetraalkylammonium tetrafluoroborate.

An amount of the halide salt or the quaternary ammonium salt used is preferably 0.03 or more equivalent, more preferably 0.05 to 0.3 equivalent based on the compound (1b).

Third Step

The third step is characterized by reducing the compound (1c) by hydrogenation to produce the compound (1d).

Reaction Conditions

The hydrogenation reduction of the third step can be carried out using various metal catalysts described in publications such as S. Nishimura et al., Catalytic Hydrogenation Catalyst (published by Tokyo Kagaku Dojin Co., Ltd.). Metal catalysts preferably comprise the following metals, for example, nickel, cobalt, iron, copper, molybdenum, tungsten, ruthenium, rhodium, platinum, palladium, osmium, rhenium, iridium, chromium, titanium and zirconium. Nickel catalysts and palladium catalysts are particularly preferred. Both are available in the market and easy to obtain and treat. Raney-Ni is available as the nickel base catalyst, and a palladium-carbon catalyst is available as the palladium base catalyst.

An amount of the metal catalyst used is preferably in the range of 1 to 30% by weight based on the compound (1c). More preferably, it is in the range of 3 to 10% by weight so as to efficiently advance the reaction and complete it in short time.

Any solvents can be used as long as they do not react with the compound (1c). Preferably used reaction solvents are aromatic compounds, aliphatic hydrocarbons, alicyclic hydrocarbons, aliphatic ether compounds, cyclic ether compounds and alcohols. Preferred aromatic compounds are benzene and toluene. Preferred aliphatic hydrocarbons are hexane and heptane. A preferred alicyclic hydrocarbon is cyclohexane. Preferred aliphatic ether compounds are diethyl ether, methyl-t-butyl ether, ethylene glycol dimethyl ether and diethylene glycol dimethyl ether. Preferred cyclic ether compounds are THF and dioxane. Preferred alcohols are ethanol and propanol. Particularly preferred reaction solvents are the aromatic compounds and the alcohols which have a large solubility for the compound (1c).

An amount of the solvent used is not particularly limited as long as the reaction can be carried out safely and stably. Preferably, it is in the range of 5 to 20 times the weight of the compound (1c).

The reaction temperature is preferably in the range of room temperature to a boiling point of the solvent. In the case of the compound (1c) wherein at least one of $Y^1, Y^2, Y^3$ and $Y^4$ is substituted with halogen, the reaction temperature is more preferably in the range of 0° C. to room temperature so as not to reduce substituted halogens by hydrogenation. The temperature in the range of 0° C. to room temperature makes it possible to elevate a trans selectivity of the cyclohexane ring.

The hydrogen pressure is preferably in the range of atmospheric pressure to 5 MPa. It is more preferably in the range of 0.1 to 1 MPa so as to elevate a trans selectivity of the cyclohexane ring of the resulting compound (1d) and reduce the reaction time.

The reaction time largely depends on the kind of the compound (1c) and the reaction temperature, and it is preferably 2 to 10 hours when carrying out the reaction at a temperature in the range of 0° C. to room temperature.

The compounds produced in the respective steps for producing the difluoromethyl ether derivative of the present invention can be separated by methods conventionally used in organic synthesis.

For example, water and an organic solvent for extraction are added to the reaction product and stirred. The organic layer is separated, then washed with water, and dried over a desiccating agent, for example, anhydrous sodium sulfate or anhydrous magnesium sulfate. Then, the organic solvent is removed under reduced pressure to give a product as a concentrated residue having a purity of 80% or more. The residue is treated by means of a silica gel chromatography or distilled to give a product having a purity of 90% or more. The product having a purity of 90% or more is recrystallized to obtain a product having a purity of 95% or more.

Reaction (2)

The Reaction (2) is characterized by comprising a first step of reacting the compound (1a) having an α,α-difluorocyclohexylidene group at the terminal with hydrogen halide to produce the compound (1b') and a second step of reacting the compound (1b') with the phenol compound (P) in the presence of a base to produce the compound (1d).

First Step

The first step is characterized by reacting the compound (1a) having an α,α-difluorocyclohexylidene group at the terminal with hydrogen halide to produce the compound (1b').

Compound (1a)

It is the same compound as described in the Reaction (1).

Hydrogen Halide

Hydrogen halide used in the first step is preferably any of hydrogen chloride, hydrogen bromide and hydrogen iodide. Hydrogen bromide is particularly preferred. The reaction may be carried out with commercially available 47% hydrobromic acid and 55% hydroiodic acid.

Reaction Conditions

More preferred reaction solvents are aliphatic ether compounds, cyclic ether compounds or halogenated hydrocarbons which have a large solubility for hydrogen halides and the resulting halogen adducts.

The reaction temperature is not particularly limited as long as stirring can be carried out well. It is preferably in the range of 0° C. to a boiling point of the solvent, depending on the structure of the compound. It is more preferably in the range of room temperature to 80° C. so as to elevate the conversion rate.

The reaction time largely depends on the structure of the compound and the reaction temperature, and the reaction shall be completed in about 6 hours after adding hydrohalogenic acid dropwise.

Second Step
Compound (P)

The compound (P) used in the etherification reaction is the same as the compound (P) described in the second step of the Reaction (1).
Reaction Conditions The etherification reaction in the second step can be carried out under conditions of a generally known Williamson reaction. All conditions for the etherification reaction including a base are the same as those described in the second step of the Reaction (1).

The products produced in the respective steps for producing the difluoromethyl ether derivative of the present invention can be separated by methods conventionally used in organic synthesis.

For example, water and an organic solvent for extraction are added to the reaction product and stirred. The organic layer is separated, then washed with water, and dried over a desiccating agent, for example, anhydrous sodium sulfate or anhydrous magnesium sulfate. Then, the organic solvent is removed under reduced pressure to give a product as a concentrated residue having a purity of 80% or more. The residue is treated by means of a silica gel chromatography or distilled to give a product having a purity of 90% or more. The product having a purity of 90% or more is recrystallized to obtain a product having a purity of 95% or more.
Process (B)

The process for producing the difluoromethyl ether derivative represented by Formula (1d') of the present invention is characterized by using the 1,1-difluorovinyl derivative represented by Formula (1a') as a starting material.

The difluoromethyl ether derivative, which can be produced by the production process (B) of the present invention, is represented by Formula (1d') and referred to as the compound (1d').

The production process (B) of the present invention include Reaction (3) comprising a first step of reacting the compound (1a') having a 1,1-difluorovinyl group at the terminal with halogen to produce the compound (1b"), a second step of reacting the compound (1b") with the phenol compound (P) in the presence of a base to produce the compound (1c') and a third step of reducing the compound (1c') by hydrogenation to produce the compound (1d'), and Reaction (4) comprising a first step of reacting the compound (1a') having a 1,1-difluorovinyl group at the terminal of reacting with halogen halide to produce the compound (1b'") and a second step of reacting the compound (1b'") with the phenol compound (P) in the presence of a base to produce the compound (1d').
Reaction (3)

The Reaction (3) is characterized by comprising a first step in which the compound (1a') having a 1,1-difluorovinyl group at the terminal is reacted with halogen to produce the compound (1b"), a second step in which the compound (1b") is reacted with the phenol compound (P) in the presence of a base to produce the compound (1c') and a third step in which the compound (1c') is reduced by hydrogenation to produce the compound (1d').
First Step The first step is characterized by reacting the compound (1a') having a 1,1-difluorovinyl group at the terminal with halogen to produce the compound (1b").
Compound (1a')

The compound (1a') is characterized by having a 1,1-difluorovinyl group at the terminal.

The compound (1a'), which is a starting material in the process (B) for producing the difluoromethyl ether derivative of the present invention, can easily be produced by a person skilled in the art. It can readily be produced, for example, by reacting difluoromethylene-tris(dialkylamino) phosphorane with an aldehyde derivative (1') according to the methods described in Douglas G. Naae and Donald J. Burton, Synth. Commun., 3 (3), 197 (1973) and Sei-ichi Hayashi et al., Chem. Lett., 1979, 983.

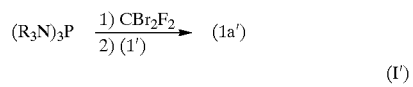

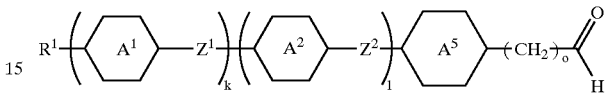

In Formula, $R^1$, rings $A^1$, $A^2$ and $A^5$, $Z^1$, $Z^2$, k, l and o have the same meanings as defined above, and R represents an alkyl group.

The aldehyde derivative (1') can readily be obtained as a commercial product or according to the methods described in organic synthetic publications such as New Experimental Chemistry Course (published by Maruzen Co., Ltd.).

Further, the compound (1a') can readily be produced as well by reacting difluoromethylene-triphenylphosphorane with the aldehyde derivative (1') according to the methods described in S. A. Fuqua, W. G. Duncan, R. M. Silverstein, Org. Synth., Coll. Vol. V, 390 (1973) and JP-A 1-175947. Difluoromethylenetriphenyl-phosphorane can be prepared from sodium chlorodifluoro acetate and triphenylphosphine.
Halogen Halogen used in the first step is preferably any of chlorine, bromine and iodine. In particular, bromine is preferred.
Reaction Conditions Any solvent can be used as long as it does not react with any of the compound (1a'), chlorine, bromine and iodine. The reaction solvents are the same as those preferably used in the first step of the Reaction (1) in the process (A) described above. An amount of the solvent used, the reaction temperature, an amount of halogen used and the reaction time are the same as well.
Second Step The second step is characterized by reacting the compound (1b") with the phenol compound (P) in the presence of a base to produce the compound (1c'), i.e., it is characterized by etherification.
Compound (P)

The phenol derivative (P) used for the etherification reaction is the same as that described in the second step of the Reaction (1) in the process (A).
Reaction Conditions The etherification reaction of the second step can be carried out under conditions of a generally known Williamson reaction. All conditions for the etherification reaction including a base are the same as those described in the second step of the Reaction (1) in the process (A).
Third Step The third step is characterized by reducing the compound (1c') by hydrogenation to produce the compound (1d').
Reaction Conditions The catalyst used, an amount thereof, the reaction solvent and an amount thereof in the hydrogenation reduction of the third step are the same as described in the third step of the Reaction (1) in the process (A).

The reaction temperature is preferably in the range of room temperature to a boiling point of the solvent. In the case of the compound (1c') wherein at least one of $Y^1$, $Y^2$, $Y^3$ and $Y^4$ is substituted with halogen, the reaction temperature is more preferably in the range of 0° C. to room temperature so as not to reduce substituted halogens by hydrogenation.

The reaction time largely depends on the kind of the compound (1c') and the reaction temperature, and it is preferably 2 to 10 hours when carrying out the reaction at a temperature in the range of 0° C. to room temperature.

The compounds produced in the respective steps for producing the difluoromethyl ether derivative of the present invention can be separated by methods conventionally used in organic synthesis.

For example, water and an organic solvent for extraction are added to the reaction product and stirred. The organic layer is separated, then washed with water, and dried over a desiccating agent, for example, anhydrous sodium sulfate or anhydrous magnesium sulfate. Then, the organic solvent is removed under reduced pressure to give a product as a concentrated residue having a purity of 80% or more. The residue is treated by means of a silica gel chromatography or distilled to give a product having a purity of 90% or more. The product having a purity of 90% or more is recrystallized to obtain a product having a purity of 95% or more.

Reaction (4)

The Reaction (4) is characterized by comprising a first step of reacting the compound (1a') having a 1,1-difluorovinyl group at the terminal with hydrogen halide to produce the compound (1b''') and a second step of reacting the compound (1b''') with the phenol compound (P) in the presence of a base to produce the compound (1d').

First Step

The first step is characterized by reacting the compound (1a') having a 1,1-difluorovinyl group at the terminal with hydrogen halide to produce the compound (1b''').

Compound (1a')

It is the same compound as described in the Reaction (3).

Hydrogen Halide

Hydrogen halide used in the first step is preferably any of hydrogen chloride, hydrogen bromide and hydrogen iodide. In particular, hydrogen bromide is preferred. The reaction may be carried out with commercially available 47% hydrobromic acid and 55% hydroiodic acid.

Reaction Conditions

More preferred reaction solvents are aliphatic ether compounds, cyclic ether compounds or halogenated hydrocarbons which have a large solubility for hydrogen halides and the resulting halogen adducts.

The reaction temperature is not particularly limited as long as stirring can be carried out well. It is preferably in the range of 0° C. to a boiling point of the solvent, depending on the structure of the compound. It is more preferably in the range of room temperature to 80° C. so as to elevate the conversion rate.

The reaction time largely depends on the structure of the compound and the reaction temperature, and the reaction shall be completed in about 6 hours after adding hydrohalogenic acid dropwise.

Second Step

The second step is characterized by reacting the compound (1b''') with the phenol compound (P) in the presence of a base to produce the compound (1d').

Compound (P)

The compound (P) used in the etherification reaction is the same as that described in the second step of the Reaction (1) in the process (A).

Reaction Conditions

The etherification reaction of the second step can be carried out under conditions of a generally known Williamson reaction. All conditions for the etherification reaction including a base are the same as those described in the second step of the Reaction (1) in the process (A).

The compounds produced in the respective steps for producing the difluoromethyl ether derivative of the present invention can be separated by methods conventionally used in organic synthesis.

For example, water and an organic solvent for extraction are added to the reaction product and stirred. The organic layer is separated, then washed with water, and dried over a desiccating agent, for example, anhydrous sodium sulfate or anhydrous magnesium sulfate. Then, the organic solvent is removed under reduced pressure to give a product as a concentrated residue having a purity of 80% or more. The residue is treated by means of a silica gel chromatography or distilled to give a product having a purity of 90% or more. The product having a purity of 90% or more is recrystallized to obtain a product having a purity of 95% or more.

Liquid Crystalline Compound (1c')

The liquid crystalline compound represented by Formula (1c') of the present invention has a 1,1-difluoro-propenyloxy group as a bonding group. Various excellent physical properties are shown according to the kind of a ring structure connected directly to the bonding group and the kind of a substituent.

The above compound is classified into the group of compounds represented by the following Formulas (1c'-1) to (1c'-6) by suitably selecting k, l, m and n.

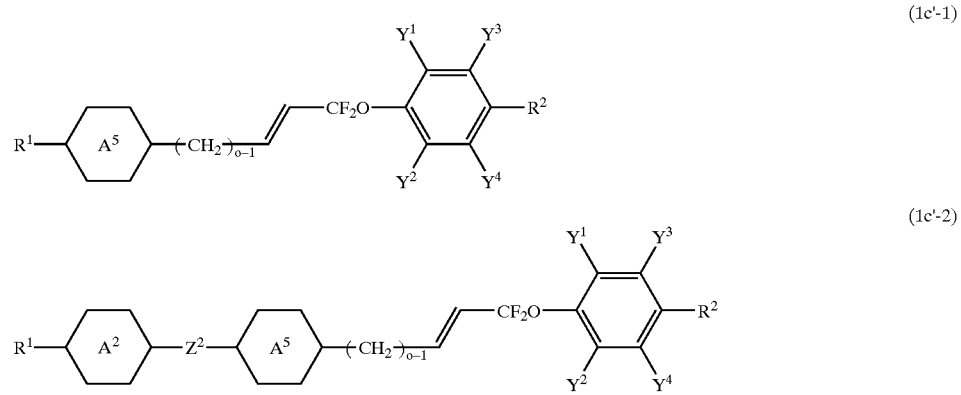

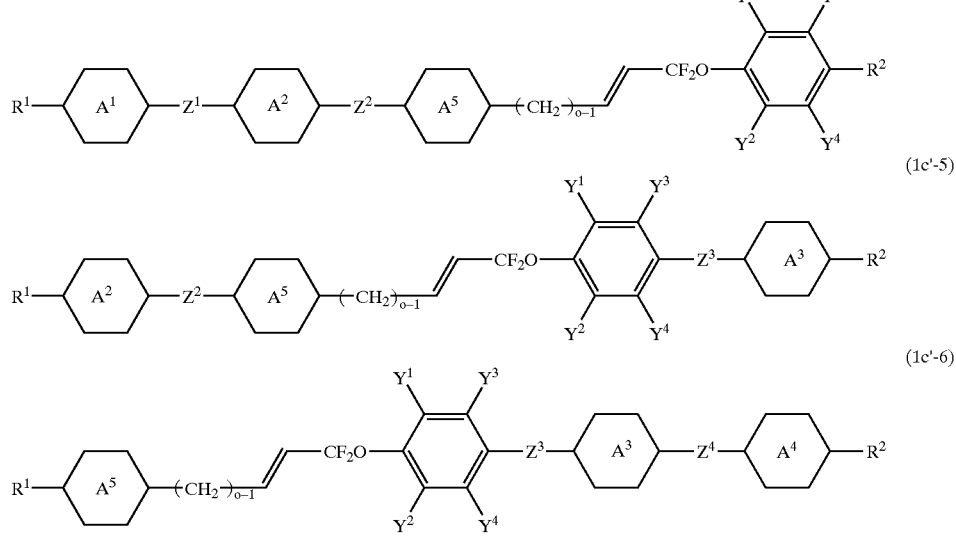

(1c'-3)

(1c'-4)

(1c'-5)

(1c'-6)

In Formulas, $R^1$, $R^2$, rings $A^1$, $A^2$, $A^3$, $A^4$ and $A^5$, $Z^1$, $Z^2$, $Z^3$, $Z^4$, $Y^1$, $Y^2$, $Y^3$, $Y^4$ and o have the same meanings as defined above.

Among these compounds of more specific concept, a compound of two-ring system represented by Formula (1c'-1) has a relatively large absolute value of $\Delta\epsilon$ and shows a relatively small $\Delta n$, and it has a low viscosity and a good compatibility at low temperature. When this compound is used as a component for a liquid crystal composition, a viscosity of the composition can be reduced while maintaining an absolute value of $\Delta\epsilon$ thereof, and therefore, a liquid crystal composition for high-speed response can be provided. Also, a compound of three-ring system represented by Formula (1c'-2) or (1c'-3) has a large absolute value of $\Delta\epsilon$, and it shows a liquid crystal phase in a relatively wide temperature range. This compound as a component for a liquid crystal composition can elevate an absolute value of $\Delta\epsilon$ of the composition without lowering a clearing point thereof, and therefore, it can provide a liquid crystal composition for driving a display element at a low voltage. Further, compounds of four-ring system represented by Formulas (1c'-4) to (1c'-6) have a large absolute value of $\Delta\epsilon$ and show a relatively large $\Delta n$, and they show a liquid crystal phase in the wide temperature range. When this compound is used as a component for a liquid crystal composition, an absolute value of $\Delta\epsilon$ can be increased, and a liquid crystal phase temperature range shown by the liquid crystal composition can be extended to a high temperature range.

The compound (1c') wherein ring $A^5$ is a 1,4-cyclohexylene group has a relatively large absolute value of $\Delta\epsilon$, a relatively low $\Delta n$ and a high clearing point. The compound wherein ring $A^5$ is a 1,4-phenylene group in which hydrogen on the ring may be substituted with fluorine has a large absolute value of $\Delta\epsilon$, a relatively high $\Delta n$ and a low viscosity.

The compound (1c') wherein both $Y^1$ and $Y^2$ are hydrogen And at least one of $Y^3$ and $Y^4$ is fluorine or a cyano group shows a positive dielectric anisotropy. In particular, the compound wherein $R^2$ is fluorine, a fluoro-substituted alkyl group, a fluoro-substituted alkoxy group or a cyano group shows a remarkably large positive dielectric anisotropy. On the other hand, the compound wherein both $Y^2$ and $Y^4$ are hydrogen, both $Y^1$ and $Y^3$ are fluorine or cyano groups and $R^2$ is a substituent other than halogen and a cyano group shows a negative dielectric anisotropy.

In the compound (1c'), a bonding group wherein o is any integer of 1 to 10 is preferred as the bonding group having a 1,1-difluoro-propenyloxy group as a moiety. Bonding groups represented by the following Formulas wherein o is 1, 3 or 5 are particularly preferred from viewpoints of a viscosity and a liquid crystal phase temperature range.

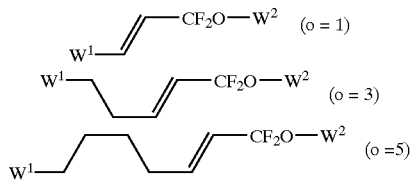

-continued

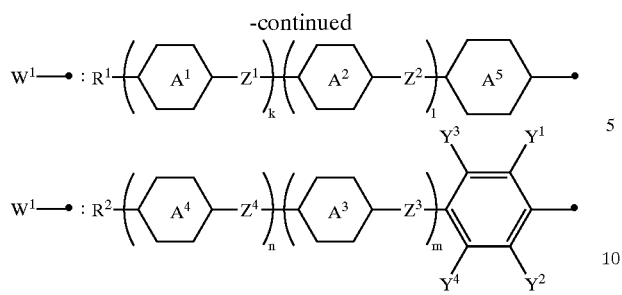

In Formulas, $R^1$, $R^2$, rings $A^1$, $A^2$, $A^3$, $A^4$ and $A^5$, $Z^1$, $Z^2$, $Z^3$, $Z^4$, $Y^1$, $Y^2$, $Y^3$, $Y^4$, k, l, m and n have the same meanings as defined above.

Liquid Crystal Composition Comprising Liquid Crystalline Compound (1c') as a First Component The liquid crystal composition according to the present invention preferably comprises at least one liquid crystalline compound represented by Formula (1) in the proportion of 0.1 to 99% by weight in order to show excellent characteristics.

The liquid crystal composition of the present invention may comprise only the first component, i.e., at least one liquid crystalline compound represented by Formula (1). Preferably, the composition may further comprise as a second component at least one compound (hereinafter referred to as second component A) selected from the group consisting of the compounds represented by Formulas (2), (3) and (4) described above and/or at least one compound (hereinafter referred to as second component B) selected from the group consisting of the compounds represented by Formulas (5) and (6). Further, the composition can comprise at least one compound selected from the group consisting of the compounds represented by Formulas (7), (8) and (9) as a third component for the purpose of controlling a threshold voltage, a liquid crystal temperature range, a refractive anisotropy, a dielectric anisotropy, a viscosity, etc. The respective components of the liquid crystal composition used for the present invention make little difference in physical properties, and therefore, they may be analogues comprising isotopes of the respective elements.

Second Component A: Compounds (2), (3) and (4)

Among the compounds represented by Formulas (2), (3) and (4) as the second component A described above, preferable examples are the following compounds of Formulas (2-1) to (2-9), (3-1) to (3-97) and (4-1) to (4-33), respectively.

(2-1)
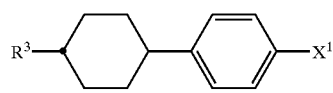

(2-2)
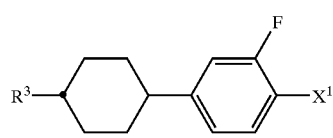

(2-3)
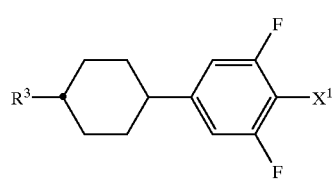

(2-4)
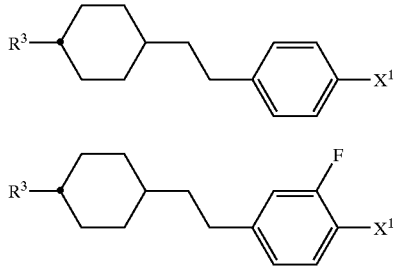

(2-5)
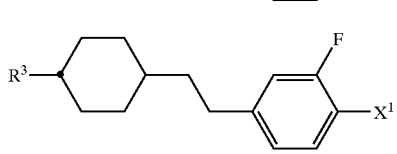

(2-6)
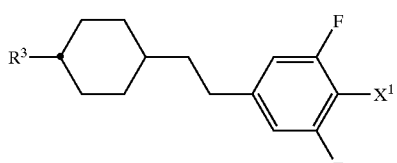

(2-7)
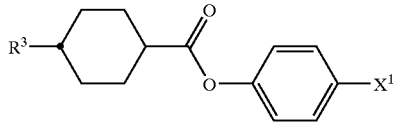

(2-8)
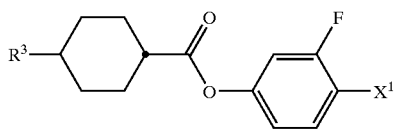

(2-9)
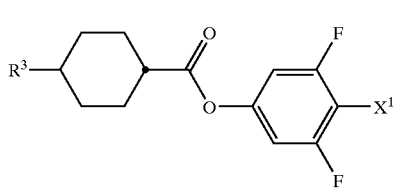

(3-1)
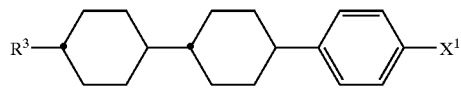

(3-2)
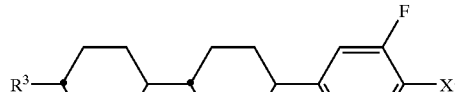

(3-3)
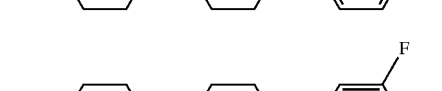

(3-4)
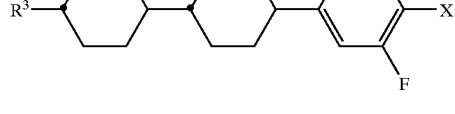

(3-5)
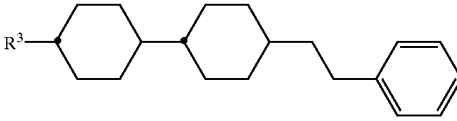

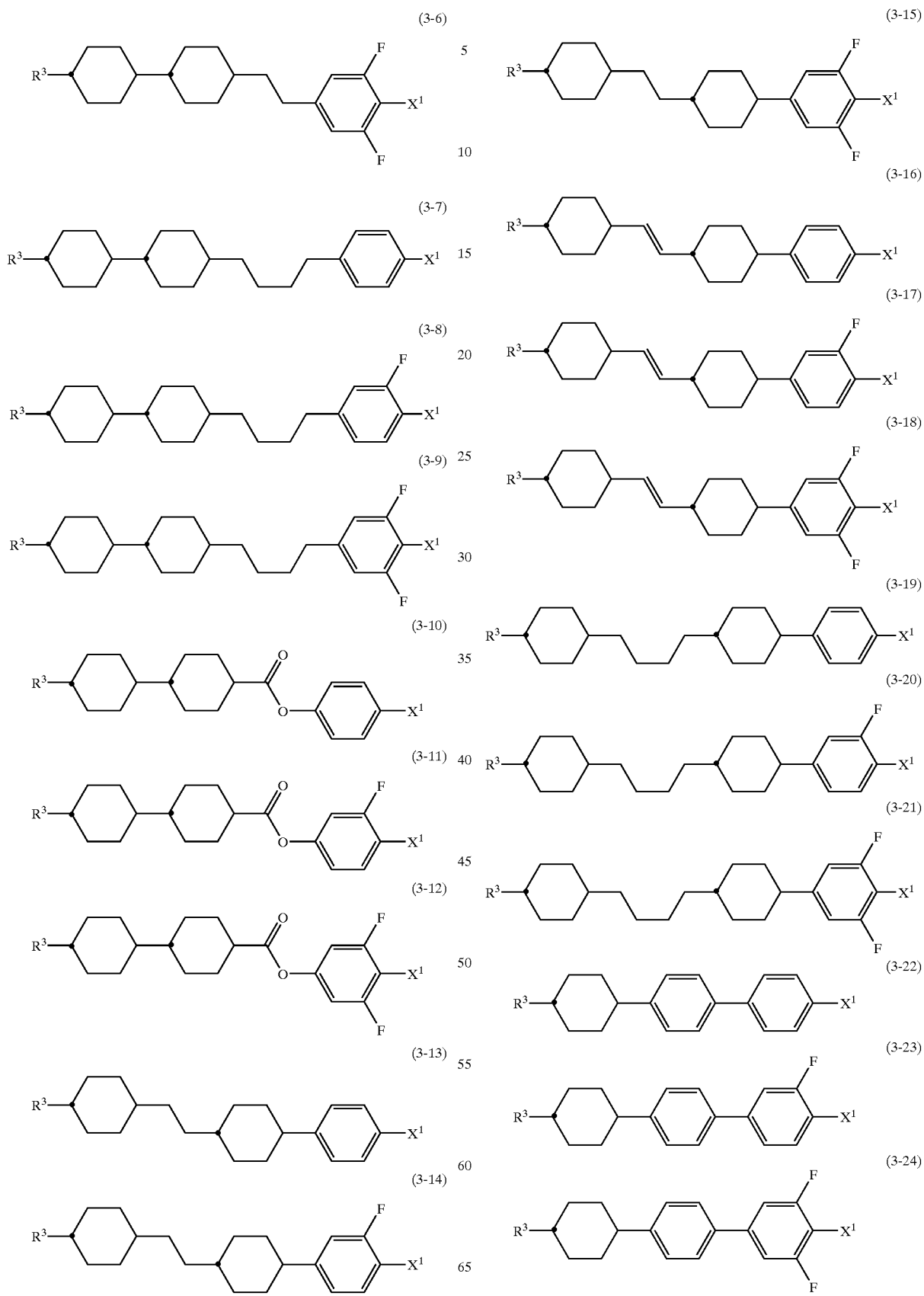

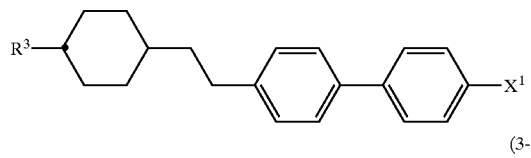
(3-25)
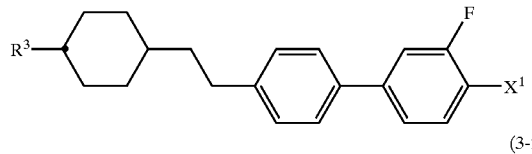
(3-26)
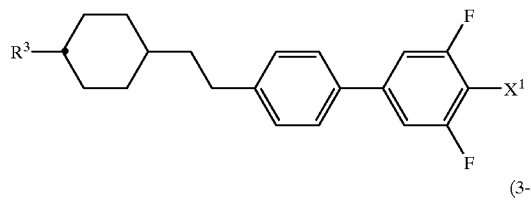
(3-27)
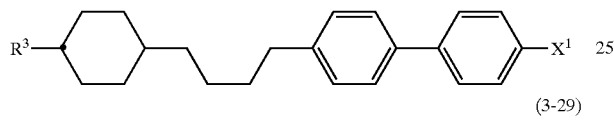
(3-28)
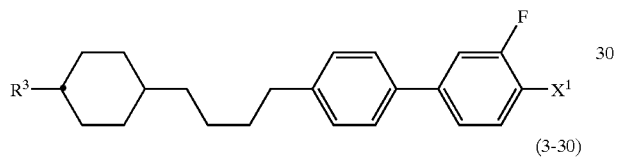
(3-29)
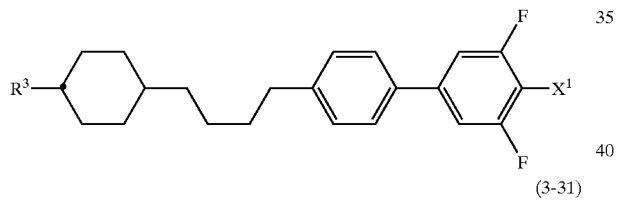
(3-30)
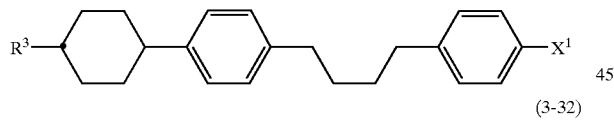
(3-31)
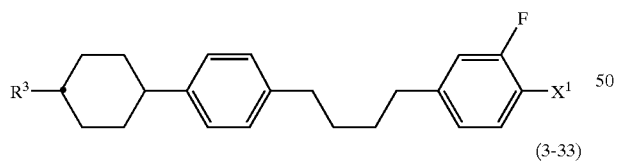
(3-32)
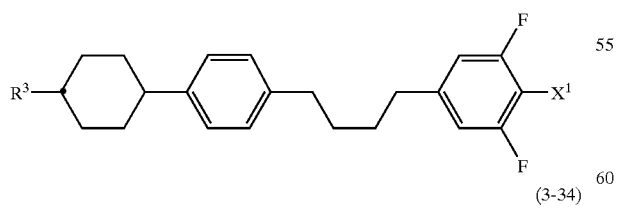
(3-33)
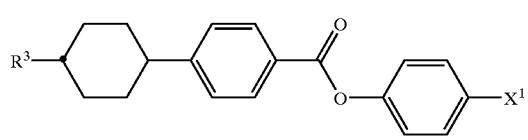
(3-34)
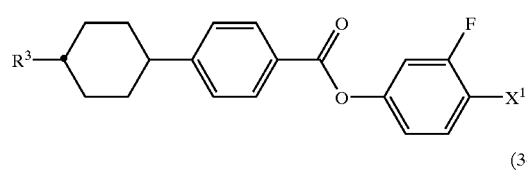
(3-35)
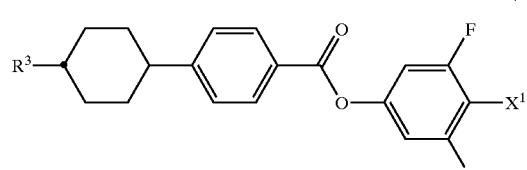
(3-36)
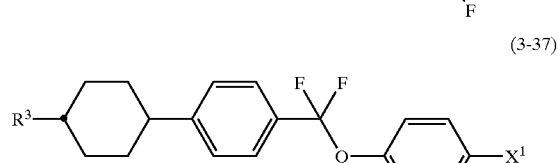
(3-37)
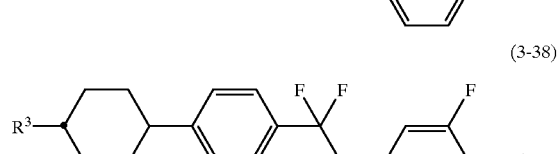
(3-38)
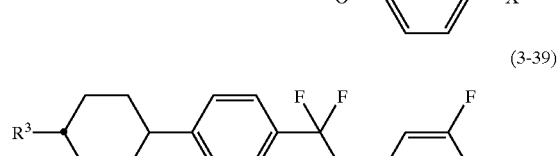
(3-39)
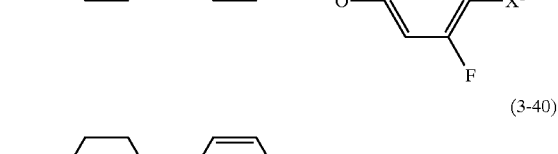
(3-40)
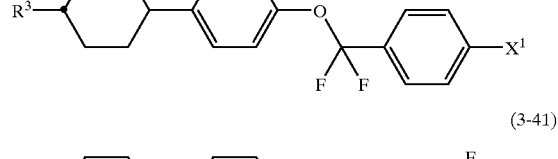
(3-41)
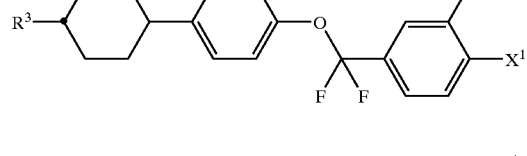
(3-42)
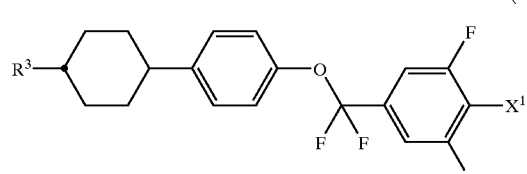
(3-43)

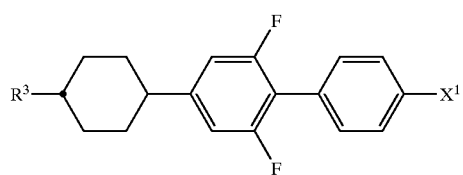
(3-44)
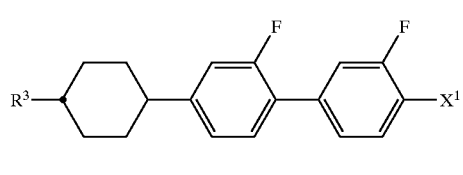
(3-45)
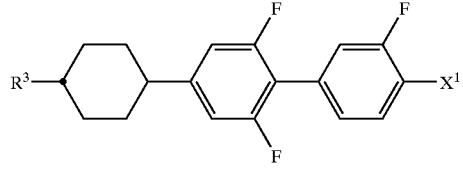
(3-46)
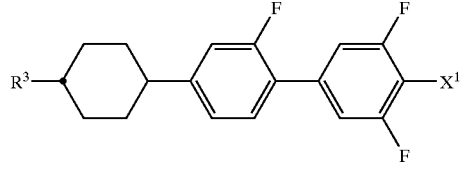
(3-47)
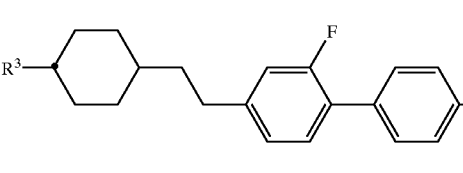
(3-48)
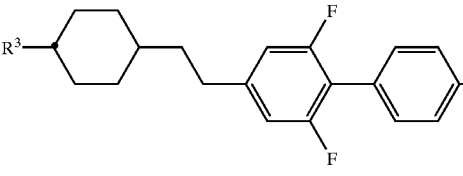
(3-49)
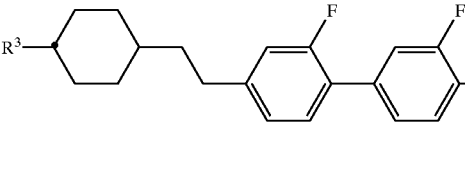
(3-50)
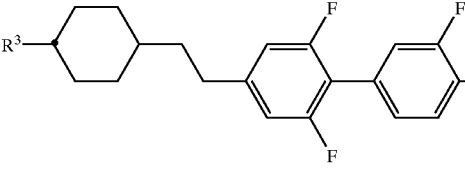
(3-51)
(3-52)
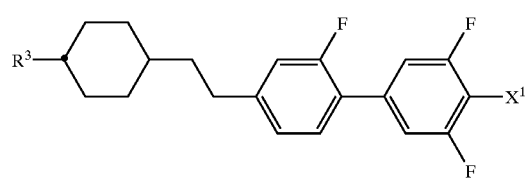
(3-53)
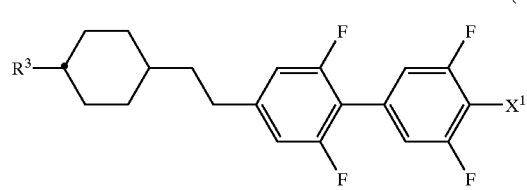
(3-54)
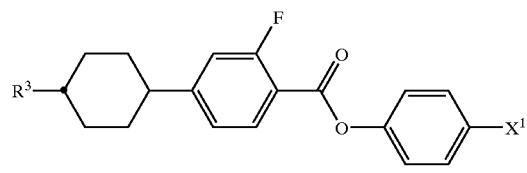
(3-55)
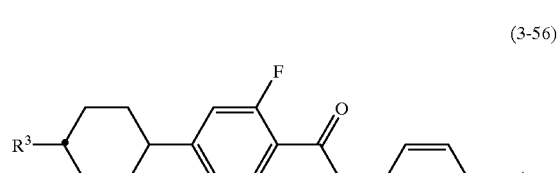
(3-56)
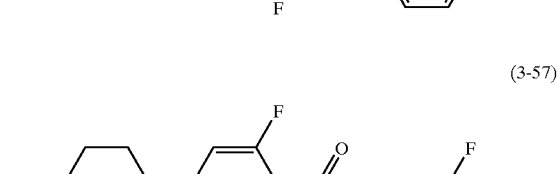
(3-57)
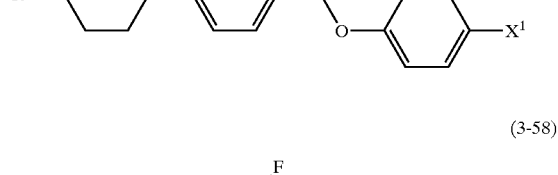
(3-58)
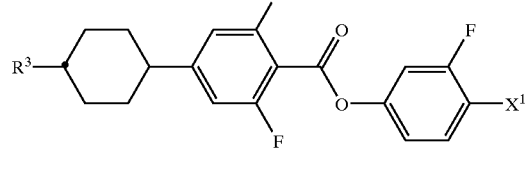
(3-59)
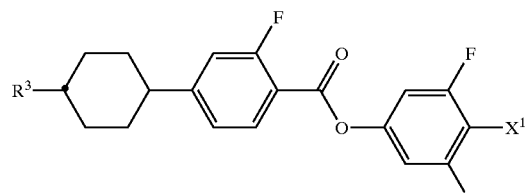

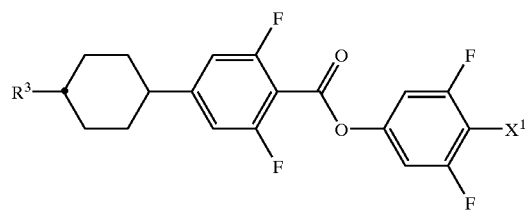
(3-60)
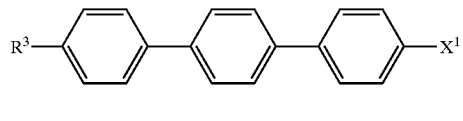
(3-61)
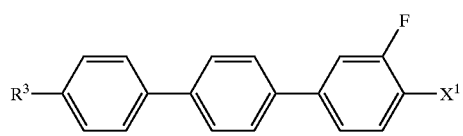
(3-62)
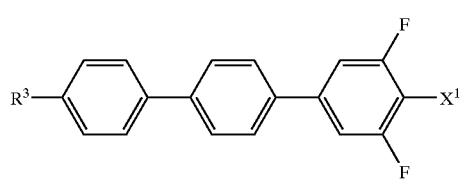
(3-63)
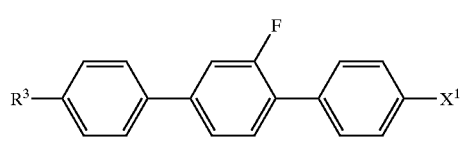
(3-64)
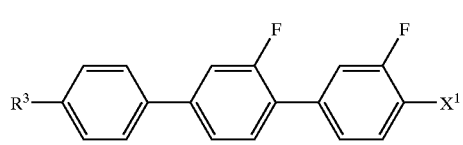
(3-65)
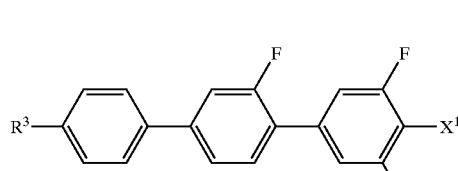
(3-66)
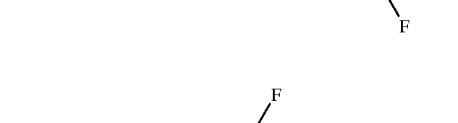
(3-67)
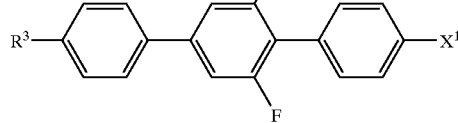
(3-68)
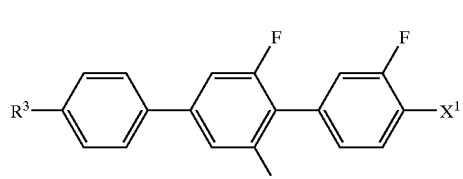
(3-68)
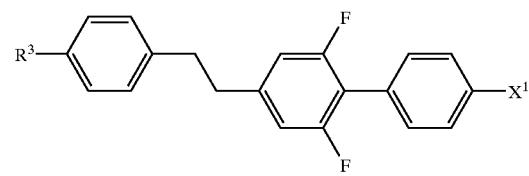
(3-68)
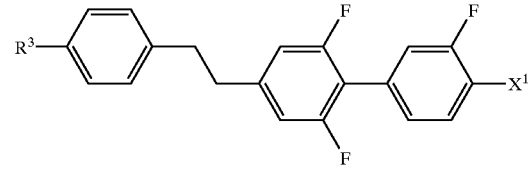
(3-70)
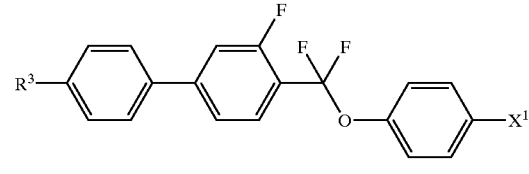
(3-71)
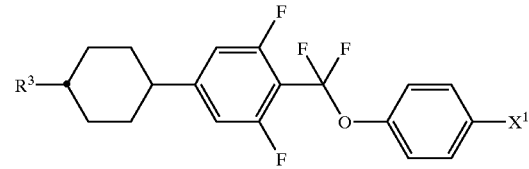
(3-72)
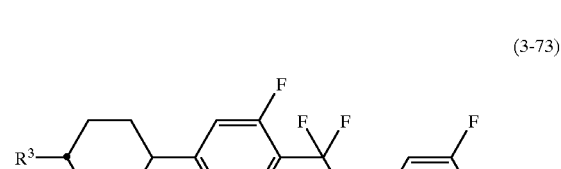
(3-73)
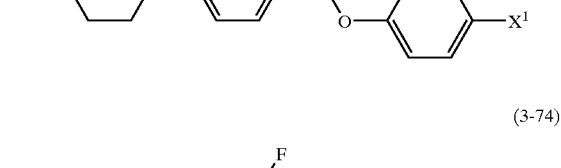
(3-74)
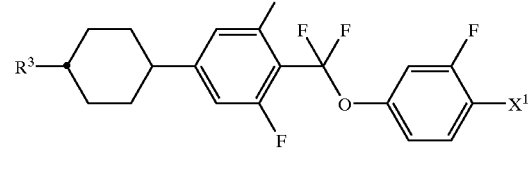
(3-75)
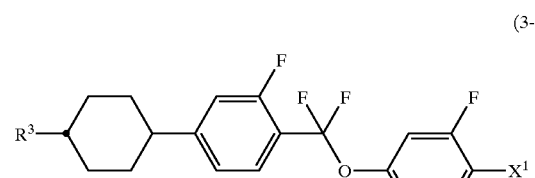

(3-76) 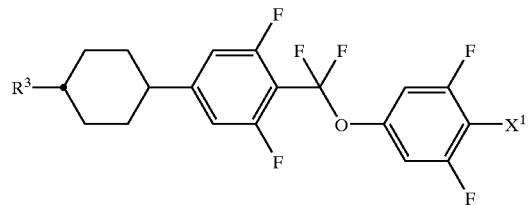
(3-77) 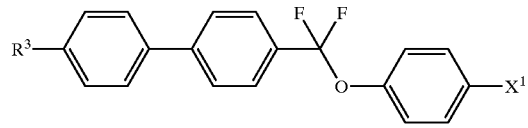
(3-78) 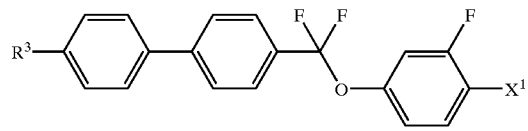
(3-79) 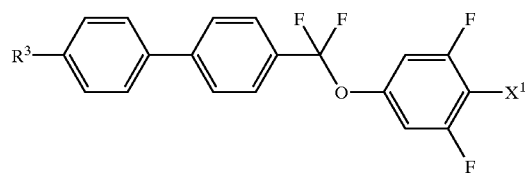
(3-80) 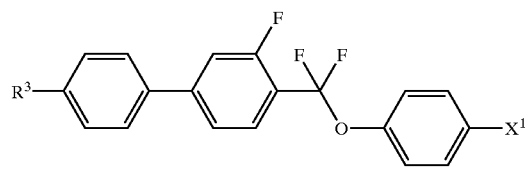
(3-81) 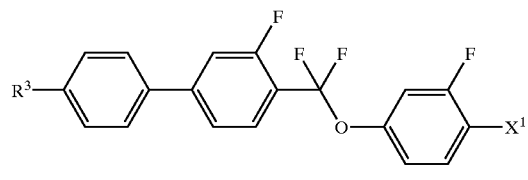
(3-82) 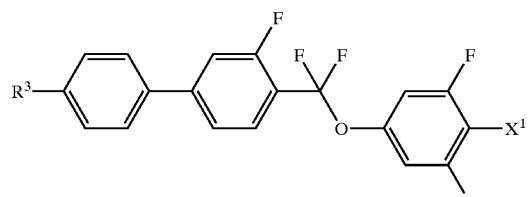
(3-83) 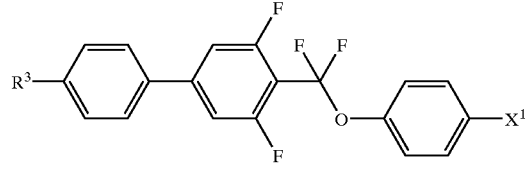
(3-84) 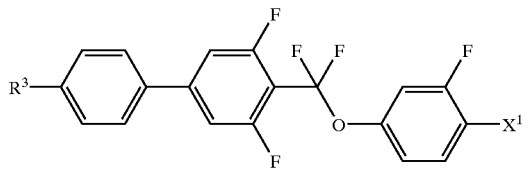
(3-85) 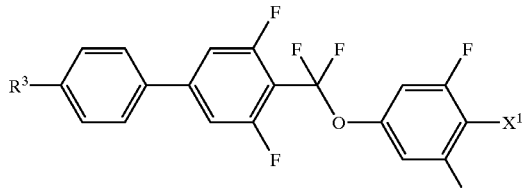
(3-86) 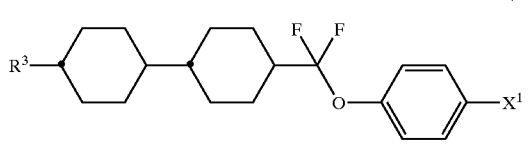
(3-87) 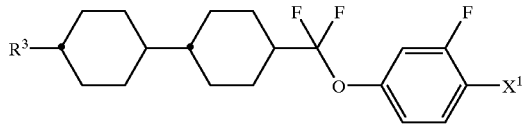
(3-88) 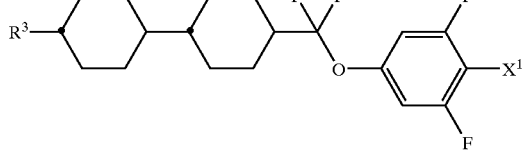
(3-89) 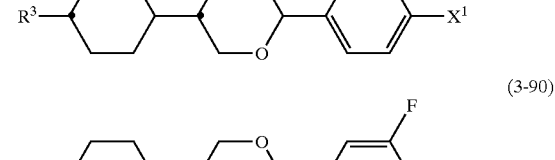
(3-90) 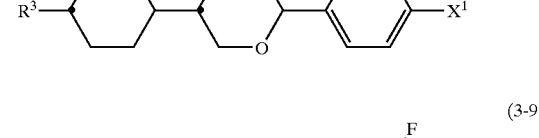
(3-91) 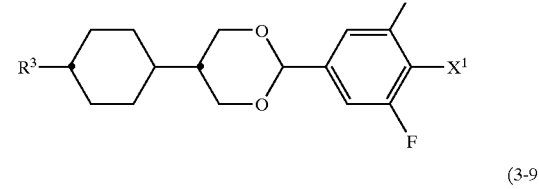
(3-92) 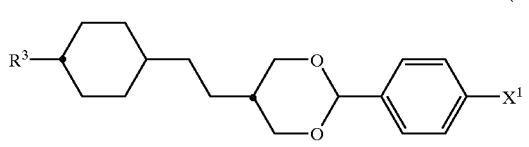

(Chemical structure diagrams, compounds 3-93 through 4-14)

(4-15)
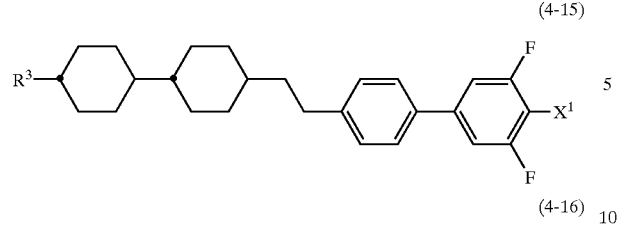
(4-16)
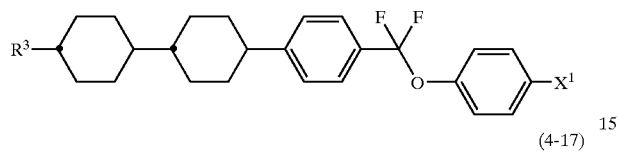
(4-17)
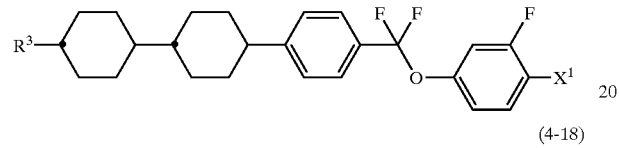
(4-18)
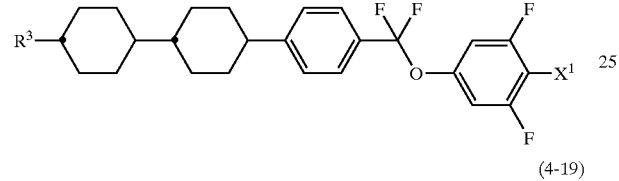
(4-19)
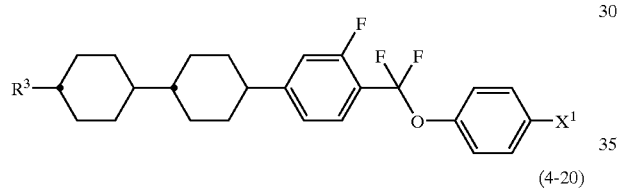
(4-20)
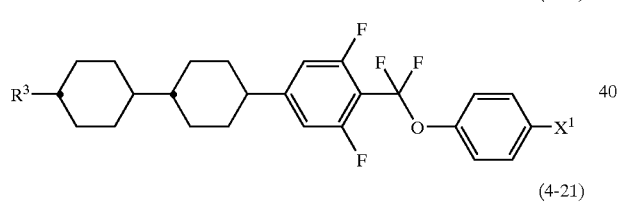
(4-21)
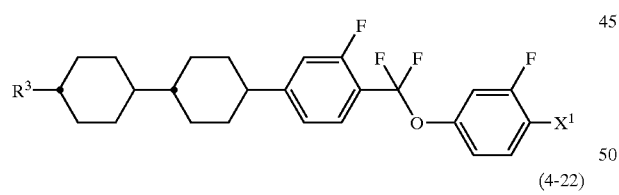
(4-22)
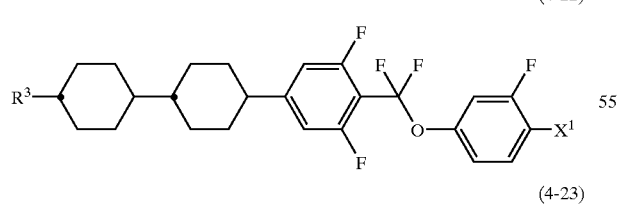
(4-23)
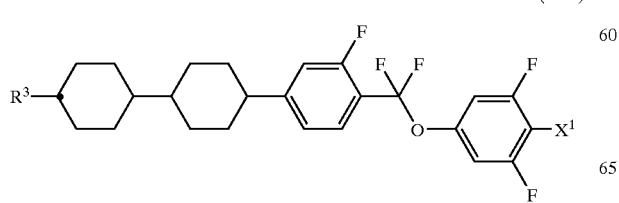
(4-24)
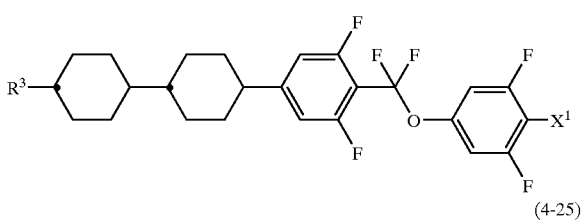
(4-25)
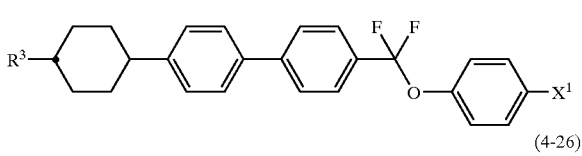
(4-26)
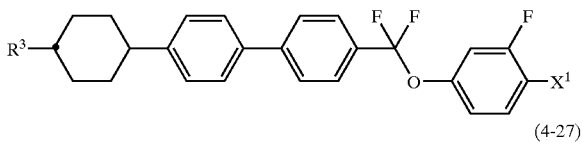
(4-27)
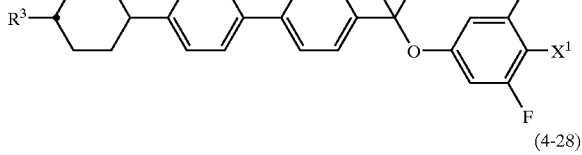
(4-28)
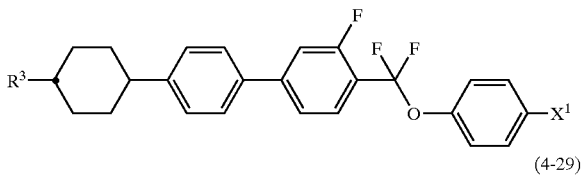
(4-29)
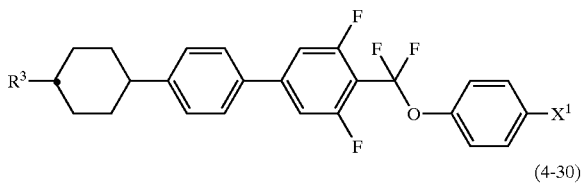
(4-30)
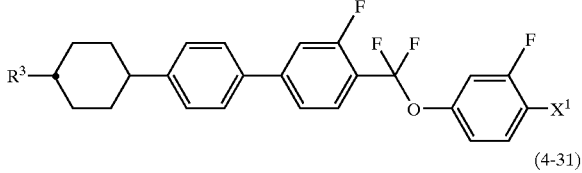
(4-31)
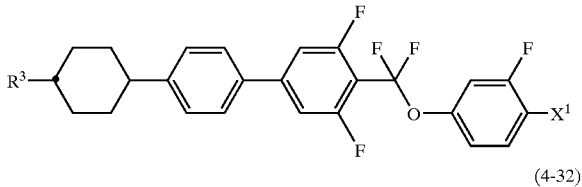
(4-32)
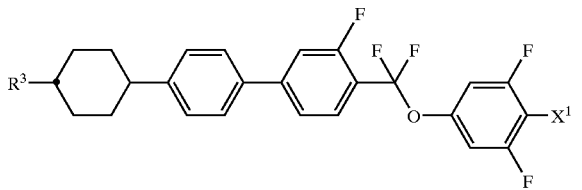

(4-33)

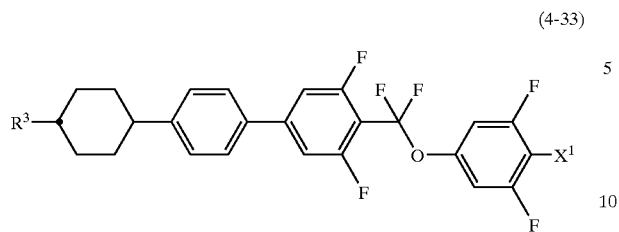

In Formulas, $R^3$ and $X^1$ have the same meanings as defined above.

These compounds represented by Formulas (2) to (4) show a positive dielectric anisotropy and are very excellent in heat stability and chemical stability, so that they are used primarily for liquid crystal compositions for TFT. When preparing a liquid crystal composition for TFT, an amount of the above compounds may preferably be in the range of 1 to 99% by weight, more preferably 10 to 97% by weight and further preferably 40 to 95% by weight based on the total amount of the liquid crystal composition. The compounds represented by Formulas (10) to (12) may further be added for the purpose of controlling the viscosity.

Second Component B: Compounds (5) and (6)

Among the compounds represented by Formulas (5) and (6) as the second component B described above, preferable examples are the following compounds of Formulas (5-1) to (5-58) and (6-1) to (6-3), respectively.

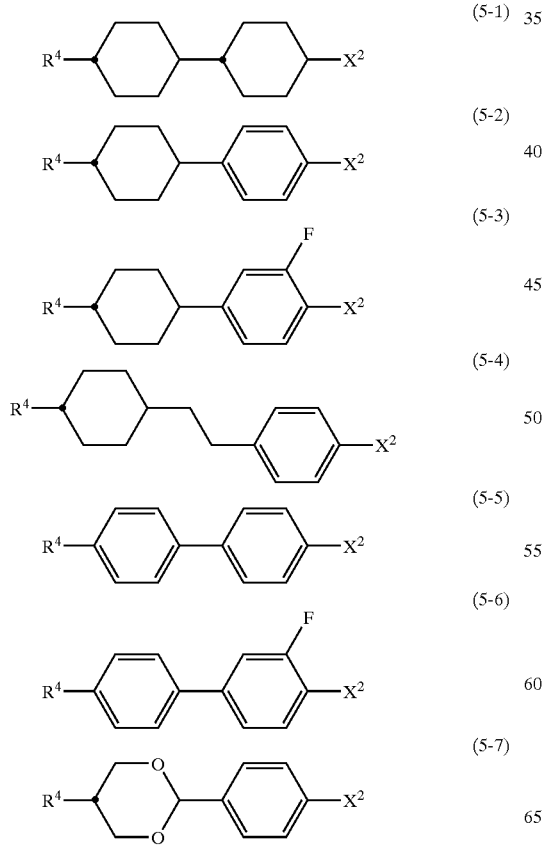

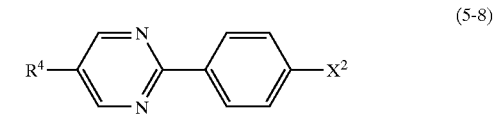

(5-8)

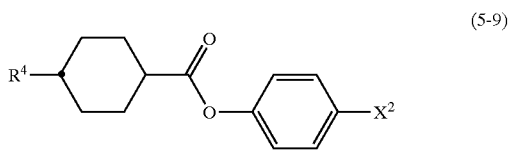

(5-9)

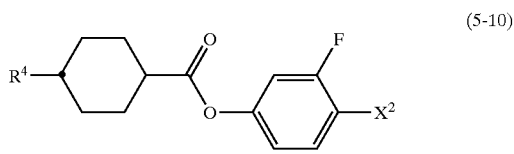

(5-10)

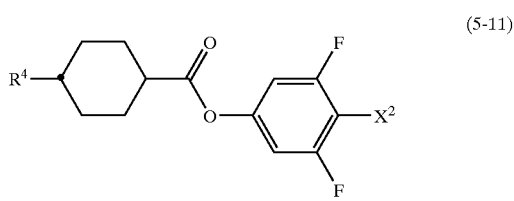

(5-11)

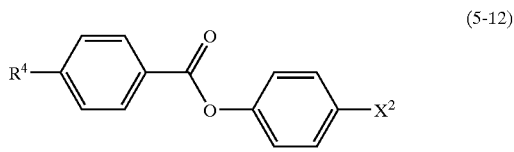

(5-12)

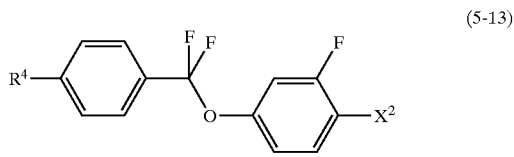

(5-13)

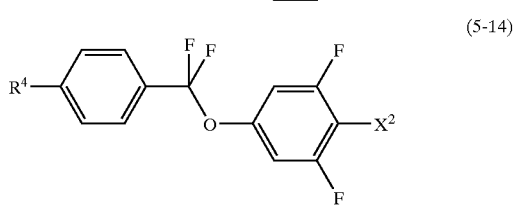

(5-14)

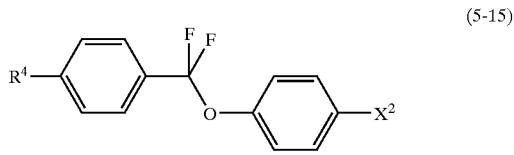

(5-15)

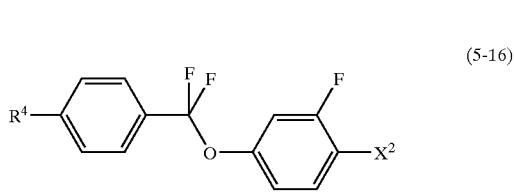

(5-16)

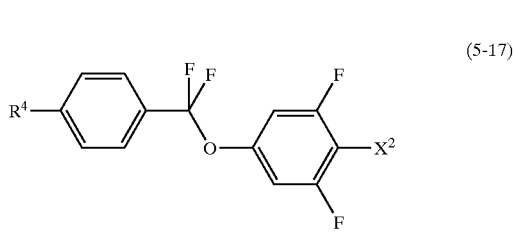

(5-17)

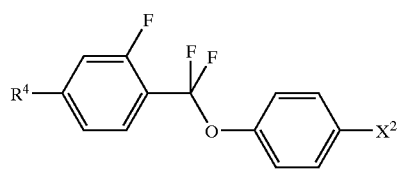 (5-18)
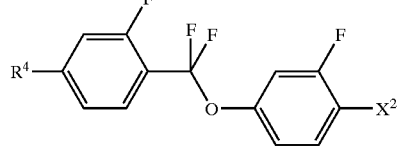 (5-19)
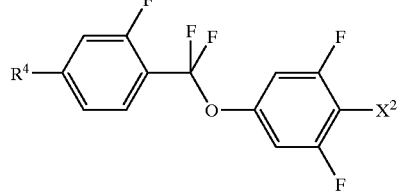 (5-20)
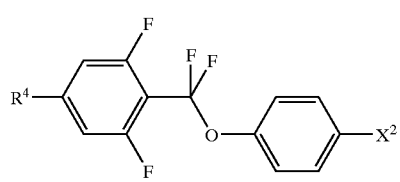 (5-21)
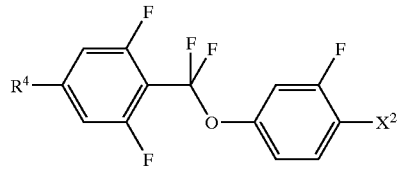 (5-22)
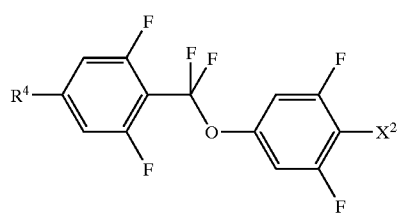 (5-23)
 (5-24)
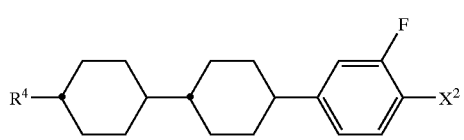 (5-25)
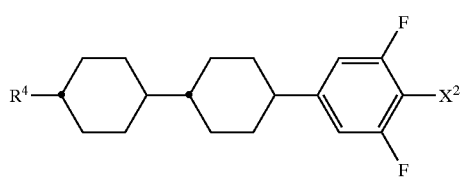 (5-26)
 (5-27)
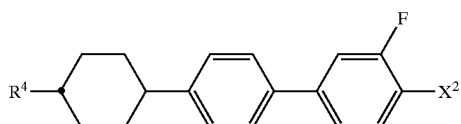 (5-28)
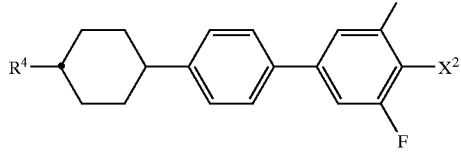 (5-29)
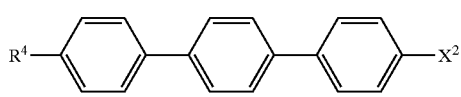 (5-30)
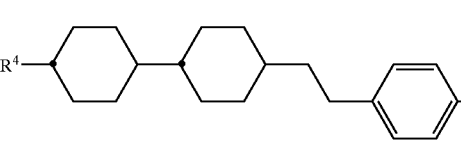 (5-31)
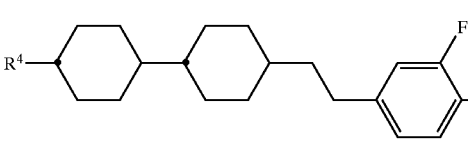 (5-32)
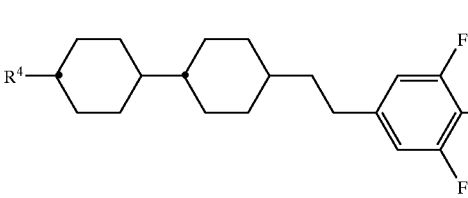 (5-33)
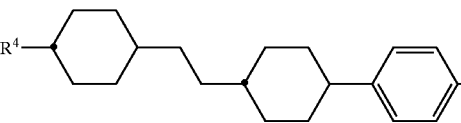 (5-34)
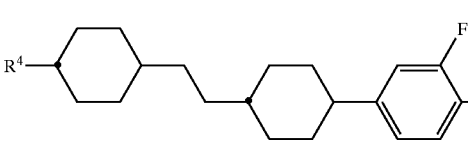 (5-35)
(5-36)

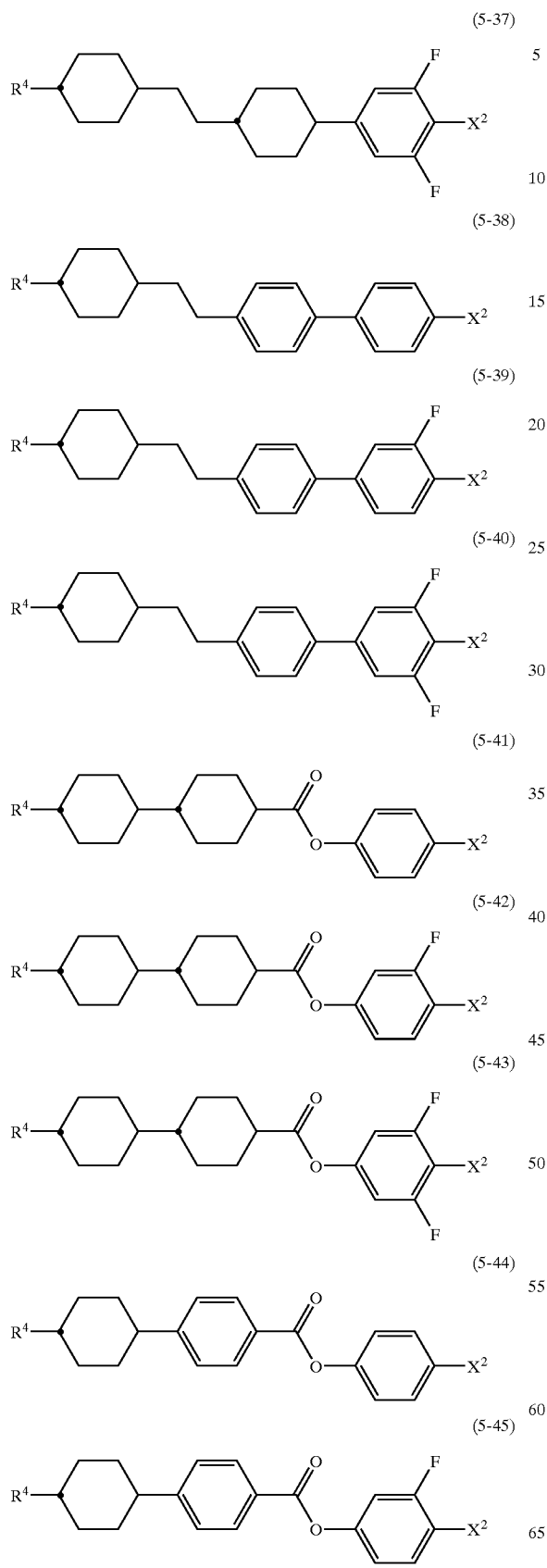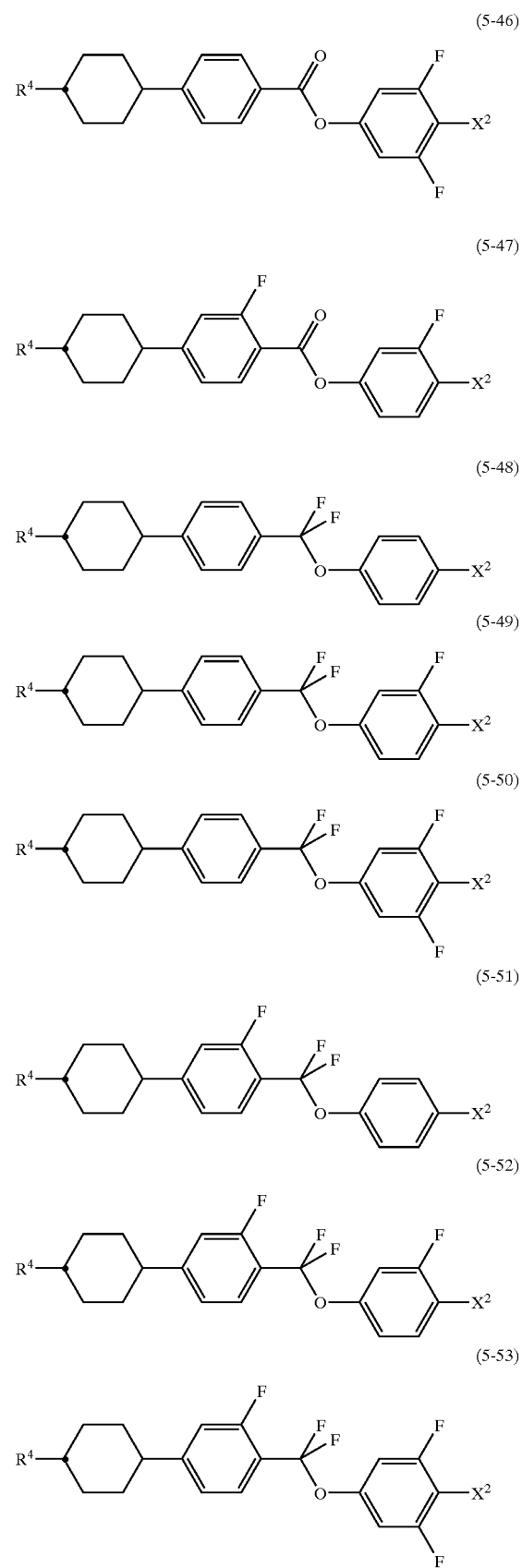

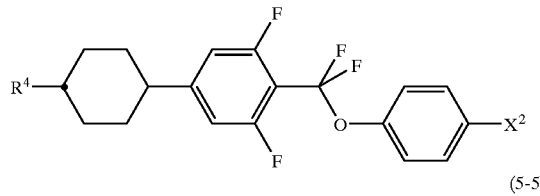
(5-54)

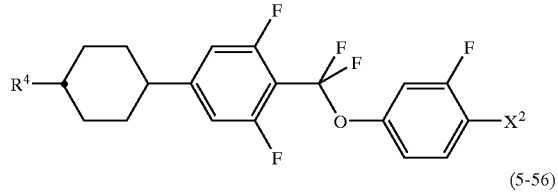
(5-55)

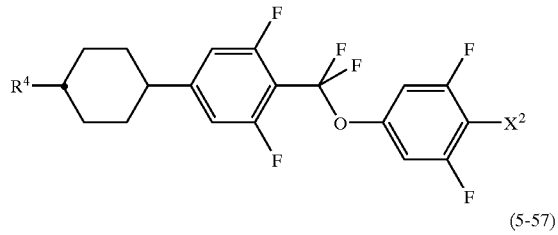
(5-56)

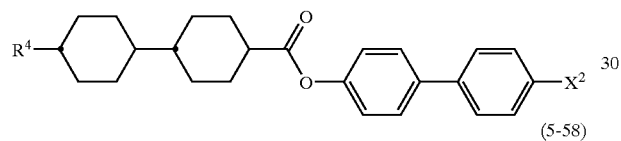
(5-57)

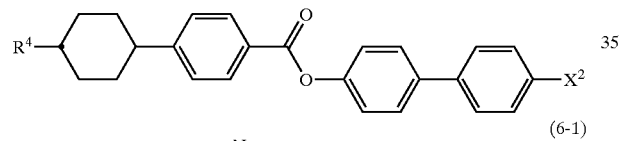
(5-58)

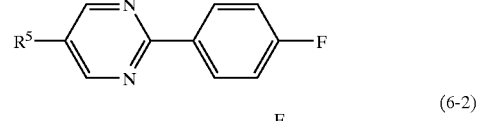
(6-1)

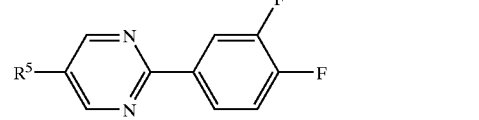
(6-2)

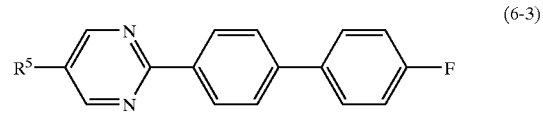
(6-3)

In Formulas, $R^4$, $R^5$ and $X^2$ have the same meanings as defined above.

These compounds represented by Formulas (5) and (6) have a positive dielectric anisotropy, and a value thereof is very large, so that they are used mainly for liquid crystal compositions for STN and TN. These compounds are used as a component of the composition particularly for the purpose of reducing a threshold voltage. Further, they are used for the purposes of controlling the viscosity and the refractive anisotropy, expanding the liquid crystal phase temperature range, and also improving the steepness. When preparing a liquid crystal composition for STN or TN, an amount of the compounds of the Formulas (5) and (6) may preferably be in the range of 0.1 to 99.9% by weight, more preferably 10 to 97% by weight and further preferably 40 to 95% by weight. A third component described later can be mixed for the purpose of controlling the threshold voltage, the liquid crystal phase temperature range, the refractive anisotropy, the dielectric anisotropy, the viscosity, etc.

Second Component C: Compounds (7), (8) and (9),

When preparing a liquid crystal composition for a vertical alignment mode (VA mode), etc. having a negative dielectric anisotropy, preferable is the composition comprising at least one compound (hereinafter referred to as second component C) selected from the group consisting of the compounds represented by Formulas (7) to (9). Preferable examples of the compounds represented by Formulas (7) to (9) among the second component C are the following compounds of Formulas (7-1) to (7-3), (8-1) to (8-5) and (9-1) to (9-3), respectively.

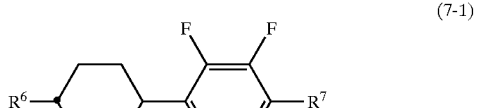
(7-1)

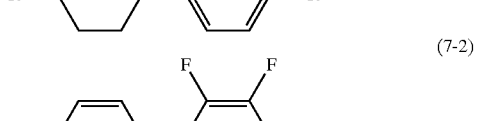
(7-2)

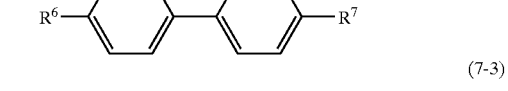
(7-3)

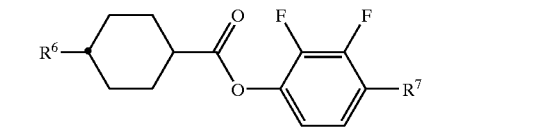
(8-1)

(8-2)

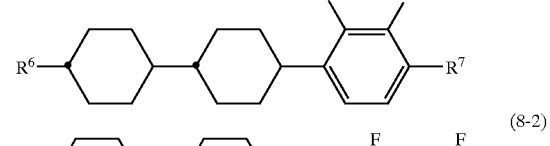
(8-3)

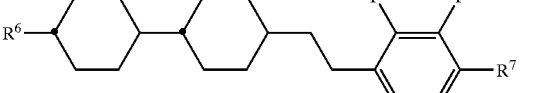
(8-4)

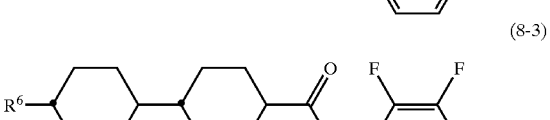
(8-5)

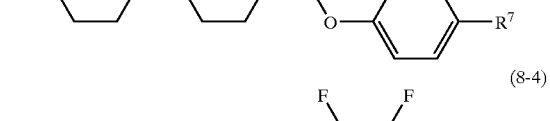

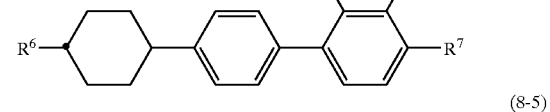

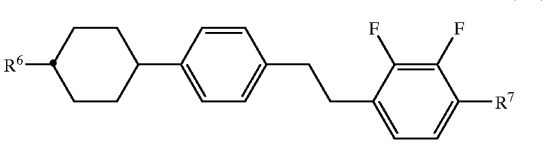

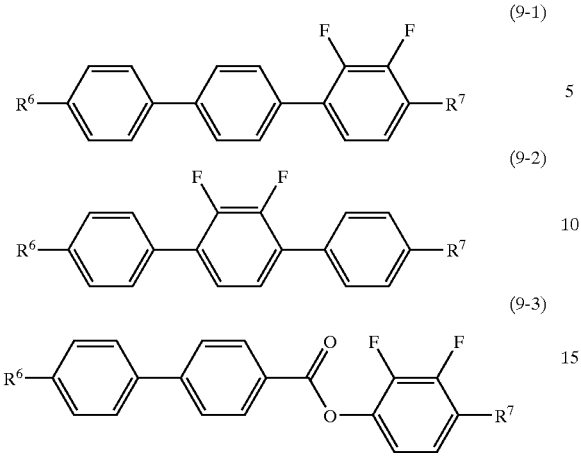

(9-1)
(9-2)
(9-3)

In Formulas, $R^6$ and $R^7$ have the same meanings as defined above.

The compounds represented by Formulas (7) to (9) have a negative dielectric anisotropy. The compound of Formula (7) is a compound of two-ring system and therefore used mainly for the purpose of controlling the threshold voltage, the viscosity or the refractive anisotropy. The compound of Formula (8) is used for the purpose of not only expanding the nematic range but also reducing the threshold voltage and increasing the refractive anisotropy.

The compounds represented by Formulas (7) to (9) are used mainly for a liquid crystal composition for a VA mode having a negative dielectric anisotropy. If an amount thereof is increased, the composition has a reduced threshold voltage but it may also have an increased viscosity. Therefore, an amount thereof is preferably reduced as long as a required value of the threshold voltage is satisfied. However, an absolute value of the dielectric anisotropy is 5 or less, and if an amount of the compounds represented by Formulas (7) to (9) are less than 40% by weight, the liquid crystal composition may not be driven. Accordingly, an amount of the compounds represented by Formulas (7) to (9) is preferably 40% by weight or more when preparing the composition for a VA mode. It is more preferably in the range of 50 to 95% by weight. Further, the compounds represented by Formulas (7) to (9) may be added to the liquid crystal composition having a positive dielectric anisotropy for the purpose of controlling an elastic constant and a voltage transmission curve of the composition. In this case, an amount of the compounds represented by Formulas (7) to (9) is preferably 30% by weight or less.

Third Component D: Compounds (10), (11) and (12)

Among the compounds represented by Formulas (10) to (12) as the third component for the liquid crystal composition of the present invention, preferable examples are the following compounds of Formulas (10-1) to (10-11), (11-1) to (11-12) and (12-1) to (12-6), respectively.

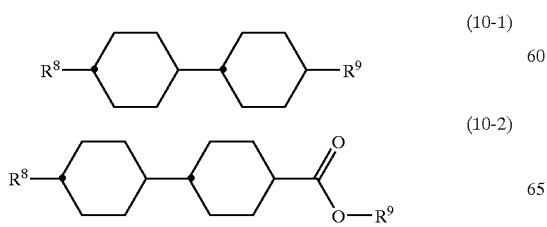

(10-1)
(10-2)

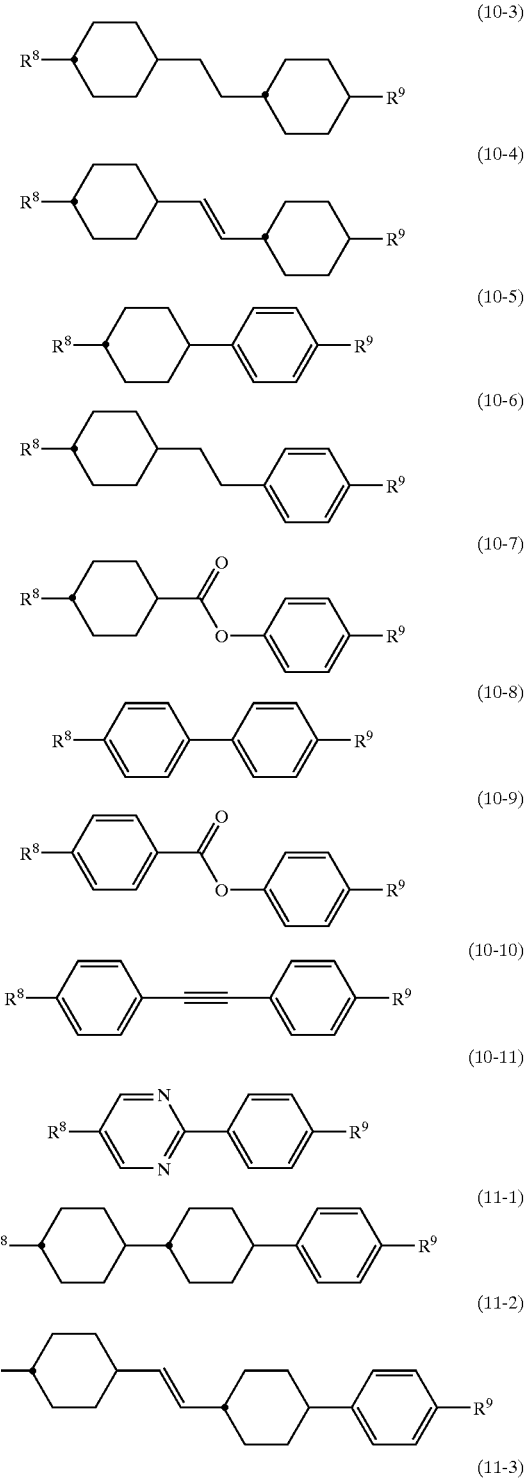

(10-3)
(10-4)
(10-5)
(10-6)
(10-7)
(10-8)
(10-9)
(10-10)
(10-11)
(11-1)
(11-2)
(11-3)
(11-4)

(11-5) 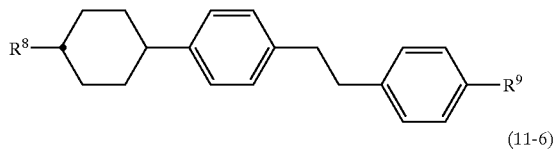

(11-6) 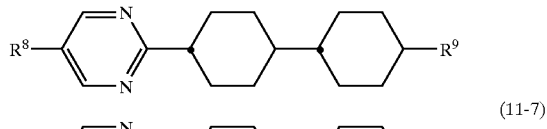

(11-7) 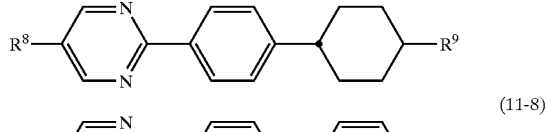

(11-8) 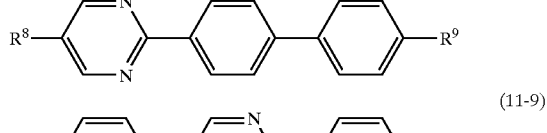

(11-9) 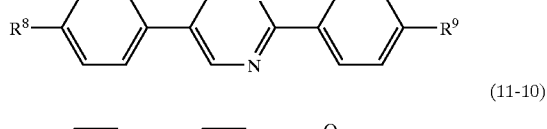

(11-10) 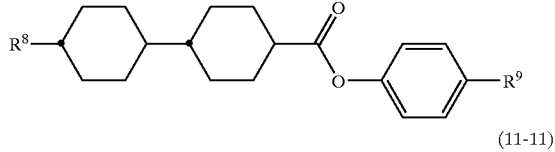

(11-11) 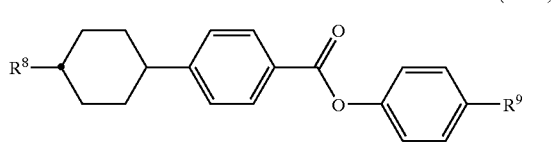

(11-12) 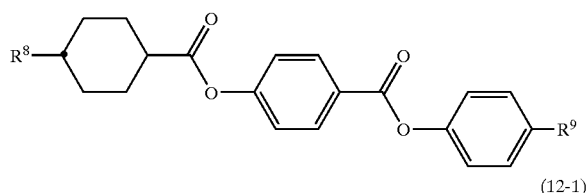

(12-1) 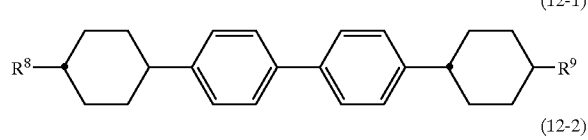

(12-2) 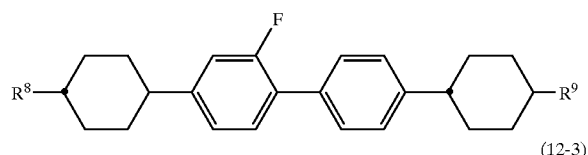

(12-3) 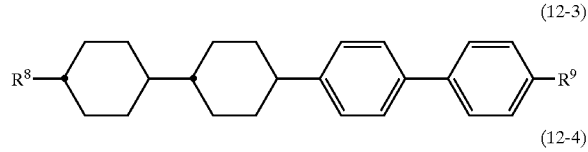

(12-4)

(12-5) 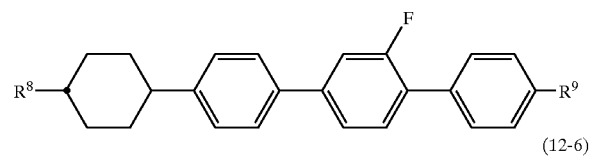

(12-6) 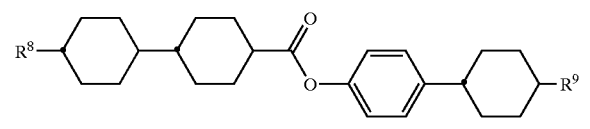

In Formulas, $R^8$ and $R^9$ have the same meanings as defined above.

The compounds represented by Formulas (10) to (12) have a small absolute value of a dielectric anisotropy and are almost neutral. The compound of Formula (10) is used mainly for the purpose of controlling the viscosity or the refractive anisotropy. The compounds of Formulas (11) and (12) are used for the purpose of expanding the nematic range by elevating the clearing point, or controlling the refractive anisotropy.

If an amount of the compounds represented by Formulas (10) to (12) is increased, the liquid crystal composition has an elevated threshold voltage and a reduced viscosity. Therefore, the compounds represented by the Formulas (10) to (12) are preferably used in a large amount as long as a required value of the threshold voltage of the liquid crystal composition is satisfied. When preparing the liquid crystal composition for TFT, an amount of the compounds represented by Formulas (10) to (12) is preferably 40% by weight or less, more preferably 35% by weight or less. When preparing the liquid crystal composition for STN or TN, an amount of the compounds represented by Formulas (10) to (12) is preferably 70% by weight or less, more preferably 60% by weight or less.

Optically Active Compound E

The liquid crystal composition of the present invention preferably comprises at least one of the liquid crystalline compounds represented by Formula (1) in the proportion of 0.1 to 99% by weight in order to make low voltage driving possible.

The above liquid crystal composition is generally prepared by a publicly known method, for example, a method of dissolving various components at high temperature. Further, a chiral dopant is added if necessary, whereby the liquid crystal composition can be improved for each purpose and optimized. Any chiral dopant may be used as long as it can induce a helical structure of liquid crystals to adjust a required twist angle and prevent reverse twist. For example, the following optically active compounds can be given as the chiral dopant.

(C15) 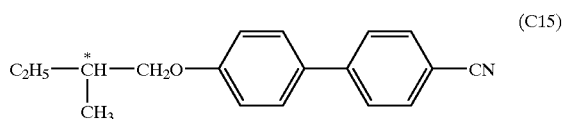

(CB15) 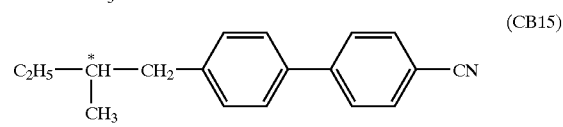

-continued

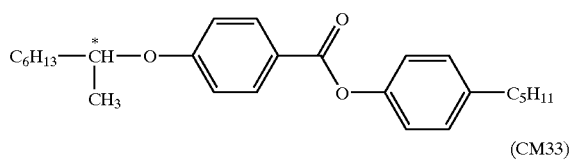
(CM21)

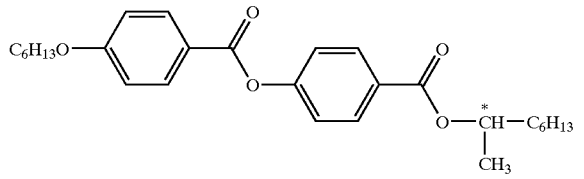
(CM33)

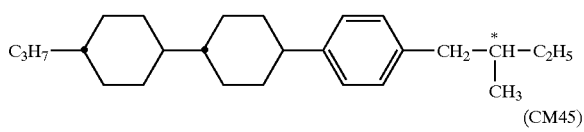
(CM43L)

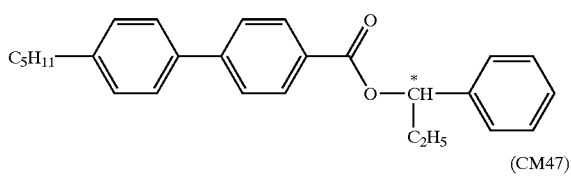
(CM45)

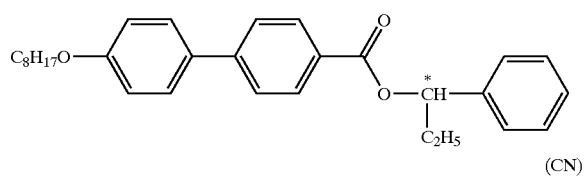
(CM47)

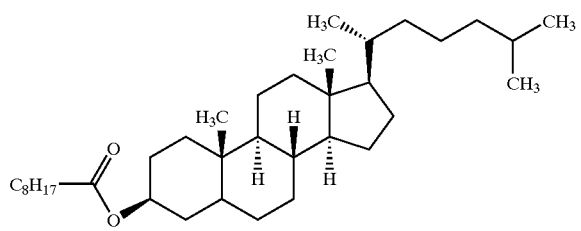
(CN)

In the liquid crystal composition of the present invention, these optically active compounds are usually added to adjust a pitch of twist. The pitch of twist is preferably adjusted in the range of 40 to 200 μm in the case of the liquid crystal compositions for TFT and TN. In the case of the liquid crystal composition for STN, it is preferably adjusted in the range of 6 to 20 μm. Further, in the case of the liquid crystal composition for a bistable TN mode, it is preferably adjusted in the range of 1.5 to 4 μm. Two or more optically active compounds may be added for the purpose of controlling a temperature dependency of the pitch.

The liquid crystal composition of the present invention can also be used as a liquid crystal composition for a G-H mode by adding a dichroic dye such as merocyanine, styryl, azo, azomethine, azoxy, quinophthalone, anthraquinone and tetrazine. The composition according to the present invention can also be used as a liquid crystal composition for NCAP prepared by the micro-encapsulation of nematic liquid crystals, for a polymer dispersed liquid crystal display element (PDLCD) such as a polymer network liquid crystal display element (PNLCD) in which a three-dimensional polymer is formed in liquid crystals, and for an electrically controlled birefringence mode (ECB) or DS mode liquid crystal displays.

Liquid Crystal Display Element

The liquid crystal display element according to the present invention is characterized by comprising the liquid crystal composition of the present invention described above. The liquid crystal display element can be constituted by means of publicly known methods.

EXAMPLES

The present invention shall be explained below in more details with reference to examples. In the following examples, Cr represents crystal; Sm represents a smectic phase; N represents a nematic phase; and Iso represents an isotropic liquid phase.

In $^1$H-NMR data, s represents a singlet; d represents a doublet; and t represents a triplet. In GC-MS, M$^+$ represents a molecular ion peak.

Example 1

Production of 1-(trans-4-(trans-4-propylcyclohexyl)-cyclohexyldifluoromethoxy)-3,4,5-trifluorobenzene (the compound (1d), wherein k is 1, and l, m and n are 0; $R^1$ is n-propyl; ring $A^1$ is trans-1,4-cyclohexylene; $Z^1$ is a single bond; both $Y^1$ and $Y^2$ are hydrogen; and all of $Y^3$, $Y^4$ and $R^2$ are fluorine (Compound No. 17))

Production of Starting Material, Compound (1a)

In a nitrogen-purged 1-L three-neck flask equipped with a stirrer, a thermometer and a dropping funnel, 49.7 g (0.23 mol) of dibromodifluoromethane was dissolved in 100 ml of THF and the solution was cooled down to −20° C. while stirring. 117 g (0.47 mol) of tris(diethylamino)phosphine dissolved in 200 ml of THF was added dropwise at 10° C. or lower, and then the solution was stirred at room temperature for one hour. Next, 35 g (0.16 mol) of 4-(trans-4-propylcyclohexyl)cyclohexanone dissolved in 100 ml of THF was added dropwise at 30° C. or lower, and then the solution was stirred at room temperature for 6 hours. The reaction mixture was transferred into a 2-L beaker, and 300 ml of water and 500 ml of heptane were added thereto. The separated heptane layer was washed twice with 300 ml of water and dried over anhydrous magnesium sulfate. The solvent was distilled off under reduced pressure, and then the concentrated residue was purified by means of a silica gel column chromatography with heptane as a developing solvent to obtain 33 g of 4-(trans-4-propylcyclohexyl)-α,α-difluorocyclohexylidene.

First Step

In a nitrogen-purged 300-ml three-neck flask equipped with a stirrer, a thermometer and a dropping funnel, 10.0 g (39.1 mmol) of 4-(trans-4-propylcyclohexyl)-α,α-difluorocyclohexylidene obtained in the above process was dissolved in 80 ml of 1,2-dichloroethane and the solution was cooled down to −30° C. while stirring. 6.3 g (39.1 mmol) of bromine dissolved in 20 ml of 1,2-dichloroethane was added dropwise at −25° C. or lower, and the solution was stirred for one hour while maintaining the same temperature. 100 ml of water was added to terminate the reaction. The reaction mixture was transferred into a 2-L beaker, and 300 ml of heptane was added thereto. The separated heptane layer was washed three times with 200 ml of water and dried over anhydrous magnesium sulfate. The solvent was distilled off under reduced pressure, and then the concentrated residue was purified by means of a silica gel column chromatography with heptane as a developing solvent to obtain 16.2 g of 1-bromo-1-bromodifluoromethyl-4-(trans-4-propylcyclohexyl)cyclohexane.

Second Step

In a nitrogen-purged 300-ml three-neck flask equipped with a stirrer, a thermometer and a condenser, 10.0 g (24 mmol) of 1-bromo-1-bromodifluoromethyl-4-(trans-4-propylcyclohexyl)cyclohexane obtained in the first step, 4.3 g (28.8 mmol) of 3,4,5-trifluorophenol, 6.6 g (48.0 mmol) of potassium carbonate and 100 ml of DMF were stirred at 120° C. for 2 hours. The reaction mixture was transferred into a 1-L beaker, and 100 ml of water and 300 ml of heptane were added thereto. The separated heptane layer was washed three times with 200 ml of water and dried over anhydrous magnesium sulfate. The solvent was distilled off under reduced pressure, and then the concentrated residue was purified by means of a silica gel column chromatography with heptane as a developing solvent to obtain 7.3 g of 1-(4-(trans-4-propylcyclohexyl)cyclohexene-1-yl-difluoromethoxy)-3,4,5-trifluorobenzene as colorless crystals.

Third Step

In a nitrogen-purged 1-L stainless steel autoclave, 7.3 g (18.1 mmol) of 1-(4-(trans-4-propylcyclohexyl) cyclohexene-1-yl-difluoromethoxy)-3,4,5-trifluorobenzene obtained in the second step was dissolved in 250 ml of a mixed solution of equal amount of toluene/ethanol. 0.6 g of 5% palladium carbon catalyst was added thereto, and the mixture was stirred at room temperature under a hydrogen pressure of 0.8 MPa for 5 hours. The catalyst was separated from the reaction mixture by filtration, and then the solvent was distilled off under reduced pressure. The concentrated residue was purified by means of a silica gel column chromatography with heptane as a developing solvent and further recrystallized from a mixed solution of equal amount of heptane/ethanol to obtain 5.1 g of 1-(trans-4-(trans-4-propylcyclohexyl)-cyclohexyldifluoromethoxy)-3,4,5-trifluorobenzene as colorless crystals.

The above compound showed a liquid crystal phase and had a transition point shown below:

Cr 43.5 N 103.0 Iso

The measurements of the various spectral data strongly supported the structure of the compound.

$^1$H-NMR ($\delta$ ppm, CDCl$_3$): 0.87–1.34 (m, 20H), 1.57–2.02 (m, 7H), 6.82–6.85 (m, 2H)

$^{19}$F-NMR ($\delta$ ppm): −79.33 (d, 2F, —CF$_2$O—), −133.76 to −133.83 (m, 2F), −165.21 to −165.31 (m, 1F)

Example 2

Production of 1-(trans-4-(trans-4-pentylcyclohexyl)-cyclohexyldifluoromethoxy)-4-trifluoromethoxybenzene (a compound (1d), wherein k is 1, and l, m and n are 0; R$^1$ is n-pentyl; ring A$^1$ is trans-1,4-cyclohexylene; Z$^1$ is a single bond; all of Y$^1$, Y$^2$, Y$^3$ and Y$^4$ are hydrogen; and R$^2$ is trifluoromethoxy (Compound No. 18)).

First Step

A nitrogen-purged 100-ml three-neck flask equipped with a stirrer, a thermometer and a condenser was charged with 8.0 g (28.1 mmol) of 4-(trans-4-pentylcyclohexyl)-α,α-difluorocyclohexylidene obtained by the same method of preparing the compound (1a) in Example 1 and 24.2 g (140.7 mmol) of 47% hydrobromic acid, and the solution was heated under reflux for 5 hours. The reaction mixture was transferred into a 1-L beaker, and 150 ml of water and 200 ml of heptane were added thereto. The separated heptane layer was washed three times with 150 ml of water and dried over anhydrous magnesium sulfate. The solvent was distilled off under reduced pressure, and then the concentrated residue was purified by means of a silica gel column chromatography with heptane as a developing solvent to obtain 8.3 g of trans-1-bromodifluoromethyl-4-(trans-4-pentylcyclohexyl)cyclohexane.

Second Step

A nitrogen-purged 300-ml three-neck flask equipped with a stirrer, a thermometer and a condenser was charged with 8.3 g (22.8 mmol) of trans-1-bromodifluoromethyl-4-(trans-4-pentylcyclohexyl)cyclohexane obtained in the first step, 4.9 g (27.3 mmol) of 4-trifluoromethoxyphenol, 3.8 g (27.3 mmol) of potassium carbonate and 100 ml of DMF, and the mixture was stirred at 100° C. for 1.5 hour. The reaction mixture was transferred into a 1-L beaker, and 100 ml of water and 200 ml of heptane were added thereto. The separated heptane layer was washed three times with 150 ml of water and dried over anhydrous magnesium sulfate. The solvent was distilled off under reduced pressure, and then the concentrated residue was purified by means of a silica gel column chromatography with heptane as a developing solvent and further recrystallized from a mixed solution of equal amount of heptane/ethanol to obtain 1.2 g of 1-(trans-4-(trans-4-pentylcyclohexyl)cyclohexyldifluoromethoxy)-4-trifluoromethoxybenzene as colorless crystals.

The above compound showed a liquid crystal phase and had a transition point shown below:

Cr 35.1 Sm 116.7 N 156.9 Iso

The measurements of the various spectral data strongly supported the structure of the compound.

$^1$H-NMR ($\delta$ ppm, CDCl$_3$): 0.6–2.2 (m, 31H), 7.19 (bs, 4H)

$^{19}$F-NMR ($\delta$ ppm): −51.68 (s, 3F, —OCF$_3$), −78.77 (s, 2F, —CF$_2$O—)

Example 3

Production of 1-(3-(trans-4-(trans-4-pentylcyclohexyl)-cyclohexyl)-1,1-difluoro-2-propenyloxy)-3,4,5-trifluorobenzene (a compound (1c'), wherein k is 1; l, m and n are 0; o is 1; R$^1$ is n-pentyl; both ring A$^1$ and ring A$^5$ are trans-1,4-cyclohexylene; Z$^1$ is a single bond; both Y$^1$ and Y$^2$ are hydrogen; and all of Y$^3$, Y$^4$ and R$^2$ are fluorine (Compound No. 105)).

Production of Starting Material, Compound (1a')

A nitrogen-purged 1-L three-neck flask equipped with a stirrer, a thermometer and a dropping funnel was charged with 16.4 g (107.7 mmol) of sodium chlorodifluoroacetate, 28.3 g (107.7 mmol) of triphenylphosphine and 200 ml of DMF, and the mixture was heated up to 80° C. while stirring. A solution of 15.0 g (53.9 mmol) of 1-(trans-4-(trans-4-pentylcyclohexyl)-cyclohexyl)acetaldehyde dissolved in 100 ml of DMF was added dropwise at 80 to 110° C., and the solution was stirred at 100° C. for 2 hours. The reaction mixture was transferred into a 2-L beaker, and 500 ml of heptane was added thereto. Insoluble materials were separated by filtration by means of a glass filter, and 300 ml of water was added thereto. The separated heptane layer was washed twice with 300 ml of water and dried over anhydrous magnesium sulfate. The solvent was distilled of under reduced pressure, and then the concentrated residue was purified by means of a silica gel column chromatography with heptane as a developing solvent to obtain 14.1 g of 1,1-difluoro-3-(trans-4-(trans-4-pentylcyclohexyl) cyclohexyl)-1-propene.

First Step

In a nitrogen-purged 300-ml three-neck flask equipped with a stirrer, a thermometer and a dropping funnel, 10.0 g (32.0 mmol) of 1,1-difluoro-3-(trans-4-(trans-4-pentylcyclohexyl)cyclohexyl)-1-propene obtained in the above process was dissolved in 100 ml of 1,2-dichloroethane and the solution was cooled down to −30° C.

while stirring. 5.4 g (33.6 mmol) of bromine dissolved in 20 ml of 1,2-dichloroethane was added dropwise at −25° C. or lower, and the solution was stirred for one hour while maintaining the same temperature. 100 ml of water was added to terminate the reaction. The reaction mixture was transferred into a 1-L beaker, and 300 ml of heptane was added thereto. The separated heptane layer was washed three times with 200 ml of water and dried over anhydrous magnesium sulfate. The solvent was distilled off under reduced pressure, and then the concentrated residue was purified by means of a silica gel column chromatography with heptane as a developing solvent to obtain 14.2 g of 1,2-dibromo-1,1-difluoro-3-(trans-4-(trans-4-pentylcyclohexyl)-cyclohexyl)propane.

Second Step

A nitrogen-purged 300-ml three-neck flask equipped with a stirrer, a thermometer and a condenser was charged with 10.0 g (21.2 mmol) of 1,2-dibromo-1,1-difluoro-3-(trans-4-(trans-4-pentylcyclohexyl)cyclohexyl)propane obtained in the first step, 3.8 g (25.4 mmol) of 3,4,5-trifluorophenol, 5.9 g (42.4 mmol) of potassium carbonate and 100 ml of DMF, and the mixture was stirred at 120° C. for 2 hours. The reaction mixture was transferred into a 1-L beaker, and 100 ml of water and 300 ml of heptane were added thereto. The separated heptane layer was washed three times with 200 ml of water and dried over anhydrous magnesium sulfate. The solvent was distilled off under reduced pressure, and then the concentrated residue was purified by means of a silica gel column chromatography with heptane as a developing solvent and further recrystallized from a mixed solution of equal amount of heptane/ethanol to obtain 7.7 g of 1-(3-(trans-4-(trans-4-pentylcyclohexyl)cyclohexyl)-1,1-difluoro-2-propenyloxy)-3,4,5-trifluorobenzene (Compound No. 105) as colorless crystals.

Example 4

Production of 1-(3-(trans-4-(trans-4-pentylcyclohexyl)-cyclohexyl)-1,1-difluoropropoxy)-3,4,5-trifluorobenzene (a compound (1d'), wherein k is 1; l, m and n are 0; o is 1; $R^1$ is n-pentyl; ring $A^1$ is trans-1,4-cyclohexylene; $Z^1$ is a single bond; both $Y^1$ and $Y^2$ are hydrogen; and all of $Y^3$, $Y^4$ and $R^2$ are fluorine (Compound No. 66)).

In a nitrogen-purged 1-L stainless steel autoclave, 7.7 g (16.8 mmol) of 1-(3-(trans-4-(trans-4-pentylcyclohexyl) cyclohexyl)-1,1-difluoro-2-propenyloxy)-3,4,5-trifluorobenzene obtained in Example 3 was dissolved in 200 ml of a mixed solution of equal amount of toluene/ethanol. 0.8 g of 5% palladium carbon catalyst was added thereto, and the mixture was stirred at room temperature under a hydrogen pressure of 0.1 to 0.2 MPa for 10 hours. The catalyst was separated from the reaction mixture by filtration, and then the solvent was distilled off under reduced pressure. The concentrated residue was purified by means of a silica gel column chromatography with heptane as a developing solvent and further recrystallized from a mixed solution of equal amount of heptane/ethanol to obtain 4.9 g of 1-(3-(trans-4-(trans-4-pentylcyclohexyl)-cyclohexyl)-1,1-difluoropropoxy)-3,4,5-trifluorobenzene as colorless crystals.

The above compound showed a liquid crystal phase and had a transition point shown below:

Cr 65.5 (SA 50.76) N 116.9 Iso $^1$H-NMR (δ ppm, CDCl$_3$): 0.8–2.2 (m, 35H), 6.85–6.88 (m, 2H).

$^{19}$F-NMR (δ ppm): −79.26 (t, 2F, —CF$_2$O—), −133.53 to −133.65 (m, 2F), −165.00 to −165.06 (m, 1F).

GC-MS(EI): 460(M$^+$, 12.5%), 148(92.4), 97(93.6), 83(100), 81(55.0), 69(54.9), 55(76.4), 41(30.7).

Example 5

Production of 1-(3-(4'-propyl-3,5-difluorobiphenyl-4-yl)-1,1-difluoropropenyloxy)-3,4,5-trifluorobenzene (a compound (1d), wherein k is 1; l, m and n are 0; o is 1; $R^1$ is n-propyl; ring $A^1$ is 1,4-phenylene, and ring $A^5$ is 3,5-difluoro-1,4-phenylene; $Z^1$ is a single bond; both $Y^1$ and $Y^2$ are hydrogen; and all of $Y^3$, $Y^4$ and $R^2$ are fluorine (Compound No. 108)).

First Step of Producing Starting Material, Compound (1a')

In a 1-L three-neck flask equipped with a stirrer, a thermometer and a dropping funnel, a THF solution (300 ml) of 23.2 g (100 mmol) of 3,5-difluoro-4'-propylbiphenyl was cooled down to −70° C. under nitrogen atmosphere, and 69 ml (110 mmol) of n-butyllithium (1.6M hexane solution) was added dropwise thereto. The solution was stirred at 70° C. for one hour, and then a THF solution (10 ml) of 9.3 ml (120 mmol) of DMF was added dropwise and further stirred for one hour. The reaction mixture was poured into 200 ml of 1N hydrochloric acid and extracted with 200 ml of heptane. The heptane layer was washed in turn with 200 ml of water, 200 ml of a saturated aqueous sodium hydrogencarbonate solution and 200 ml of water, and then dried over anhydrous magnesium sulfate. The solvent was distilled off under reduced pressure, and then the concentrated residue was purified by means of a silica gel column chromatography (developing solvent: heptane/toluene=4/6) to obtain 26.0 g (100 mmol, yield: 100%) of 3,5-difluoro-4-formyl-4'-propylbiphenyl as colorless oily substance.

Second Step of Producing Starting Material, Compound (1a')

In a 1-L three-neck flask equipped with a stirrer, a thermometer and a dropping funnel, a THF solution (250 ml) of 42.2 g (130 mmol) of methoxymethyltriphenylphosphonium chloride was cooled down to 0° C. under nitrogen atmosphere, and 14.6 g (130 mmol) of potassium tert-butoxide was added thereto little by little, followed by stirring at room temperature for one hour. The solution was cooled down again to 0° C., and then a THF solution (150 ml) of 26.0 g (100 mmol) of 3,5-difluoro-4-formyl-4'-propylbiphenyl obtained above was added dropwise, followed by stirring at room temperature for 2 hours. The reaction mixture was pored into 200 ml of water and extracted with toluene, and the toluene layer was dried over anhydrous magnesium sulfate. The solvent was distilled off under reduced pressure, and then the concentrated residue was purified by means of a silica gel column chromatography (developing solvent: heptane/toluene=1/10) to obtain 28.8 g (100 mmol, yield: 100%) of a reaction product (colorless oily substance). In a 500-ml Kjeldahl flask, 28.8 g (100 mmol) of the resulting product was dissolved in 200 ml of toluene, and 70 ml of formic acid was added thereto, followed by heating under reflux for 6 hours. After cooling down, the reaction solution was poured into 200 ml of water and extracted with 100 ml of toluene. The toluene layer was washed in turn with water (100 ml×3), a saturated aqueous sodium hydrogencarbonate solution (100 ml×2) and water (200 ml×1), and then dried over anhydrous magnesium sulfate. The solvent was distilled off, and then the concentrated residue was purified by means of a silica gel column chromatography (developing solvent: heptane/toluene=1/1) to obtain 26.2 g (95.6 mmol, yield: 96%) of 2-(3,5-difluoro-4'-propylbiphenyl-4-yl)acetaldehyde (colorless oily substance).

Third Step of Producing Starting Material, Compound (1a')

In a 1-L three-neck flask equipped with a stirrer, a thermometer and a dropping funnel, a DMF solution (300 ml) of 11.0 g (40 mmol) of 2-(3,5-difluoro-4'-propylbiphenyl-4-yl)acetaldehyde obtained above and 21.0 g (80 mmol) of triphenylphosphine was heated to 110° C. under nitrogen atmosphere, and a DMF solution (250 ml) of 30.6 g (200 mmol) of sodium chlorodifluoroacetate was added dropwise thereto, followed by stirring for one hour. After cooling down, the reaction mixture was poured into 2000 ml of water and extracted with toluene (300 ml×2), and then the toluene layer was dried over anhydrous magnesium sulfate. The solvent was distilled off, and then the concentrated residue was purified by means of a silica gel column chromatography (developing solvent: heptane) to obtain 8.5 g (27.6 mmol, yield: 64%) of 3-(3,5-difluoro-4'-propylbiphenyl-4-yl)-1,1-difluoro-1-propene (colorless oily substance).

First Step

In a 1-L three-neck flask equipped with a stirrer, a thermometer and a dropping funnel, a methylene chloride solution (90 ml) of 3.0 g (9.9 mmol) of 3-(3,5-difluoro-4'-propylbiphenyl-4-yl)-1,1-difluoro-1-propene obtained above was cooled down to −30° C. under nitrogen atmosphere, and a methylene chloride solution (10 ml) of 1.7 g (10.9 mmol) of bromine was added dropwise thereto. When a brown color of bromine faded, the reaction mixture was poured into ice water and extracted with methylene chloride, and then the methylene chloride layer was dried over anhydrous magnesium sulfate. The solvent was distilled off, and then the concentrated residue was purified by means of a silica gel column chromatography (developing solvent: heptane) to obtain 3.0 g (6.3 mmol, yield: 64%) of 3-(3,5-difluoro-4'-propylbiphenyl-4-yl)-1,2-dibromo-1,1-difluoropropane (colorless oily substance).

Second Step

In a 300-ml three-neck flask equipped with a stirrer, a thermometer and a dropping funnel, a DMF solution (70 ml) of 6.9 g (14.6 mmol) of 3-(3,5-difluoro-4'-propylbiphenyl-4-yl)-1,2-dibromo-1,1-difluoropropane obtained above, 0.24 g (0.73 mmol) of tetrabutylammonium bromide, 4.0 g (29 mmol) of potassium carbonate and 3.2 g (22 mmol) of 3,4,5-trifluorophenol was stirred at 100° C. for 30 minutes under nitrogen atmosphere. After cooling down, the reaction mixture was poured into water and extracted with methylene chloride, and then the methylene chloride layer was dried over anhydrous magnesium sulfate. The solvent was distilled off under reduced pressure, and then the concentrated residue was purified by means of a silica gel column chromatography (developing solvent: heptane) and further recrystallized from a mixed solvent of heptane/ethanol to thereby obtain 3.2 g (7.1 mmol, yield: 49%) of the desired 1-(3-(4'-propyl-3,5-difluorobiphenyl-4-yl)-1,1-difluoropropenyloxy)-3,4,5-trifluorobenzene (colorless crystals). This compound showed a liquid crystal phase and had a transition point shown below:

Cr 47.4 N 51.5 Iso

The measurements of the various spectral data strongly supported the structure of the compound.

$^1$H-NMR (δ ppm, CDCl$_3$): 0.97 (t, J=7.3 Hz, 3H), 1.67 (m, 2H), 2.64 (t, J=7.4 Hz, 2H), 6.65 (dt, J=6.8, 16.5 Hz, 1H), 6.94 (dd, J=6.1, 7.7 Hz, 2H), 7.18 (d, J=10.1 Hz, 2H), 7.26 (d, J=16.5, 1 H), 7.27 (d, J=8.0 Hz, 2H), 7.48 (d, J=8.0 Hz, 2H), $^{13}$C-NMR (δ ppm, CDCl$_3$): 14.2, 24.8, 38.1, 107.5 (d, J=5.7 Hz), 107.7 (d, J=5.7 Hz), 121.7 (t, J=261.5 Hz), 123.9 (t, J=7.5 Hz), 124.2 (tt, J=8.7, 32.2 Hz), 126.8, 129.8, 135.7, 137.6 (t, J=15.9 Hz), 139.5 (t, J=15.0 Hz), 144.3, 144.8 (t, J=5.1, 10.8 Hz), 152.4 (dd, J=5.5, 10.6 Hz), 161.0 (d, J=7.9 Hz), 163.0 (d, J=8.1 Hz), $^{19}$F-NMR: −68.1 (d, J=6.2 Hz), −111.9 (d, J=10.4 Hz), −133.2 (m), −164.3 (m)

GC-MS(EI), m/z(%): 454(M$^+$,1), 309(2), 308(21), 307 (100), 279(3), 278(13), 277(2), 259(3).

The following difluoromethyl ether derivatives (Compound No. 1 to 91) can suitably be produced according to the methods shown in Examples 1, 2 and 4. The compounds prepared in Examples 1, 2 and 4 are also shown below.

| compound No. | structure | data |
|---|---|---|
| 1 | C$_3$H$_7$—⟨cyclohexyl⟩—CF$_2$O—⟨phenyl⟩—C$_2$H$_5$ | |
| 2 | C$_3$H$_7$—⟨cyclohexyl⟩—CF$_2$O—⟨phenyl-F⟩—C$_2$H$_5$ | |
| 3 | C$_3$H$_7$—⟨cyclohexyl⟩—CF$_2$O—⟨phenyl-F,F⟩—C$_2$H$_5$ | Cr 52.2° C. Iso |
| 4 | C$_3$H$_7$—⟨cyclohexyl⟩—CF$_2$O—⟨phenyl⟩—F | |

-continued

| compound No. | structure | data |
|---|---|---|
| 5 | C₃H₇—⌬—CF₂O—⌬(3-F, 4-F) | |
| 6 | C₃H₇—⌬—CF₂O—⌬(3,4,5-triF) | |
| 7 | C₃H₇O—⌬—CF₂O—⌬—CN | |
| 8 | C₃H₇OCH₂—⌬—CF₂O—⌬(3-F)—CN | |
| 9 | C₃H₇—⌬—CF₂O—⌬(3,5-diF)—CN | Cr 5.1° C. Iso |
| 10 | CH₂=CHCH₂CH₂—⌬—CF₂O—⌬—C₂H₅ | |
| 11 | CH₂=CHCH₂CH₂—⌬—CF₂O—⌬(3-F)—C₂H₅ | |
| 12 | F(CH₂)₃—⌬—CF₂O—⌬(2,3,5,6-tetraF)—OC₂H₅ | |
| 13 | FCH₂CH₂CH=CH—⌬—CF₂O—⌬—C₂H₅ | |
| 14 | C₃H₇—⌬—⌬—CF₂O—⌬—C₂H₅ | |
| 15 | C₃H₇—⌬—⌬—CF₂O—⌬(3-F)—CH₃ | |

-continued

| compound No. | structure | data |
|---|---|---|
| 16 | C₃H₇—[Cy]—[Cy]—CF₂O—[Ph(2,3-F₂)]—OC₂H₅ | Cr 70.3 N 191.7 Iso |
| 17 | C₃H₇—[Cy]—[Cy]—CF₂O—[Ph(3,4,5-F₃)] | Cr 43.5 N 103.0 Iso |
| 18 | C₅H₁₁—[Cy]—[Cy]—CF₂O—[Ph]—OCF₃ | Cr 35.1 Sm 116.7 N 156.9 Iso |
| 19 | CH₂=CH—[Cy]—[Cy]—CF₂O—[Ph(3,4-F₂)] | |
| 20 | C₃H₇—[Cy]—[Cy]—CF₂O—[Ph(3,5-F₂)]—CF₃ | Cr 66.3 N 102.1 Iso |
| 21 | C₃H₇—[Diox]—[Cy]—CF₂O—[Ph(3,4-F₂)] | |
| 22 | C₂H₅—[Cy]—CH₂CH₂—[Cy]—CF₂O—[Ph(3,4,5-F₃)] | |
| 23 | C₃H₇—[Cy]—CH=CH—[Cy]—CF₂O—[Ph(3-F)]—OCF₂CF₂H | |
| 24 | C₂H₅—[Cy]—CH₂CH₂—[Cy]—CF₂O—[Ph(3,5-F₂)]—OCF₂CFHCF₃ | |

-continued

| compound No. | structure | data |
|---|---|---|
| 25 | C3H7—(Cy)—CF2O—(Ph)—(Ph)(F,F,F) | Cr 34.4 N 67.1 Iso |
| 26 | C3H7—(Cy)—CF2O—(Ph)(F)—(Ph)(F,F,F) | |
| 27 | C3H7—(Cy)—CF2O—(Ph)(F,F)—(Ph)(F,F) | Cr 60.3 Iso |
| 28 | C3H7—(Cy)—CF2O—(Ph)—(Ph)(F,F)—CN | |
| 29 | C3H7—(Cy)—CF2O—(pyrimidine)—(Ph)(F)—C2H5 | |
| 30 | C3H7—(Cy)—(Cy)—CF2O—(Ph)—(Ph)(F,F,F) | |
| 31 | C3H7—(Cy)—(Cy)—CF2O—(Ph)(F,F)—(Ph)(F,F) | |
| 32 | C3H7—(Cy)—(Cy)—CF2O—(Ph)(F)—(Ph)(F,F,F) | |

-continued
| compound No. | structure | data |
|---|---|---|
| 33 | 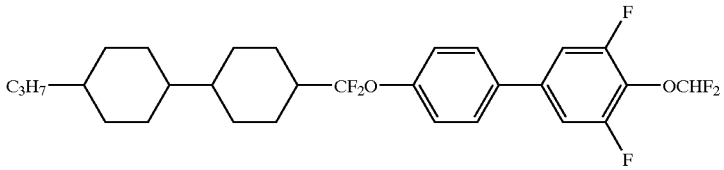 | |
| 34 | 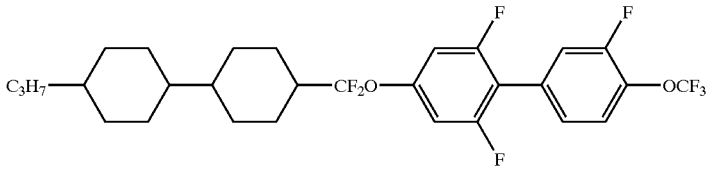 | |
| 35 | 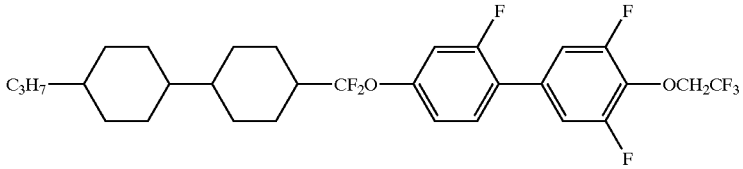 | |
| 36 | 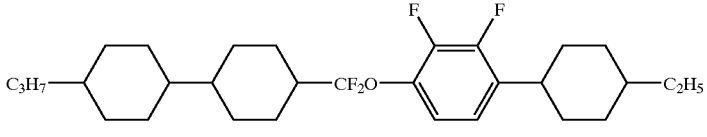 | |
| 37 | 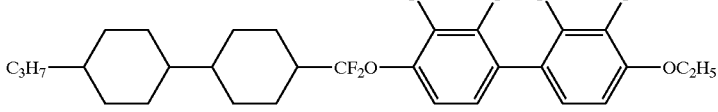 | |
| 38 | 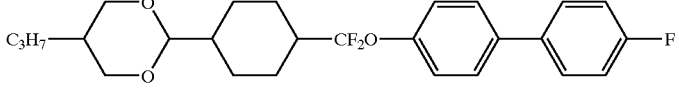 | |
| 39 | 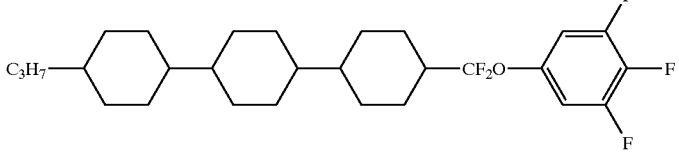 | |
| 40 | 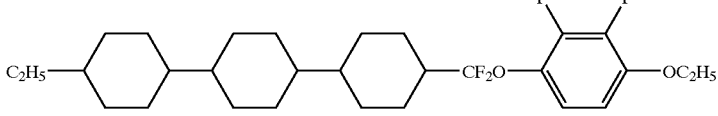 | |
| 41 | 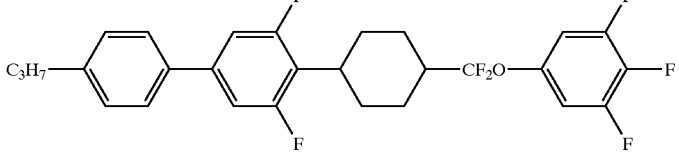 | |

-continued

| compound No. | structure | data |
|---|---|---|
| 42 | (vinyl-cyclohexyl)-(1,3-dioxane)-cyclohexyl-CF₂O-(3,5-difluoro-4-cyanophenyl) | |
| 43 | C₃H₇-pyrimidine-phenyl-cyclohexyl-CF₂O-(3,5-difluoro-4-cyanophenyl) | |
| 44 | C₃H₇-cyclohexyl-CF₂O-(2,3-difluorophenyl)-cyclohexyl-cyclohexyl-C₂H₅ | |
| 45 | vinyl-cyclohexyl-CF₂O-(2-fluorophenyl)-cyclohexyl-cyclohexyl-C₃H₇ | |
| 46 | C₃H₇-cyclohexyl-CF₂O-(2,3-difluorophenyl)-(3-fluorophenyl)-cyclohexyl-C₂H₅ | |
| 47 | C₃H₇-cyclohexyl-CF₂O-(2,3-difluorophenyl)-phenyl-(2,3-difluorophenyl)-OC₂H₅ | |
| 48 | C₃H₇-cyclohexyl-CF₂O-phenyl-(2,5-difluorophenyl)-(3,4-difluorophenyl) | |
| 49 | C₃H₇-cyclohexyl-CF₂O-(2-fluorophenyl)-(2-fluorophenyl)-(3,4,5-trifluorophenyl) | |
| 50 | C₃H₇-cyclohexyl-CF₂O-phenyl-(2-fluorophenyl)-(3,5-difluorophenyl)-OCF₂CF₂H | |

-continued
| compound No. | structure | data |
|---|---|---|
| 51 | 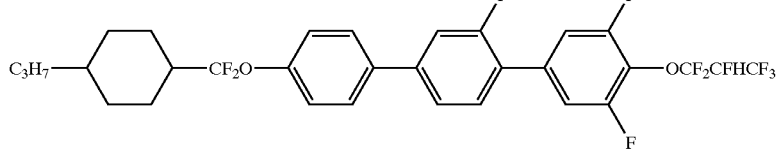 | |
| 52 | 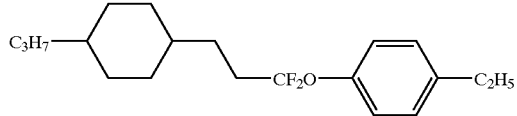 | |
| 53 | 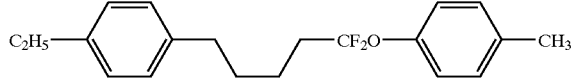 | |
| 54 | 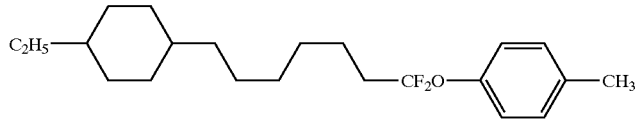 | |
| 55 | 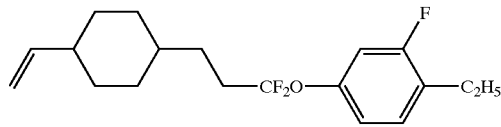 | |
| 56 | 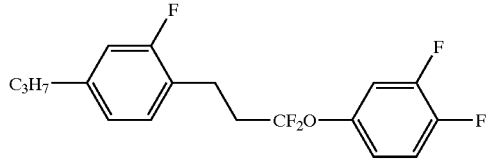 | |
| 57 | 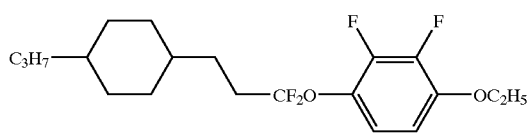 | |
| 58 | 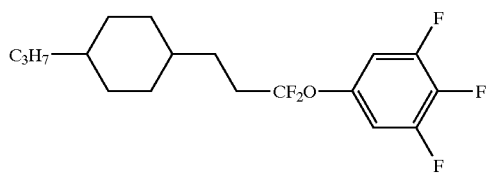 | |
| 59 | 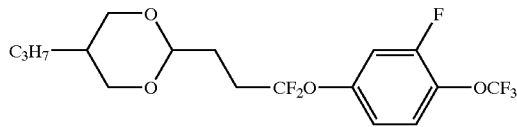 | |
| 60 | 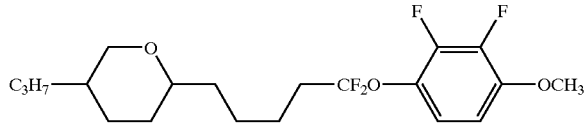 | |

-continued
| compound No. | structure | data |
|---|---|---|
| 61 | 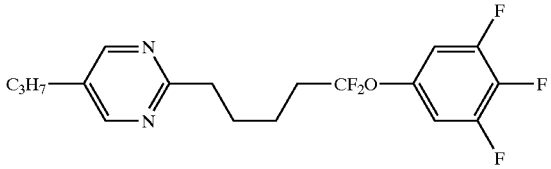 | |
| 62 | 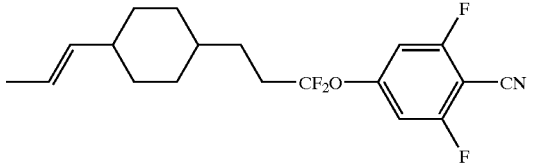 | |
| 63 | 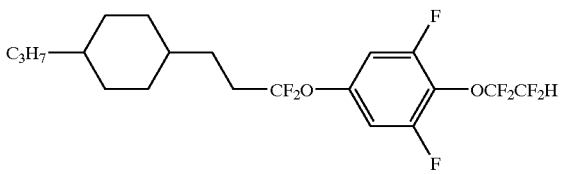 | |
| 64 | 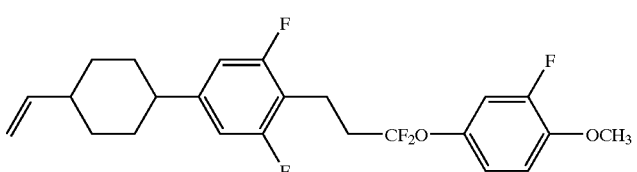 | |
| 65 | 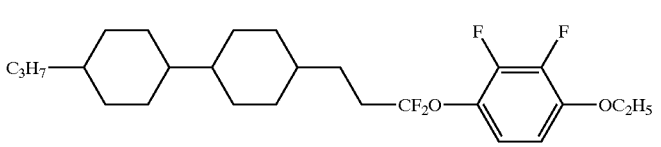 | |
| 66 | 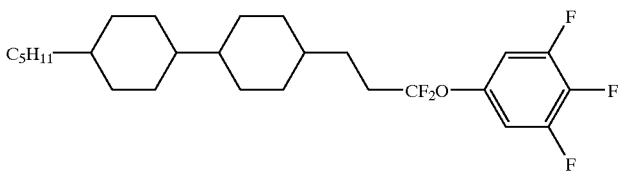 | Cr 65.5 ($S_A$ 50.76) N 116.9 Iso |
| 67 | 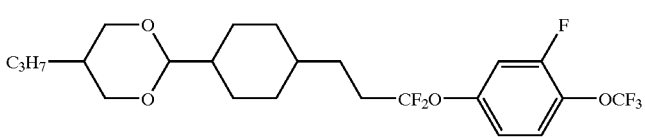 | |
| 68 | 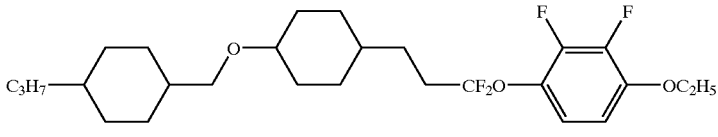 | |
| 69 | 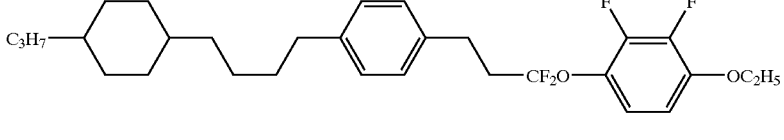 | |

-continued

| compound No. | structure | data |
|---|---|---|
| 70 | C5H11–[1,3-dioxane]–[cyclohexane]–CH2CH2–CF2O–[3,4-difluorophenyl] | |
| 71 | C2H5O–[2,3-difluorophenyl]–[cyclohexane]–CH2CH2–CF2O–[phenyl]–C3H7 | |
| 72 | C5H11–[cyclohexane]–CH2CH2–CF2O–[phenyl]–[phenyl]–C2H5 | |
| 73 | CH2=CH–[cyclohexane]–CH2CH2–CF2O–[2,6-difluorophenyl]–[phenyl]–C2H5 | |
| 74 | C3H7–[thiane]–CH2CH2–CF2O–[3-fluorophenyl]–[2,3-difluorophenyl]–OC2H5 | |
| 75 | C2H5–[cyclohexane]–CH2CH2–CF2O–[2,3-difluorophenyl]–[2,3-difluorophenyl]–OC2H5 | |
| 76 | C3H7–[cyclohexane]–CH2CH2–CF2O–[2-fluorophenyl]–[3,4,5-trifluorophenyl] | |
| 77 | C3H7–[1,3-dioxane]–CH2CH2–CF2O–[2,6-difluorophenyl]–[3,4-difluorophenyl] | |
| 78 | C3H7–[cyclohexane]–CH2CH2–CF2O–[2,3-difluorophenyl]–[cyclohexane]–C2H5 | |
| 79 | C2H5–[cyclohexane]–CH2CH2–CF2O–[3-fluorophenyl]–[cyclohexane]–CH=CH2 | |

-continued
| compound No. | structure | data |
|---|---|---|
| 80 | 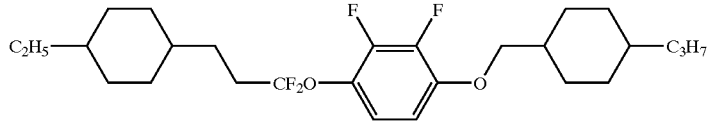 | |
| 81 | 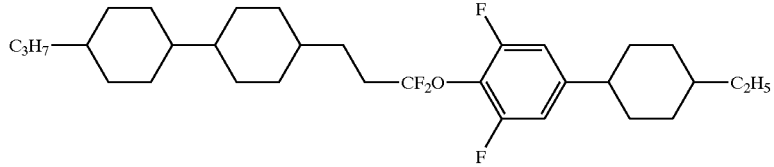 | |
| 82 | 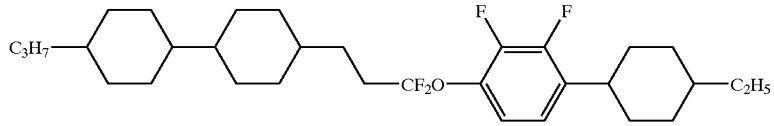 | |
| 83 | 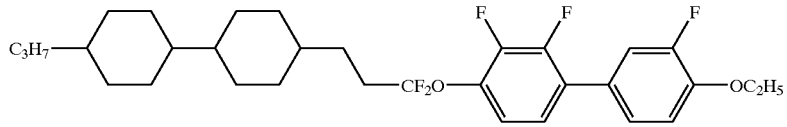 | |
| 84 | 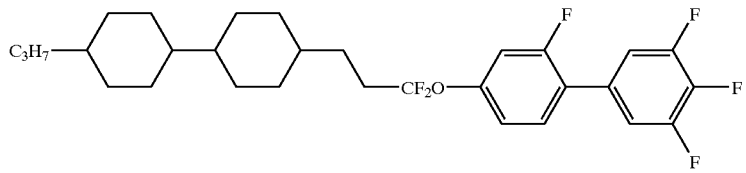 | |
| 85 | 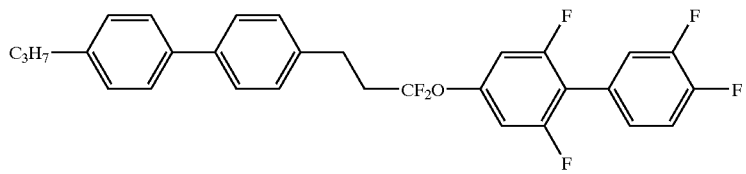 | |
| 86 | 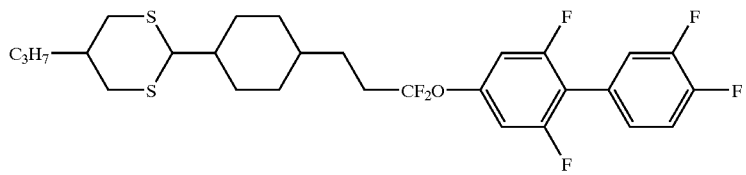 | |
| 87 | 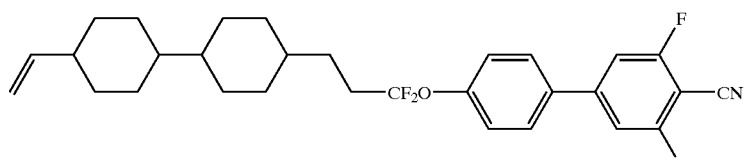 | |
| 88 | 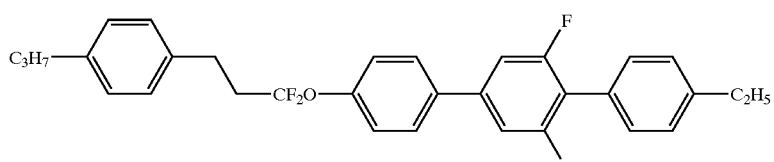 | |

| compound No. | structure | data |
|---|---|---|
| 89 | 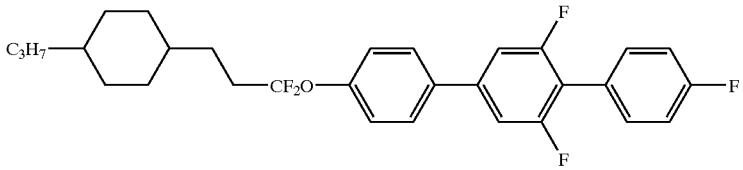 | |
| 90 | 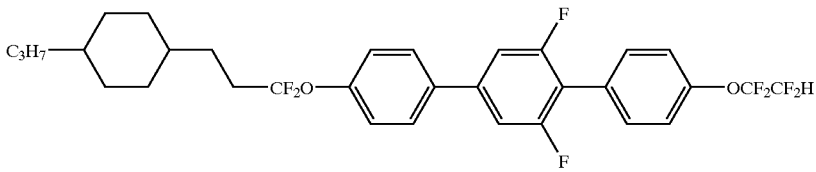 | |
| 91 | 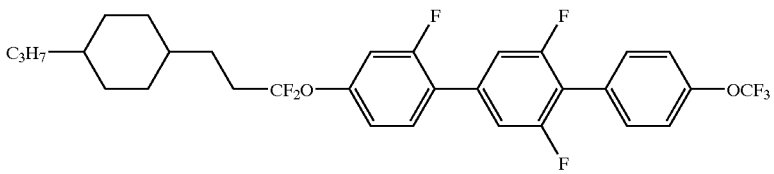 | |
The following compounds having a 1,1-difluoro-2-propenyloxy group as a bonding group (Compound No. 92 to 146) can suitably be produced according to the methods shown in Examples 3 and 5. The compounds prepared in Examples 3 and 5 are also shown below.
| compound No. | structure | data |
|---|---|---|
| 92 | 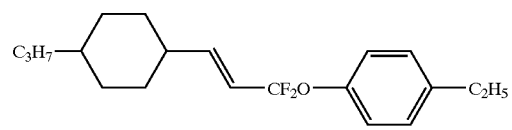 | |
| 93 | 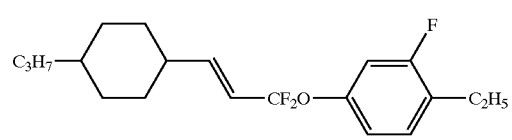 | |
| 94 | 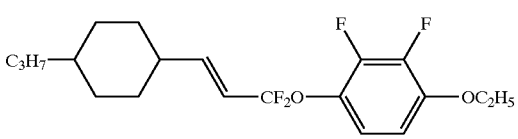 | |
| 95 | 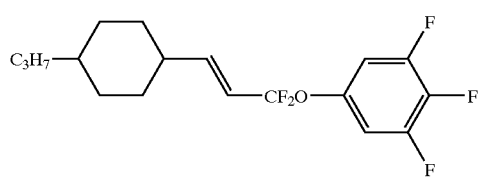 | |

-continued
| compound No. | structure | data |
|---|---|---|
| 96 | 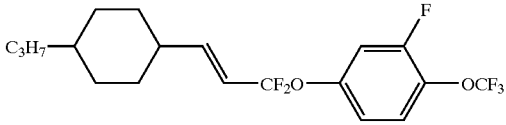 | |
| 97 | 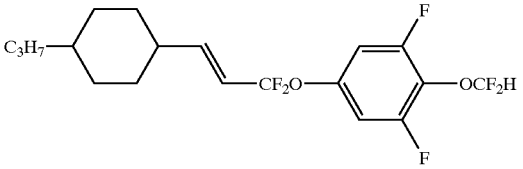 | |
| 98 | 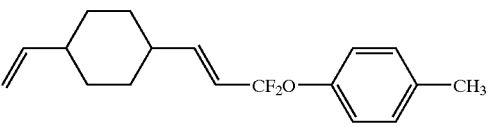 | |
| 99 | 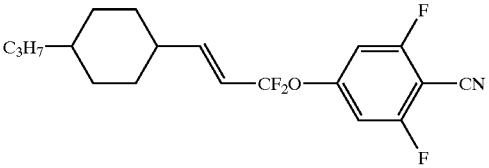 | |
| 100 | 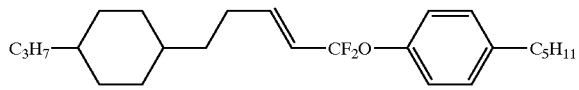 | |
| 101 | 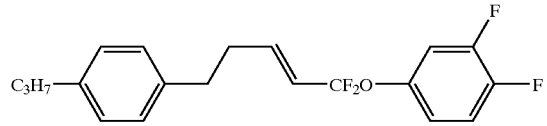 | |
| 102 | 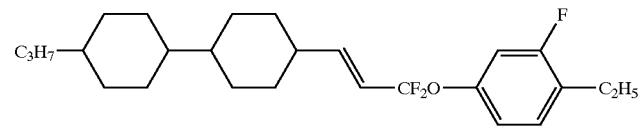 | |
| 103 | 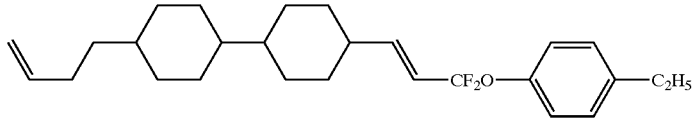 | |
| 104 | 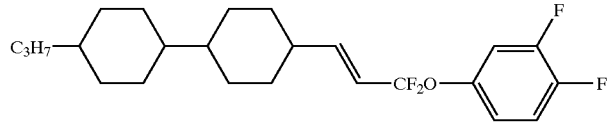 | |
| 105 | 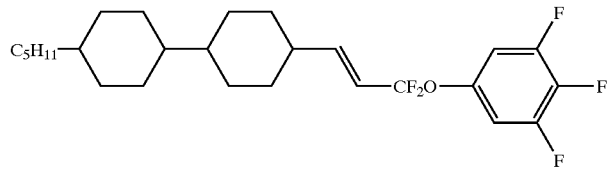 | |

| compound No. | structure | data |
|---|---|---|
| 106 | C₃H₇–Cy–Cy–CH=CH–CF₂O–Ph(3-F)–OCF₂CF₂H | |
| 107 | C₃H₇–Cy–Cy–CH=CH–CF₂O–Ph(2,3-F₂)–OC₂H₅ | |
| 108 | C₃H₇–Ph–Ph(2,6-F₂)–CH=CH–CF₂O–Ph(3,4,5-F₃) | Cr 47.4 N 51.5 Iso<br>Δε: 31.6<br>Δn: 0.184 |
| 109 | CH₂=CH–Cy–Cy–CH=CH–CF₂O–Ph(3,5-F₂)–CN | |
| 110 | C₃H₇–Cy–(CH₂)₃–CH=CH–CF₂O–Ph(3,4-F₂) | |
| 111 | C₃H₇–Cy–CH=CH–CF₂O–Ph–Ph–F | |
| 112 | C₃H₇–Cy–CH=CH–CF₂O–Ph–Ph(3,4,5-F₃) | |
| 113 | C₃H₇–Cy–CH=CH–CF₂O–Ph(2,6-F₂)–Ph(3,4-F₂) | |
| 114 | C₃H₇–Cy–CH=CH–CF₂O–Ph(2-F)–Ph(3,4,5-F₃) | |

-continued
| compound No. | structure | data |
|---|---|---|
| 115 | 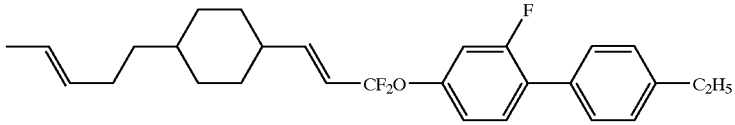 | |
| 116 | 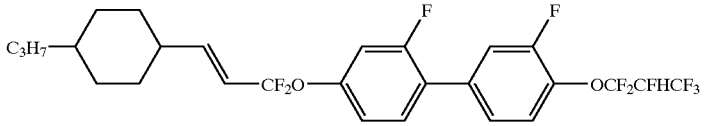 | |
| 117 | 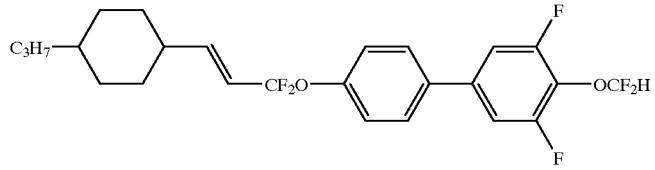 | |
| 118 | 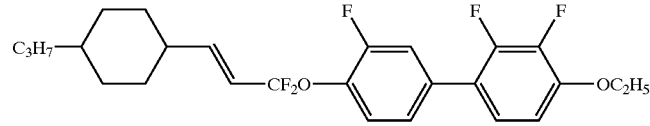 | |
| 119 | 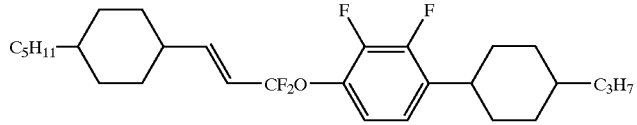 | |
| 120 | 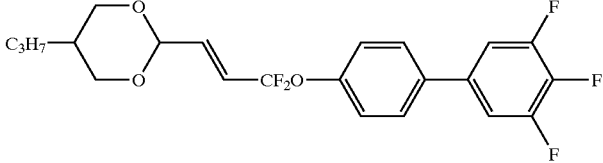 | |
| 121 | 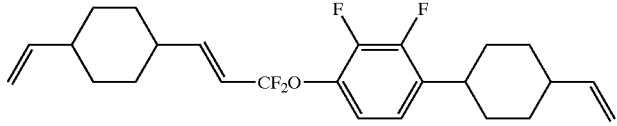 | |
| 122 | 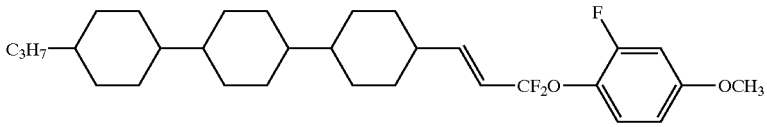 | |
| 123 | 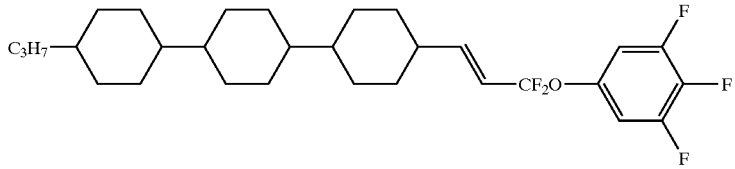 | |
| 124 | 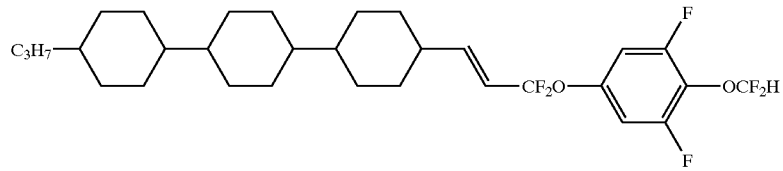 | |

| compound No. | structure | data |
|---|---|---|
| 125 | C₃H₇–Cy–Cy–Cy–CH=CH–CF₂O–Ph(2,3-F₂)–OCH₃ | |
| 126 | C₃H₇–Cy–Ph–Cy–CH=CH–CF₂O–Ph–C₂H₅ | |
| 127 | C₃H₇–Cy–Ph(2,6-F₂)–Cy–CH=CH–CF₂O–Ph(3,4,5-F₃) | |
| 128 | C₃H₇–Ph–Ph(3,5-F₂)–Cy–CH=CH–CF₂O–Ph(3,4,5-F₃) | |
| 129 | C₃H₇–Cy–Ph(2,3-F₂)–Cy–CH=CH–CF₂O–Ph(2,3-F₂)–OCH₃ | |
| 130 | C₂H₅–Ph–Ph(3-F)–Ph–CH₂CH₂CH=CH–CF₂O–Ph(3-F)–C₂H₅ | |
| 131 | C₅H₁₁–Cy–Cy–CH=CH–CF₂O–Ph(3-F)–Ph–C₂H₅ | |
| 132 | C₅H₁₁–Cy–Cy–CH=CH–CF₂O–Ph(3-F)–Ph(3,4,5-F₃) | |
| 133 | C₅H₁₁–Cy–Cy–CH=CH–CF₂O–Ph(3-F)–Ph–C₂H₅ | |

-continued

| compound No. | structure | data |
|---|---|---|
| 134 | C5H11–Cy–Cy–CH=CH–CF2O–Ph(2-F)–Ph(3,4,5-F) | |
| 135 | C5H11–Cy–Cy–CH=CH–CF2O–Ph(2-F)–Ph(2,3-F)–OC2H5 | |
| 136 | CH2=CH–Cy–Cy–CH=CH–CF2O–Ph(3-F)–Cy–C2H5 | |
| 137 | C5H11–Ph–Cy–CH=CH–CF2O–Ph–Ph(3,4-F) | |
| 138 | C5H11–Cy–CH=CH–CF2O–Ph–Ph(2-F)–Ph–C2H5 | |
| 139 | C3H7–Cy–CH=CH–CF2O–Ph–Ph(2-F)–Ph(4-F) | |
| 140 | C5H11–Cy–CH=CH–CF2O–Ph–Ph(2-F)–Ph–C2H5 | |
| 141 | C3H7–Cy–CH=CH–CF2O–Ph–Ph(2-F)–Ph(4-F) | |
| 142 | C3H7–Cy–CH=CH–CF2O–Ph–Ph(2-F)–Ph(3,4,5-F) | |
| 143 | C3H7–Cy–CH=CH–CF2O–Ph–Ph(2,6-F)–Ph(3,4-F) | |

-continued

| compound No. | structure | data |
|---|---|---|
| 144 | 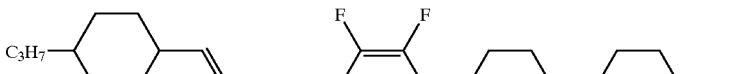 | |
| 145 | 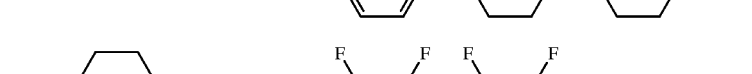 | |
| 146 | 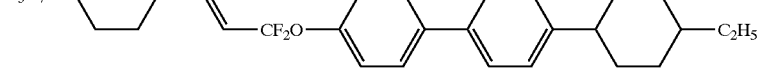 | |

Example 6
Liquid Crystal Composition Comprising Liquid Crystalline Compound (1c') as First Component A nematic liquid crystal composition (hereinafter referred to as liquid crystal composition A) comprising cyanophenylcyclohexane liquid crystalline compounds:

| | |
|---|---|
| 4-(4-propylcyclohexyl)benzonitrile | 24% |
| 4-(4-pentylcyclohexyl)benzonitrile | 36% |
| 4-(4-heptylcyclohexyl)benzonitrile | 25% |
| 4-(4-(4-pentylcyclohexyl)phenyl)benzonitrile | 15% | has the following properties.
Clearing point (TNI): 71.7° C.; threshold voltage (Vth) in a cell thickness of 8.8 μm: 1.78 V; Δε: 11.0; Δn: 0.137; and viscosity (η) at 20° C.: 26.3 mPa·s.

A liquid crystal composition comprising 85% by weight of this liquid crystal composition A and 15% by weight of 1-(3-(4'-propyl-3,5-difluorobiphenyl-4-yl)-1,1-difluoropropenyloxy)-3,4,5-trifluorobenzene (Compound No. 108) obtained in Example 5 was prepared. It had the following properties:
Clearing point (TNI): 68.5° C.; threshold voltage (Vth) in a cell thickness of 8.9 μm: 1.50 V; Δε: 14.6; Δn: 0.144; viscosity (η) at 20° C.: 29.2 mPa·s.

The above compound had the following physical properties, which were calculated from those of the liquid crystal composition and the mixing ratio of the compounds according to an extrapolation:
Clearing point (TNI): 50.4° C.; Δε: 31.6; Δn: 0.184; and viscosity (η) at 20° C.: 40.0 mPa·s.

EFFECTS OF THE INVENTION

The difluoromethyl ether derivative of the present invention can readily and safely be produced in a high yield by using the process of the present invention.

Further, the difluoromethyl ether derivative of the present invention is a liquid crystalline compound having an excellent compatibility with other liquid crystal compounds. Thus, novel liquid crystal compositions having optimum physical properties required to various liquid crystal display elements can be prepared by using this liquid crystalline compound as a component therefor and suitably selecting rings, substituents and bonding groups constituting the compound.

What is claimed is:
1. A liquid crystalline compound represented by Formula (1c'):

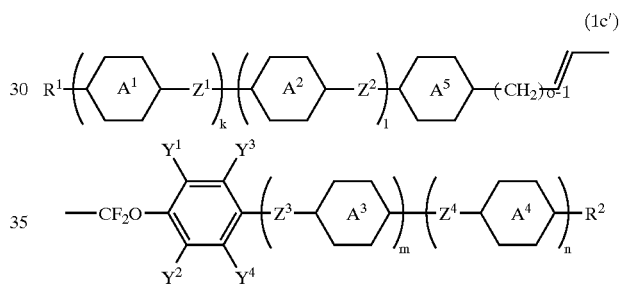

wherein $R^1$ and $R^2$ each independently represent hydrogen, halogen, a cyano group or an alkyl group having 1 to 20 carbon atoms, in which at least one —$CH_2$— may be substituted with —O—, —S—, —CH=CH— or —C≡C— but —O— is not adjacent to another —O—, and in which any hydrogen may be substituted with fluorine;

rings $A^1$, $A^2$, $A^3$, $A^4$ and $A^5$ each independently represent a 1,4-cyclohexylene group in which at least one —$CH_2$— may be substituted with —O— or —S—, or a 1,4-phenylene group in which at least one =CH— may be substituted with =N— and at least one hydrogen on the ring may be substituted with fluorine, a cyano group or an alkyl group having 1 to 10 carbon atoms;

$Z^1$, $Z^2$, $Z^3$ and $Z^4$ each independently represent a single bond or an alkylene group having 1 to 4 carbon atoms, in which at least one —$CH_2$— may be substituted with —O—, —S—, —CH=CH— or —C≡C— but —O— is not adjacent to another —O—, and in which any hydrogen may be substituted with fluorine;

$Y^1$, $Y^2$, $Y^3$ and $Y^4$ each independently represent hydrogen, halogen, a cyano group or an alkyl group having 1 to 10 carbon atoms;

k, l, m and n each independently represent 0 or 1; and o represents an integer of 1–10.

2. The liquid crystalline compound of Formula (1c') as claimed in claim 1, wherein ring $A^5$ is a 1,4-cyclohexylene group.

3. The liquid crystalline compound of Formula (1c') as claimed in claim 1, wherein both $Y^1$ and $Y^3$ are fluorine, and both $Y^2$ and $Y^4$ are hydrogen.

4. The liquid crystalline compound of Formula (1c') as claimed in claim 1, wherein both $Y^1$ and $Y^2$ are hydrogen.

5. A liquid crystal composition comprising at least one liquid crystalline compound as claimed in claim 1.

6. A liquid crystal composition comprising at least one liquid crystalline compound as claimed in claim 1 as a first component and at least one compound selected from the group A consisting of compounds (2), (3) and (4) as a second component:

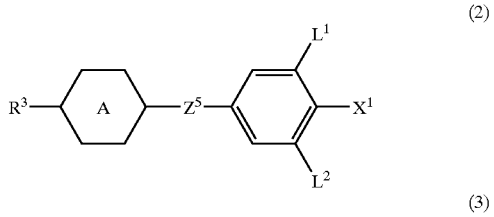
(2)

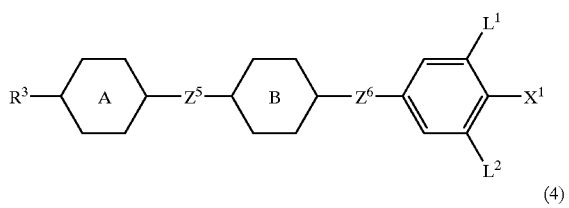
(3)

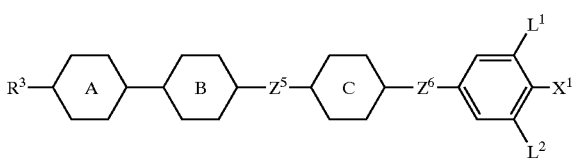
(4)

wherein $R^3$ represents an alkyl group having 1 to 10 carbon atoms, in which any —CH$_2$— not adjacent to each other may be substituted with —O— or —CH=CH— and any hydrogen may be substituted with fluorine; $X^1$ represents fluorine, chlorine, —OCF$_3$, —OCF$_2$H, —CF$_3$, —CF$_2$H, —CFH$_2$, —OCF$_2$CF$_2$H or —OCF$_2$CFHCF$_3$; $L^1$ and $L^2$ each independently represent hydrogen or fluorine; $Z^5$ and $Z^6$ each independently represent —(CH$_2$)$_2$—, —(CH$_2$)$_4$—, —COO—, —CF$_2$O—, —OCF$_2$—, —CH=CH— or a single bond; rings A and B each independently represent a 1,4-cyclohexylene group, a 1,3-dioxane-2,5-diyl group, or a 1,4-phenylene group in which hydrogen may be substituted with fluorine; and ring C represents a 1,4-cyclohexylene group, or a 1,4-phenylene group in which hydrogen may be substituted with fluorine.

7. A liquid crystal composition comprising at least one compound as claimed in claim 1 as a first component and at least one compound selected from the group B consisting of compounds (5) and (6) as a second component:

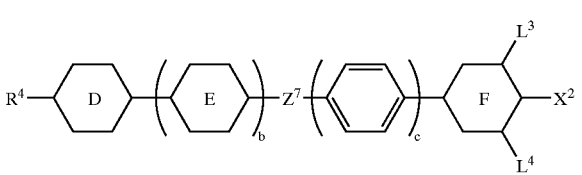
(5)

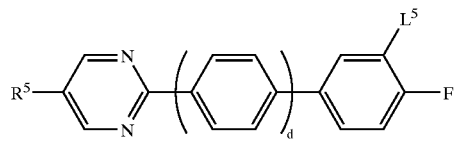
(6)

wherein $R^4$ and $R^5$ each independently represent an alkyl group having 1 to 10 carbon atoms, in which any —CH$_2$— not adjacent to each other may be substituted with —O— or —CH=CH— and any hydrogen may be substituted with fluorine; $X^2$ represents —CN or —C≡C—CN; ring D represents a 1,4-cyclohexylene group, a 1,4-phenylene group, a 1,3-dioxane-2,5-diyl group or a pyrimidine-2,5-diyl group; ring E represents a 1,4-cyclohexylene group, a 1,4-phenylene group in which hydrogen may be substituted with fluorine, or a pyrimidine-2,5-diyl group; ring F represents a 1,4-cyclohexylene group or a 1,4-phenylene group; $Z^7$ represents —(CH$_2$)$_2$—, —COO—, —CF$_2$O—, —OCF$_2$— or a single bond; $L^3$, $L^4$ and $L^5$ each independently represent hydrogen or fluorine; and b, c and d each independently represent 0 or 1.

8. A liquid crystal composition comprising at least one compound as claimed in claim 1 as a first component and at least one compound selected from the group C consisting of compounds (7), (8) and (9) as a second component:

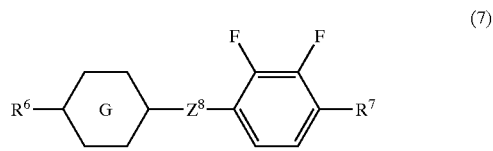
(7)

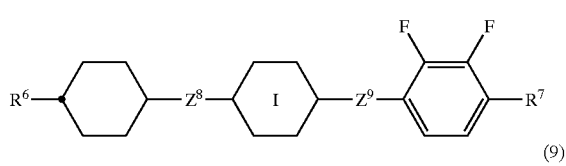
(8)

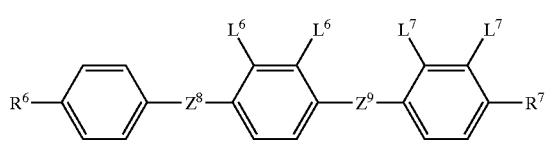
(9)

wherein $R^6$ and $R^7$ each independently represent an alkyl group having 1 to 10 carbon atoms, in which any —CH$_2$— not adjacent to each other may be substituted with —O— or —CH=CH— and any hydrogen may be substituted with fluorine; rings G and I each independently represent a 1,4-cyclohexylene group or a 1,4-phenylene group; $L^6$ and $L^7$ each independently represent hydrogen or fluorine, but $L^6$ and $L^7$ are not hydrogen at the same time; and $Z^8$ and $Z^9$ each independently represent —(CH$_2$)$_2$—, —COO— or a single bond.

9. A liquid crystal composition comprising at least one compound as claimed in claim 1 as a first component, at least one compound selected from the group A consisting of the compounds (2), (3) and (4) as a second component and at least one compound selected from the group D consisting of compounds (10), (11) and (12) as a third component:

(2)

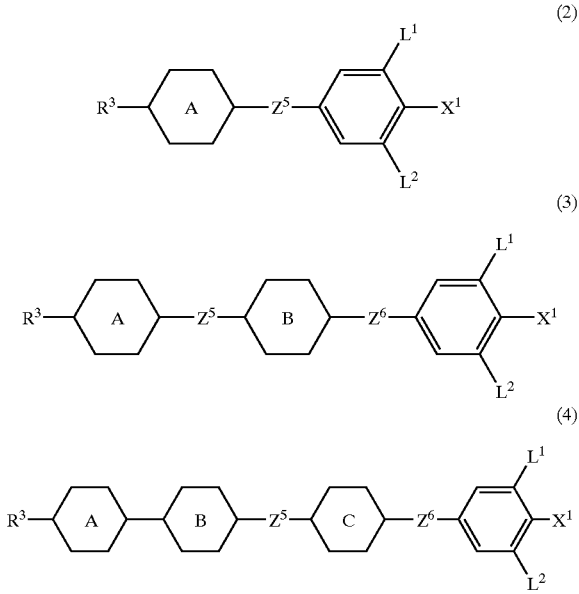

(3)

(4)

wherein R³ represents an alkyl group having 1 to 10 carbon atoms, in which any —CH₂— not adjacent to each other may be substituted with —O— or —CH=CH— and any hydrogen may be substituted with fluorine; X¹ represents fluorine, chlorine, —OCF₃, —OCF₂H, —CF₃, —CF₂H, —CFH₂, —OCF₂CF₂H or —OCF₂CFHCF₃; L¹ and L² each independently represent hydrogen or fluorine; Z⁵ and Z⁶ each independently represent —(CH₂)₂—, —(CH₂)₄—, —COO—, —CF₂O—, —OCF₂—, —CH=CH— or a single bond; rings A and B each independently represent a 1,4-cyclohexylene group, a 1,3-dioxane-2,5-diyl group, or a 1,4-phenylene group in which hydrogen may be substituted with fluorine; and ring C represents a 1,4-cyclohexylene group, or a 1,4-phenylene group in which hydrogen may be substituted with fluorine, (10)

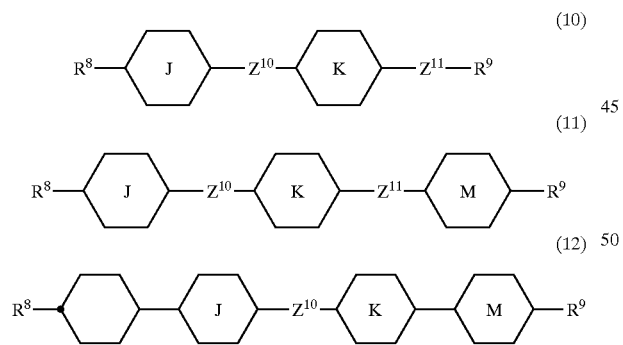

(11)

(12)

wherein R⁸ and R⁹ each independently represent an alkyl group having 1 to 10 carbon atoms, in which any —CH₂— not adjacent to each other may be substituted with —O— or —CH=CH— and any hydrogen may be substituted with fluorine; rings J, K and M each independently represent a 1,4-cyclohexylene group, a pyrimidine-2,5-diyl group, or a 1,4-phenylene group in which hydrogen may be substituted with fluorine; and Z¹⁰ and Z¹¹ each independently represent —C≡C—, —COO—, —(CH₂)₂—, —CH=CH— or a single bond.

10. A liquid crystal composition comprising at least one compound as claimed in claim 1 as a first component, at least one compound selected from the group B consisting of the compounds (5) and (6) as a second component and at least one compound selected from the group D consisting of the compounds (10), (11) and (12) as a third component.

(5)

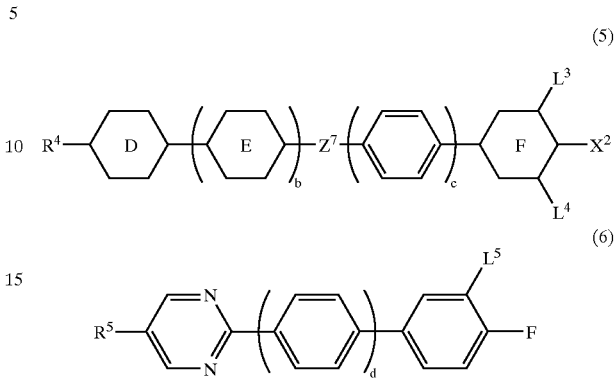

(6)

wherein R⁴ and R⁵ each independently represent an alkyl group having 1 to 10 carbon atoms, in which any —CH₂— not adjacent to each other may be substituted with —O— or —CH=CH— and any hydrogen may be substituted with fluorine; X² represents —CN or —C≡C—CN; ring D represents a 1,4-cyclohexylene group, a 1,4-phenylene group, a 1,3-dioxane-2,5-diyl group or a pyrimidine-2,5-diyl group; ring E represents a 1,4-cyclohexylene group, a 1,4-phenylene group in which hydrogen may be substituted with fluorine, or a pyrimidine-2,5-diyl group, ring F represents a 1,4-cyclohexylene group or a 1,4-phenylene group; Z⁷ represents —(CH₂)₂—, —COO—, —CF₂O—, —OCF₂— or a single bond; L³, L⁴ and L⁵ each independently represent hydrogen or fluorine; and b, c and d each independently represent 0 or 1, (10)

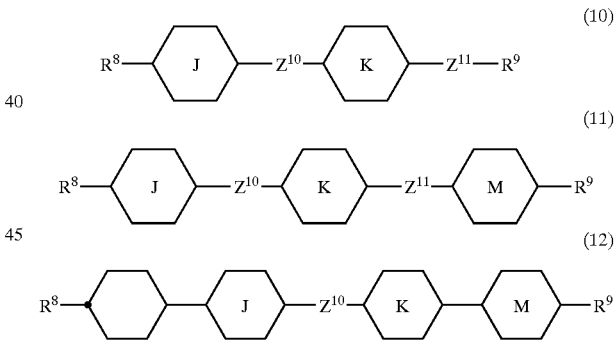

(11)

(12)

wherein R⁸ and R⁹ each independently represent an alkyl group having 1 to 10 carbon atoms, in which any —CH₂— not adjacent to each other may be substituted with —O— or —CH=CH— and any hydrogen may be substituted with fluorine; rings J, K and M each independently represent a 1,4-cyclohexylene group, a pyrimidine-2,5-diyl group, or a 1,4-phenylene group in which hydrogen may be substituted with fluorine; and Z¹⁰ and Z¹¹ each independently represent —C≡C—, —COO—, —(CH₂)₂—, —CH=CH— or a single bond.

11. A liquid crystal composition comprising at least one compound as claimed in claim 9 as a first component, at least one compound selected from the compound group C consisting of the compounds (7), (8) and (9) as a second component and at least one compound selected from the compound group D consisting of the compounds (10), (11) and (12) as a third component.

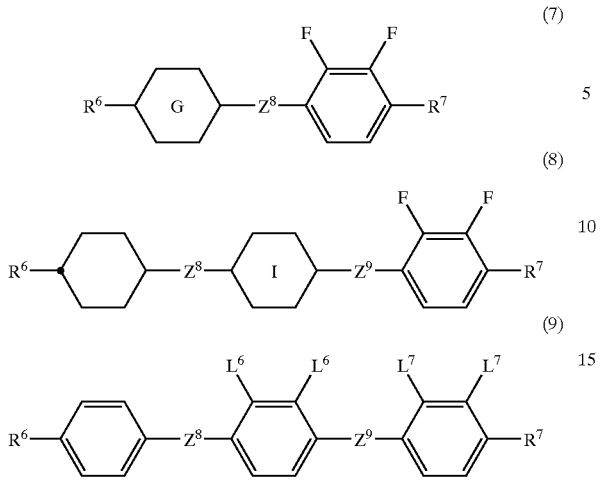

(7)
(8)
(9)

wherein R⁶ and R⁷ each independently represent an alkyl group having 1 to 10 carbon atoms, in which any —CH₂— not adjacent to each other may be substituted with —O— or —CH=CH— and any hydrogen may be substituted with fluorine; rings G and I each independently represent a 1,4-cyclohexylene group or a 1,4-phenylene group; L⁶ and L⁷ each independently represent hydrogen or fluorine, but L⁶ and L⁷ are not hydrogen at the same time; and Z⁸ and Z⁹ each independently represent —(CH₂)₂—, —COO— or a single bond,

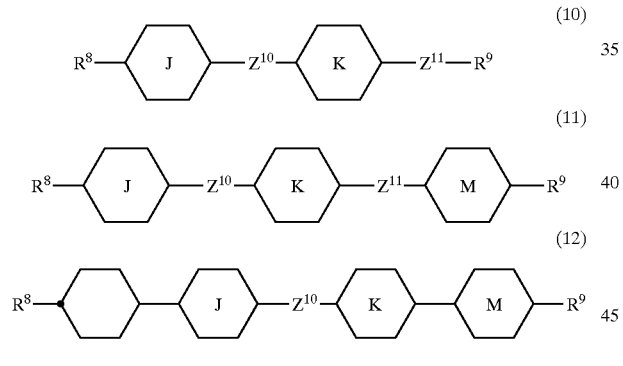

(10)
(11)
(12)

wherein R⁸ and R⁹ each independently represent an alkyl group having 1 to 10 carbon atoms, in which any —CH₂— not adjacent to each other may be substituted with —O— or —CH=CH— and any hydrogen may be substituted with fluorine; rings J, K and M each independently represent a 1,4-cyclohexylene group, a pyrimidine-2,5-diyl group, or a 1,4-phenylene group in which hydrogen may be substituted with fluorine; and Z¹⁰ and Z¹¹ each independently represent —C≡C—, —COO—, —(CH₂)₂—, —C=CH— or a single bond.

12. A liquid crystal composition comprising at least one compound as claimed in claim 1 as a first component, at least one compound selected from the group A consisting of compounds (2), (3) and (4) and at least one compound selected from the group B consisting of compounds (5) and (6) as a second component and at least one compound selected from the group D consisting of compounds (10), (11) and (12) as a third component (2)
(3)
(4)

wherein R³ represents an alkyl group having 1 to 10 carbon atoms, in which any —CH₂— not adjacent to each other may be substituted with —O— or —CH=CH— and any hydrogen may be substituted with fluorine; X¹ represents fluorine, chlorine, —OCF₃, —OCF₂H, —CF₃, —CF₂H, —CFH₂, —OCF₂CF₂H or —OCF₂CFHCF₃; L¹ and L₂ each independently represent hydrogen or fluorine; Z⁵ and Z⁶ each independently represent —(CH₂)₂—, —(CH₂)₄—, —COO—, —CF₂O—, —OCF₂—, —CH=CH— or a single bond; rings A and B each independently represent a 1,4-cyclohexylene group, a 1,3-dioxane-2,5-diyl group, or a 1,4-phenylene group in which hydrogen may be substituted with fluorine; and ring C represents a 1,4-cyclohexylene group, or a 1,4-phenylene group in which hydrogen may be substituted with fluorine,

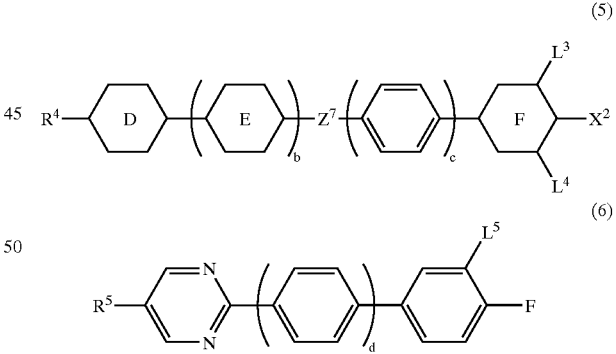

(5)
(6)

wherein R⁴ and R⁵ each independently represent an alkyl group having 1 to 10 carbon atoms, in which any —OH₂— not adjacent to each other may be substituted with —O— or —CH=CH— and any hydrogen may be substituted with fluorine; X² represents —CN or —C≡C—CN; ring D represents a 1,4-cyclohexylene group, a 1,4-phenylene group, a 1,3-dioxane-2,5-diyl group or a pyrimidine-2,5-diyl group; ring E represents a 1,4-cyclohexylene group, a 1,4-phenylene group in which hydrogen may be substituted with fluorine, or a pyrimidine-2,5-diyl group; ring F represents a 1,4-cyclohexylene group or a 1,4-phenylene group; Z⁷ represents —(CH₂)₂—, —COO—, —CF₂O—, —OCF₂— or a single bond; $L^3$, $L^4$ and $L^5$ each independently represent hydrogen or fluorine; and b, c and d each independently represent 0 or 1,

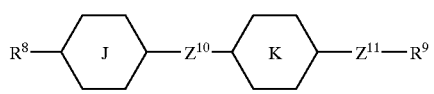

(10)

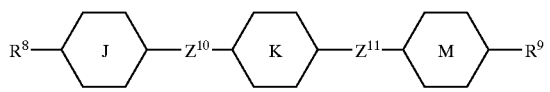

(11)

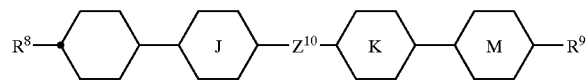

(12)

wherein $R^8$ and $R^9$ each independently represent an alkyl group having 1 to 10 carbon atoms, in which any —CH$_2$— not adjacent to each other may be substituted with —O— or —CH=CH— and any hydrogen may be substituted with fluorine; rings J, K and M each independently represent a 1,4-cyclohexylene group, a pyrimidine-2,5-diyl group, or a 1,4-phenylene group in which hydrogen may be substituted with fluorine; and $Z^{10}$ and $Z^{11}$ each independently represent —C≡C—, —COO—, —(CH$_2$)$_2$—, —C=CH— or a single bond.

13. A liquid crystal composition comprising the liquid crystal composition as claimed in claim 5, and further, at least one optically active compound.

14. A liquid crystal display element comprising the liquid crystal composition as claimed in claim 5.

15. A liquid crystal display element comprising the liquid crystal composition as claimed in claim 13.

* * * * *